United States Patent
Zhang et al.

(10) Patent No.: US 11,994,905 B2
(45) Date of Patent: May 28, 2024

(54) TRUSTED USER INTERFACE DISPLAY METHOD AND ELECTRONIC DEVICE

(71) Applicant: HUAWEI TECHNOLOGIES CO., LTD., Guangdong (CN)

(72) Inventors: Peng Zhang, Shenzhen (CN); Chenguang Liu, Shenzhen (CN); Jianliang Tian, Beijing (CN); Lian Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 283 days.

(21) Appl. No.: 17/587,234

(22) Filed: Jan. 28, 2022

(65) Prior Publication Data

US 2022/0155819 A1 May 19, 2022

Related U.S. Application Data

(63) Continuation of application No. PCT/CN2020/105844, filed on Jul. 30, 2020.

(30) Foreign Application Priority Data

Jul. 30, 2019 (CN) .......................... 201910696969.X

(51) Int. Cl.
*G06F 3/048* (2013.01)
*G06F 1/16* (2006.01)
(Continued)

(52) U.S. Cl.
CPC .......... *G06F 1/1618* (2013.01); *G06F 3/0488* (2013.01); *G06F 3/1454* (2013.01); *G06F 21/53* (2013.01); *G06F 2221/032* (2013.01)

(58) Field of Classification Search
CPC .... G06F 1/1618; G06F 3/0488; G06F 3/1454; G06F 21/53; G06F 2221/032
See application file for complete search history.

(56) References Cited

U.S. PATENT DOCUMENTS

| 11,424,931 B2 * | 8/2022 | Seibel ................... G06F 21/606 |
| 2016/0134660 A1 * | 5/2016 | Ponsini ................... H04L 63/20 726/1 |

(Continued)

FOREIGN PATENT DOCUMENTS

| CN | 104462942 A | 3/2015 |
| CN | 104809413 A | 7/2015 |

(Continued)

OTHER PUBLICATIONS

PCT International Search Report and Written Opinion issued in International Application No. PCT/CN2020/105844 dated Nov. 2, 2020, 16 pages (with English translation).

*Primary Examiner* — David Phantana-angkool
(74) *Attorney, Agent, or Firm* — Fish & Richardson P.C.

(57) ABSTRACT

The disclosure provides trusted user interface display methods. One example method applied to an electronic device having a foldable screen, includes: changing the foldable screen from a first display status to a second display status in response to a first operation performed by a user on the electronic device; displaying a user interface (UI) of a client application (CA) on a screen corresponding to the second display status; and triggering to display a trusted user interface (TUI) corresponding to the CA on the screen corresponding to the second display status in response to a second operation performed by the user on the UI of the CA, where the TUI is adapted to the screen corresponding to the second display status.

30 Claims, 38 Drawing Sheets

(51) Int. Cl.
    *G06F 3/0488*     (2022.01)
    *G06F 3/14*     (2006.01)
    *G06F 21/53*     (2013.01)

(56) References Cited

U.S. PATENT DOCUMENTS

| | | | | |
|---|---|---|---|---|
| 2017/0214530 | A1* | 7/2017 | Seibel | H04L 9/3234 |
| 2017/0235435 | A1* | 8/2017 | Sohn | G06F 3/0481 |
| | | | | 715/738 |
| 2018/0039408 | A1* | 2/2018 | Cheong | G06F 3/0481 |
| 2018/0268156 | A1* | 9/2018 | Luo | G06F 21/53 |
| 2019/0205011 | A1* | 7/2019 | Li | G06F 3/04817 |
| 2020/0225706 | A1* | 7/2020 | Jung | H04M 1/72427 |
| 2021/0019393 | A1* | 1/2021 | Michalevsky | G06F 21/57 |
| 2021/0096740 | A1* | 4/2021 | Klein | G06F 1/1669 |
| 2021/0096887 | A1* | 4/2021 | Klein | G06F 3/0481 |
| 2022/0129566 | A1* | 4/2022 | Hoogerbrugge | G06F 21/53 |
| 2022/0147228 | A1* | 5/2022 | Yi | H04M 1/72412 |
| 2022/0155819 | A1* | 5/2022 | Zhang | G06F 1/1677 |
| 2022/0368530 | A1* | 11/2022 | Seibel | H04L 63/061 |
| 2023/0046708 | A1* | 2/2023 | Xu | G06F 3/04845 |
| 2023/0222230 | A1* | 7/2023 | Hopkins | H04L 63/1441 |
| | | | | 713/171 |
| 2023/0342105 | A1* | 10/2023 | He | G06F 3/1454 |
| 2023/0360445 | A1* | 11/2023 | Li | G06F 21/32 |

FOREIGN PATENT DOCUMENTS

| | | | |
|---|---|---|---|
| CN | 106990972 A | | 7/2017 |
| CN | 17645611 A | * | 1/2018 |
| CN | 107645611 A | | 1/2018 |
| CN | 108536409 A | | 9/2018 |
| CN | 108737402 A | | 11/2018 |
| CN | 110059500 A | * | 7/2019 |
| CN | 110059500 A | | 7/2019 |

\* cited by examiner

Foldable edge

Foldable edge

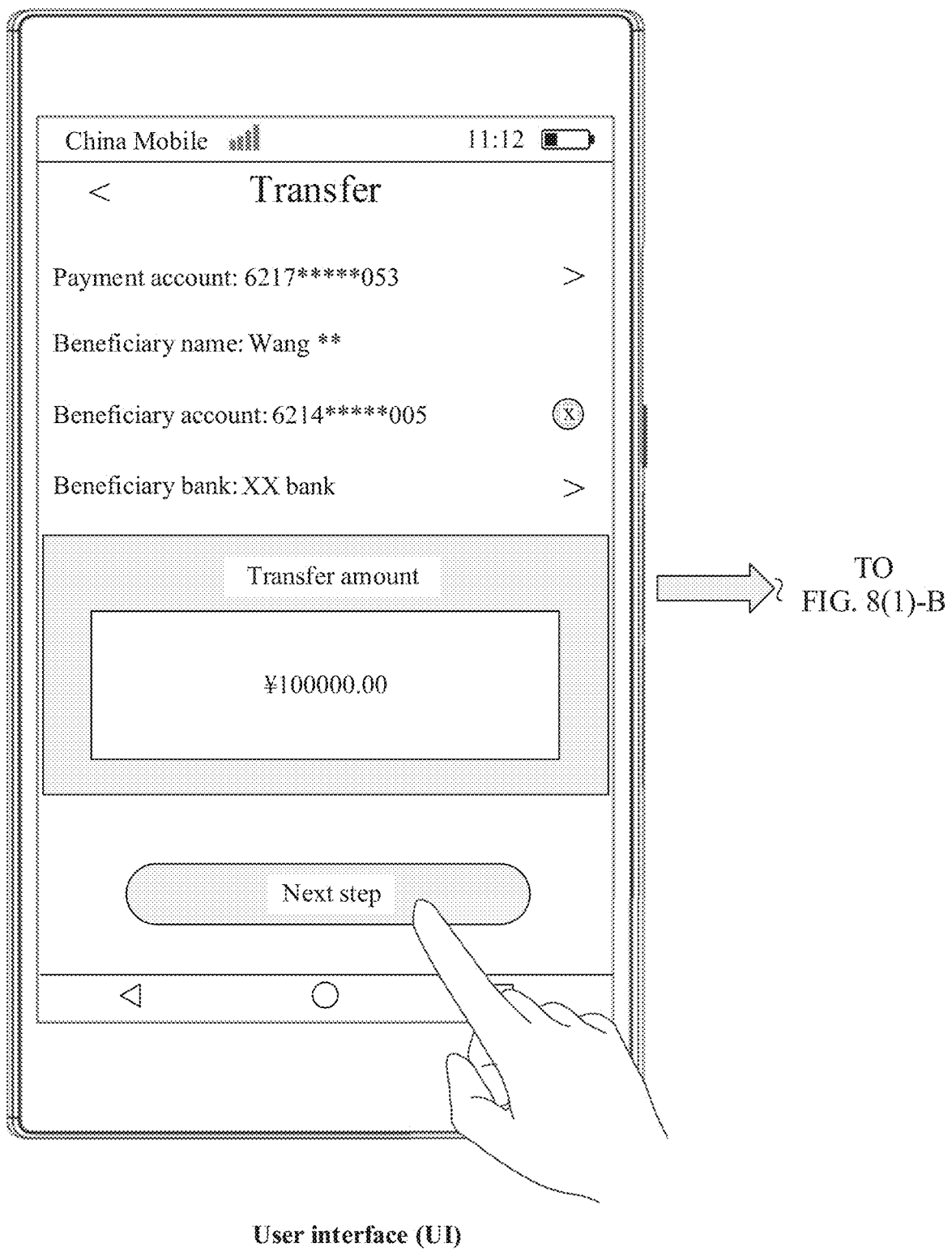
FIG. 8(1)-A

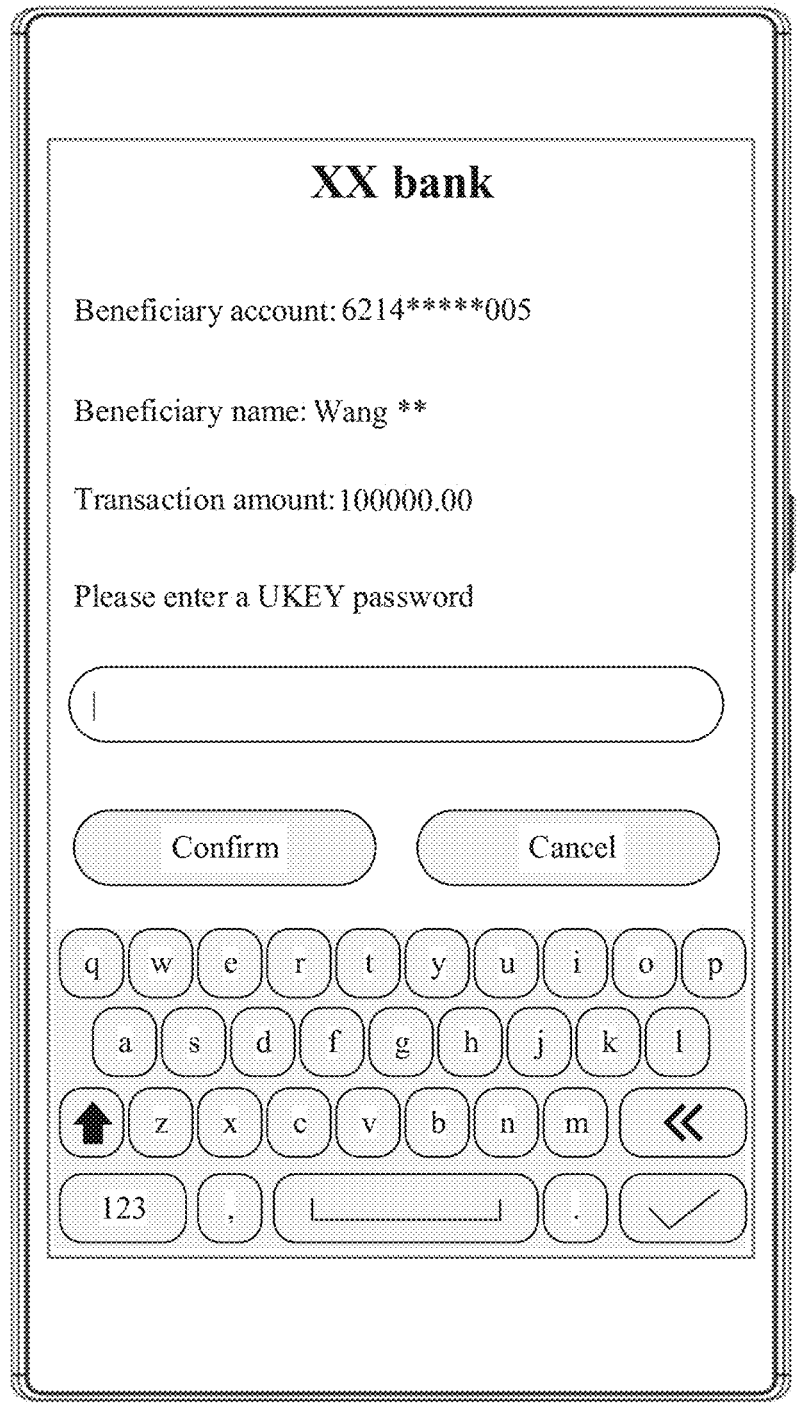
FIG. 8(1)-B

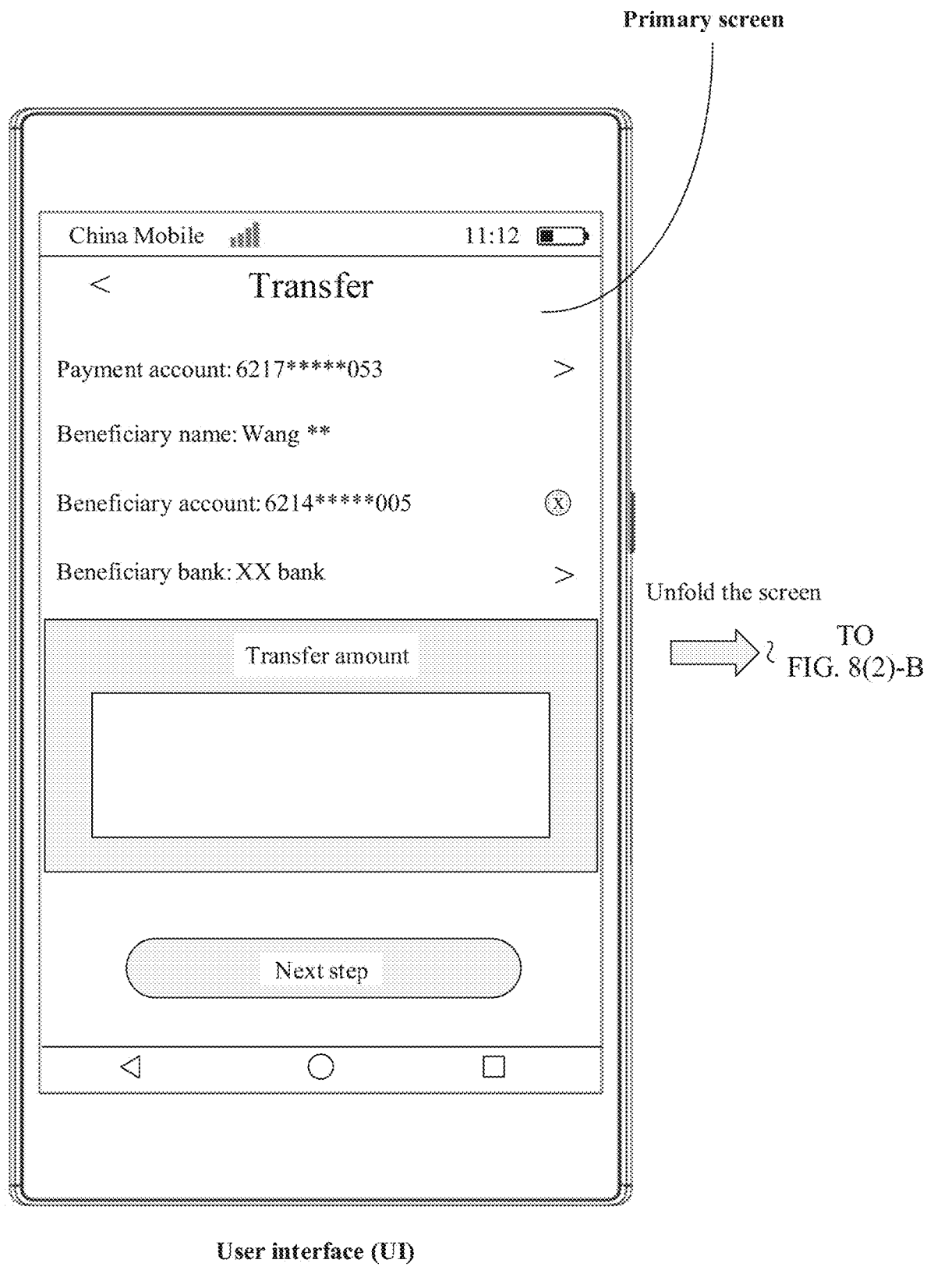
FIG. 8(2)-A

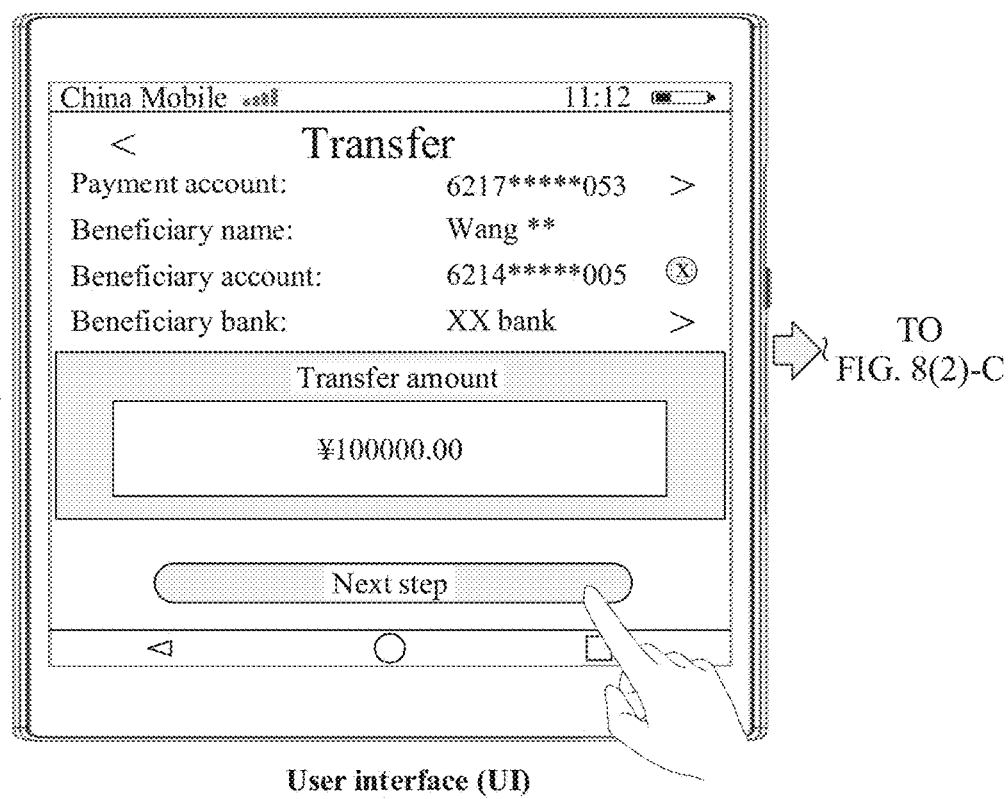
FIG. 8(2)-B

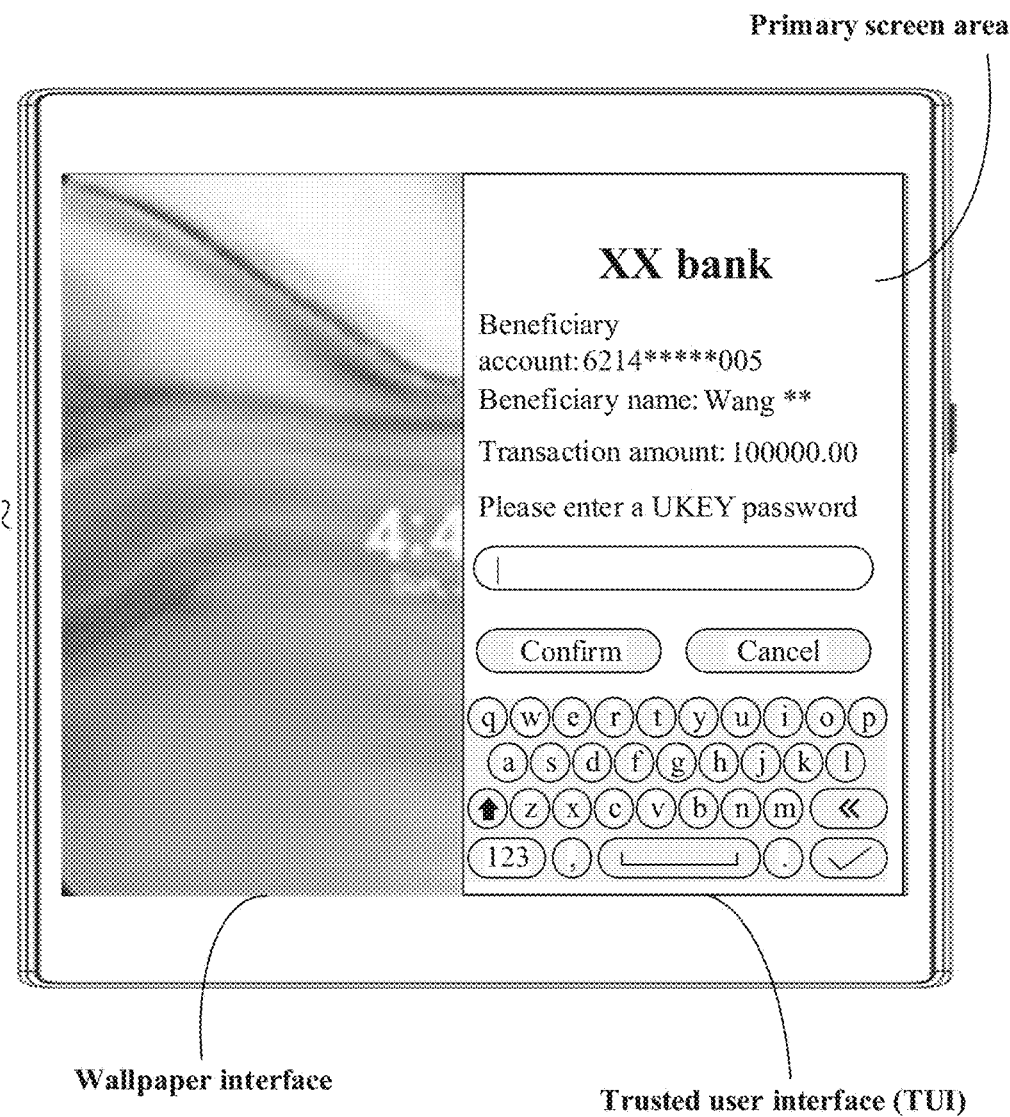
FIG. 8(2)-C

TRUSTED USER INTERFACE DISPLAY METHOD AND ELECTRONIC DEVICE

CROSS-REFERENCE TO RELATED APPLICATIONS

This application is a continuation of International Application No. PCT/CN2020/105844, filed on Jul. 30, 2020, which claims priority to Chinese Patent Application No. 201910696969.X, filed on Jul. 30, 2019. The disclosures of the aforementioned applications are hereby incorporated by reference in their entireties.

TECHNICAL FIELD

The present invention relates to the field of electronic devices, and in particular, to a trusted user interface (TUI) display method and an electronic device.

BACKGROUND

Nowadays, electronic devices such as a mobile phone have been widely popularized and used. On one hand, mobile payment, online banking, or mobile phone banking has become an important payment method for people's daily consumption. The mobile payment is a service mode in which a user pays for a consumed commodity or service by using a mobile terminal (usually a mobile phone). While the mobile payment brings convenience to the user, mobile payment security has always been a concern. A mobile payment application generally runs in an open rich execution environment (Rich Execution Environment, REE). An application in the REE is also referred to as a client application (client application, CA). The CA runs on a terminal operating system on a general-purpose processor, for example, Android® or iOS®. This open environment provides a channel for information disclosure and malware spread. To improve a security requirement of the mobile payment, the open mobile terminal platform (Open Mobile Terminal Platform, OMTP) proposes a concept of a trusted execution environment (Trusted Execution Environment, TEE). The TEE is an independent running environment that runs outside the REE and is isolated from the REE. An application in the TEE is a specially customized trusted application (trusted application, TA). The TA may access hardware and software resources of the TEE through an internal interface of the TEE. However, the CA in the REE cannot directly access the hardware and software resources of the TEE. Only when the CA passes identity verification of the TEE, the CA in the REE can invoke the resources of the TEE or services of the TEE such as secure storage and secure display/input through an application programming interface (Application Programming Interface, API) provided by the TEE. In this way, in a mobile payment scenario, if sensitive information input and display are involved, the CA in the REE may invoke a secure display/input TA in the TEE, to display a trusted user interface (Trusted. User Interface, TUI) that satisfies a GP specification. In this way, the user protects sensitive information of the user, for example, personal identification number Personal Identification Number, PIN) input and transaction information confirmation, through the TUI. After the TUI is displayed, an entire screen display area is taken over by the TEE, and access of the REE to the display area is completely prevented, thereby preventing the CA in the REE from intercepting and stealing the sensitive information of the user.

On the other hand, with development of a screen technology, a display screen of the electronic device also becomes larger, to provide richer information for the user and bring better use experience to the user. However, if the display screen of the electronic device is extremely large, this causes inconvenience for the user to carry the electronic device. Therefore, an electronic device having a foldable screen (for example, a foldable screen mobile phone) proposed in recent years is an important development direction of the electronic device.

In an actual application, when a screen status (for example, a folded state) of the foldable screen changes, the Android sends a broadcast to notify the application CA in the REE. A user interface (User Interface, UI) of the CA implements adaptive screen display adaptation through processing by a graphics processing unit (Graphics Processing Unit, GPU). However, because the TEE is an isolated system from the Android, and the TEE usually does not have a complex display system, for example, the GPU, the TEE cannot sense a screen status change of the foldable screen. In this way, in the mobile payment scenario, the trusted user interface (TUI) of the TA corresponding to the CA cannot automatically adapt to the screen change of the foldable screen. Consequently, this brings inconvenience to the user.

SUMMARY

Embodiments of the present invention provide a trusted user interface display method and an electronic device, to enable a trusted user interface (TUI) of a TA corresponding to a CA to automatically adapt to a screen change of a foldable screen, thereby improving user experience.

According to a first aspect, an embodiment of the present invention provides a trusted user interface display method. The method is applied to an electronic device having a foldable screen, the foldable screen includes at least two screens, and a client application CA runs on the electronic device. The method includes: changing the foldable screen from a first display status to a second display status in response to a first operation performed by a user on the electronic device, where the first display status indicates that at least one of the at least two screens is in a display state, the second display status indicates that at least one of the at least two screens is in a display state, and a screen corresponding to the first display status is different from a screen corresponding to the second display status; displaying a user interface UI of the CA on the screen corresponding to the second display status; and triggering to display a trusted user interface TUI corresponding to the CA on the screen corresponding to the second display status in response to a second operation performed by the user on the UI of the CA, where the TUI is adapted to the screen corresponding to the second display status.

It may be learned that, in this embodiment of the present invention, for the electronic device having the foldable screen, when a display status of the foldable screen on which an application service is located changes, in this embodiment of the present invention, the UI of the CA may be adaptively displayed on the foldable screen, or the TUI of a TA may be adaptively displayed on the foldable screen. This resolves a pain point problem of a user using a foldable screen and greatly improves user experience.

Based on the first aspect, in a possible embodiment, the first operation is an operation of unfolding the foldable screen into full-screen display; and the first display status indicates that one of the at least two screens is in a display state, and the second display status indicates that the at least two screens are in a display state.

Based on the first aspect, in a possible embodiment, the first operation is an operation of folding the foldable screen into single-screen display; and the first display status indicates that the at least two screens are in a display state, and the second display status indicates that one of the at least two screens is in a display state.

Based on the first aspect, in a possible embodiment, the first operation is an operation of flipping the electronic device, so that the foldable screen switches from first single-screen display to second single-screen display.

The first display status indicates that a first screen of the at least two screens is in a display state, and the second display status indicates that a second screen of the at least two screens is in a display state.

Based on the first aspect, in a possible embodiment, after the triggering to display a TUI of the CA on the screen corresponding to the second display status, the method further includes:
  determining that the foldable screen changes from the second display status to a third display status in response to a third operation performed by the user on the electronic device, where the third display status indicates that at least one of the at least two screens is in a display state, and a screen corresponding to the third display status is different from the screen corresponding to the second display status;
  exiting the TUI on the screen corresponding to the third display status, and displaying the UI of the CA; and
  triggering to display the TUI of the CA on the screen corresponding to the third display status in response to a fourth operation performed by the user on the UI of the CA, where the TUI is adapted to the screen corresponding to the third display status.

The third operation is, for example, an operation of folding the foldable screen (from a full screen to a single screen), an operation of unfolding the foldable screen (from a single screen to a full screen), or an operation of flipping the electronic device (flipping from one single-screen display to another single-screen display).

Based on the first aspect, in a possible embodiment, the fourth operation is the same as the second operation.

Based on the first aspect, in a possible embodiment, the screen corresponding to the third display status is the same as the screen corresponding to the first display status;
  or the screen corresponding to the third display status is different from the screen corresponding to the first display status.

Based on the first aspect, in a possible embodiment, that the TUI is adapted to the screen corresponding to the second display status means that the TUI occupies the entire corresponding to the second display status.

Based on the first aspect, in a possible embodiment, that the TUI is adapted to the screen corresponding to the second display status means that the TUI occupies a part of the screen corresponding to the second display status.

Based on the first aspect, in a possible embodiment, a rich execution environment REE module and a trusted execution environment TEE module are deployed on the electronic device, the CA runs on the REE module, and the trusted application TA corresponding to the CA runs on the TEE module;
  the displaying a UI of the CA on the screen corresponding to the second display status includes:
  displaying the UI of the CA on the screen corresponding to the second display status by using REE module; and
  the triggering to display a TUI corresponding to the CA on the screen corresponding to the second display status in response to a second operation performed by the user on the UI of the CA includes:
  triggering to display the TUI of the TA in the TEE module on the screen corresponding to the second display status by using the TEE module in response to the second operation performed by the user on the UI of the CA.

Based on the first aspect, in a possible embodiment, the determining that the foldable screen changes from a first display status to a second display status in response to a first operation performed by a user on the electronic device includes:
  obtaining screen information corresponding to the foldable screen in the second display status by using the REE module when the foldable screen changes from the first display status to the second display status; and
  transmitting the screen information to the TEE module by using the REE module.

Based on the first aspect, in a possible embodiment, the triggering to display the TUI of the TA in the TEE module on the screen corresponding to the second display status in response to the second operation performed by the user on the UI of the CA and that the TUI is adapted to the screen corresponding to the second display status include:
  triggering a TUI display request by using the REE module in response to the second operation performed by the user on the UI of the CA; and
  sending the TUI display request to the TEE module by using the REE module, so that the TA corresponding to the CA is invoked in the TEE module.

Based on the first aspect, in a possible embodiment, the triggering to display the TUI of the TA in the TEE module on the screen corresponding to the second display status in response to the second operation performed by the user on the UI of the CA and that the TUI is adapted to the screen corresponding to the second display status include:
  receiving the TUI display request by using the TEE module;
  drawing the TUI of the TA in the TEE module based on the screen information by using the TEE module, so that the TUI is adapted to the screen corresponding to the second display status; and
  displaying the TUI on the screen corresponding to the second display status by using TEE module.

Based on the first aspect, in a possible embodiment, the drawing the TUI of the TA in the TEE module based on the screen information, so that the TUI is adapted to the screen corresponding to the second display status includes:
  obtaining coordinate transformation information based on the screen information by using the TEE module; and
  drawing the TUI based on the coordinate transformation information by using the TEE module, where a size of the TUI is consistent with a size of the screen corresponding to the second display status, or a size of the TUI is less than a size of the screen corresponding to the second display status.

Based on the first aspect, a possible embodiment, the transmitting the screen information to the TEE module by using the REE module includes:
  encrypting the screen information by using the REE module to obtain encrypted screen information;
  verifying whether a daemon used to transmit the encrypted screen information is a system service by using the REE module; and invoking a driver interface to transmit the encrypted screen information to the TEE module by using the REE module when the daemon is the system service.

It may be learned that, in this embodiment of the present invention, for the electronic device having the foldable screen, when the display status of the foldable screen on which the application service is located changes, screen information (latest screen information) of a current foldable screen may be transferred to an adaptive display module in a TEE by using the REE module. In this way, the TEE can obtain the screen information of the foldable screen in real time, thereby creating a feasible information transmission channel. The TEE module processes the screen information, so that an interface of the TUI is automatically adapted to a screen of the current foldable screen, and adaptive display of the TUI is implemented by using a software algorithm (rather than a GPU display mode). This can resolve the pain point problem of the user using the foldable screen and greatly improves user experience.

Based on the first aspect, in a possible embodiment, the transmitting the screen information to the TEE module by using the REE module includes:

verifying, based on the screen information, an identity of a daemon used to transmit the screen information by using the TEE module; and obtaining the screen information through decryption by using the TEE module when verification succeeds.

According to a second aspect, an embodiment of the present invention provides an electronic device having a foldable screen, where the foldable screen includes at least two screens, a client application CA runs on the electronic device, and the electronic device includes:

a rich execution environment REE module, configured to change the foldable screen from a first display status to a second display status in response to a first operation performed by a user on the electronic device, where the first display status indicates that at least one of the at least two screens is in a display state, the second display status indicates that at least one of the at least two screens is in a display state, and a screen corresponding to the first display status is different from a screen corresponding to the second display status; and further configured to display a user interface UI of the CA on the screen corresponding to the second display status; and a trusted execution environment TEE module, configured to trigger to display a trusted user interface TUI corresponding to the CA on the screen corresponding to the second display status in response to a second operation performed by the user on the UI of the CA, where the TUI is adapted to the screen corresponding to the second display status.

It may be learned that, in this embodiment of the present invention, for the electronic device having the foldable screen, when a display status of the foldable screen on which an application service is located changes, in this embodiment of the present invention, the UI of the CA may be adaptively displayed on the foldable screen by using the REE module, and the TUI of a TA may be adaptively displayed on the foldable screen by using the TEE module. This resolves a pain point problem of a user using a foldable screen and greatly improves user experience.

Based on the second aspect, in a possible embodiment, the first operation is an operation of unfolding the foldable screen into full-screen display.

The first display status indicates that one of the at least two screens is in a display state, and the second display status indicates that the at least two screens are in a display state.

Based on the second aspect, in a possible embodiment, the first operation is an operation of folding the foldable screen into single-screen display.

The first display status indicates that the at least two screens are in a display state, and the second display status indicates that one of the at least two screens is in a display state.

Based on the second aspect, in a possible embodiment, the first operation is an operation of flipping the electronic device, so that the foldable screen switches from first single-screen display to second single-screen display.

The first display status indicates that a first screen of the at least two screens is in a display state, and the second display status indicates that a second screen of the at least two screens is in a display state.

Based on the second aspect, in a possible embodiment, the REE module is further configured to: determine that the foldable screen changes from the second display status to a third display status in response to a third operation performed by the user on the electronic device, where the third display status indicates that at least one of the at least two screens is in a display state, and a screen corresponding to the third display status is different from the screen corresponding to the second display status; and display the UI of the CA after the TUI on the screen corresponding to the third display status exits.

The TEE module is further configured to trigger to display the TUI of the CA on the screen corresponding to the third display status in response to a fourth operation performed by the user on the UI of the CA, where the TUI is adapted to the screen corresponding to the third display status.

Based on the second aspect, in a possible embodiment, the fourth operation is the same as the second operation.

Based on the second aspect, in a possible embodiment, the screen corresponding to the third display status is the same as the screen corresponding to the first display status; or the screen corresponding to the third display status is different from the screen corresponding to the first display status.

Based on the second aspect, in a possible embodiment, that the TUI is adapted to the screen corresponding to the second display status means that the TUI occupies the entire screen corresponding to the second display status.

Based on the second aspect, in a possible embodiment, that the TUI is adapted to the screen corresponding to the second display status means that the TUI occupies a part of the screen corresponding to the second display status.

Based on the second aspect, in a possible embodiment, the REE module is configured to display the UI of the CA in the REE module on the screen corresponding to the second display status.

The TEE module is configured to trigger to display the TUI of the TA in the TEE module on the screen corresponding to the second display status in response to the second operation performed by the user on the UI of the CA.

Based on the second aspect, in a possible embodiment, the REE module is specifically configured to:

obtain screen information corresponding to the foldable screen in the second display status when the foldable screen changes from the first display status to the second display status; and transmit the screen information to the TEE module.

Based on the second aspect, in a possible embodiment, the REE module is specifically configured to trigger a TUI display request in response to the second operation performed by the user on the UI of the CA; and send the TUI display request to the TEE module, so that the TA corresponding to the CA is invoked in the TEE module.

Based on the second aspect, in a possible embodiment, the TEE module is specifically configured to:
receive the TUI display request; draw the TUI of the TA in the TEE module based on the screen information, so that the TUI is adapted to the screen corresponding to the second display status; and display the TUI on the screen corresponding to the second display status.

Based on the second aspect, in a possible embodiment, the TEE module is specifically configured to:
obtain coordinate transformation information based on the screen information; and draw the TUI based on the coordinate transformation information, where a size of the TUI is consistent with a size of the screen corresponding to the second display status, or a size of the TUI is less than a size of the screen corresponding to the second display status.

Based on the second aspect, in a possible embodiment, the REE module is specifically configured to:
encrypt the screen information to obtain encrypted screen information; verify whether a daemon used to transmit the encrypted screen information is a system service; and invoke a driver interface to transmit the encrypted screen information to the TEE module when the daemon is the system service.

Based on the second aspect, in a possible embodiment, the REE module is specifically configured to:
verify, based on the screen information, an identity of a daemon used to transmit the screen information; and obtain the screen information through decryption when verification succeeds.

Based on the second aspect, in a possible embodiment, to enable the trusted user interface (TUI) of the TA corresponding to the CA to automatically adapt to a screen change of the foldable screen, a screen status awareness module is further deployed in a user mode of an REE, and an adaptive display module is further deployed in a user mode of a TEE.

The screen status awareness module may be a daemon (daemon) of the system service. In this embodiment of the present invention, the screen status awareness module may be configured to monitor the display status of the foldable screen. For example, the screen status awareness module can monitor a broadcast in an Android® operating system. When the display status of the foldable screen changes, the Android® operating system broadcasts a change event of the display status of the foldable screen. The screen status awareness module obtains the screen information through monitoring, where the screen information is used to indicate a current display status of the foldable screen. For example, the screen information may include respective information of display states of different screens in a current foldable screen. Further, the screen information may further include information such as sizes and resolution of the different screens in the foldable screen.

The screen status awareness module may further send the screen information to the adaptive display module in the TEE. For example, the screen status awareness module may invoke a TUI-switch function or a TUI-agent function, and use a global task function in the TEE to send the screen information to the adaptive display module.

In an implementation, the screen status awareness module may include a code program of a monitoring function and program code of a TEE transmission function. The code program of the monitoring function may be used to obtain the screen information of the current foldable screen by monitoring a system broadcast (for example, an Android system broadcast). The program code of the TEE transmission function may be used to send the screen information to the TEE. For example, the screen information may be transmitted to the TEE by using a TUI-agent.

In an implementation, the screen status awareness module may include the code program of the monitoring function and the program code of the TEE transmission function. The code program of the monitoring function may be used to obtain the screen information of the current foldable screen by monitoring the system broadcast (for example, the Android system broadcast), and send the screen information to a GPU, so that the GPU implements adaptive display of the UI interface. The program code of the TEE transmission function may be used to send the screen information to the TEE. For example, the screen information may be transmitted to the TEE by using the TUI agent.

The adaptive display module is configured to adaptively display the TUI of the TA on the current foldable screen based on the screen information, in other words, an interface of the TUI is adapted to a screen in a display state in the current foldable screen. Specifically, the adaptive display module dynamically stores received screen information. In other words, when new screen information is received, old screen information is locally replaced with the new screen information. The adaptive display module may perform coordinate transformation processing based on the screen information to obtain processed screen information. The adaptive display module processes, based on the processed screen information, a size, resolution, and the like of the invoked TUI of the TA, to implement the adaptive display of the screen of the foldable screen by the TUI.

Based on the second aspect, in a possible embodiment, to ensure security of screen information transmission, in the user mode of the REE, not only the screen status awareness module is deployed, but also an identity verification module is deployed. In the user mode of the TEE, not only the adaptive display module is deployed, but also a session-key (session-key) verification module is deployed.

The screen status awareness module may be the daemon (daemon) of the system service. In this embodiment of the present invention, the screen status awareness module may be configured to monitor the display status of the foldable screen.

Further, the screen information further includes a challenge value (or a random number), and the screen status awareness module performs encryption processing (for example, performs encryption in a symmetric encryption manner) on the screen information to obtain the encrypted screen information.

Alternatively, optionally, the screen status awareness module performs the encryption processing (for example, performs the encryption in the symmetric encryption manner) on the screen information. Then, the screen status awareness module may encapsulate the encrypted screen information and the challenge value (or the random number) into a data packet.

The screen status awareness module may further send the encrypted screen information or the data packet to the identity verification module in the REE.

The identity verification module is configured to determine an identity of an information transferor (for example, an identity of the screen status awareness module in this specification), and allow only the system service to invoke an information transfer interface. Specifically, the identity verification module may obtain identity information of the information transferor by using daemon (process) information, to determine whether the information transferor is the system service. In this way, when the information transferor is the screen status awareness module designed in this embodiment of this specification, because the identity verification module may determine that the screen status awareness module is the system service, the identity verification module allows the screen status awareness module to invoke the information transfer interface (invoke the TUI-switch function or the TUI-agent function), and sends the encrypted screen information or the data packet to the TEE. When the information transferor is function code disguised by a malicious attacker, the identity verification module confirms that the information transferor is not the system service and rejects the information transferor to invoke a related interface. This prevents insecure information from being transmitted to the TEE and ensures information security of the REE and the TEE.

The session-key verification module and the adaptive display module may be separately deployed in the user mode of the TEE, or the adaptive display module and the session-key verification module may be deployed in the user mode of the TEE together after functions of the adaptive display module and the session-key verification module are integrated. For convenience, the following describes a solution by using an example in which the session-key verification module and the adaptive display module may be separately deployed in the user mode of the TEE.

The session-key verification module is configured to decrypt the screen information, and verify the identity information of the information transferor based on the challenge value (the random number) carried by the session-key verification module. For example, when the challenge value (the random number) is verified correctly, it is confirmed that the identity of the information transferor is valid. In other words, it is confirmed that the information transferor is the screen status awareness module designed in this embodiment of this application instead of the function code disguised by the malicious attacker. This verification can further improve the information security of the TEE, for example, ensure that the screen information is not tampered with after coming out of the identity verification module.

The session-key verification module further transmits the decrypted screen information to the adaptive display module.

The adaptive display module is configured to adaptively display the TUI of the TA on the current foldable screen based on the screen information, in other words, the interface of the TUI is adapted to the screen in the display state in the current foldable screen.

According to a third aspect, an embodiment of the present invention provides an electronic device. The electronic device may include one or more processors, a memory, and a foldable screen. The foldable screen may include at least two screens. The one or more processors, the memory, and the foldable screen may be connected through one or more communication buses. The memory stores one or more computer programs, and the one or more processors are configured to execute the one or more computer programs. The one or more computer programs include instructions, and the instructions are used to perform the method steps described in the possible implementations of the first aspect.

According to a fourth aspect, an embodiment of the present invention provides a computer-readable storage medium that stores a computer program, where the computer program includes program instructions. When the program instructions are executed by a processor, the processor is enabled to perform the method described in any embodiment of the first aspect.

According to a fifth aspect, an embodiment of the present invention provides a computer program product. When the computer program product runs on a computer, the method described in any embodiment of the first aspect is implemented.

It may be learned that, in this embodiment of the present invention, for the electronic device having the foldable screen, when the display status of the foldable screen on which the application service is located changes, the screen information (the latest screen information) of the current foldable screen may be transferred to the TEE by using the REF. In this way, the TEE can obtain the screen information of the foldable screen in real time, thereby creating the feasible information transmission channel. The TEE processes the screen information, so that the interface of the TUI is automatically adapted to the screen of the current foldable screen, and the adaptive display of the TUI is implemented by using the software algorithm (rather than the GPU display mode). This can resolve the pain point problem of the user using the foldable screen and greatly improves user experience.

BRIEF DESCRIPTION OF DRAWINGS

FIG. 8(1)-A to FIG. 8(2)-C is a schematic diagram of an application scenario in which a TUI cannot be adapted to a foldable screen in an existing solution;

DESCRIPTION OF EMBODIMENTS

Figure 1A:
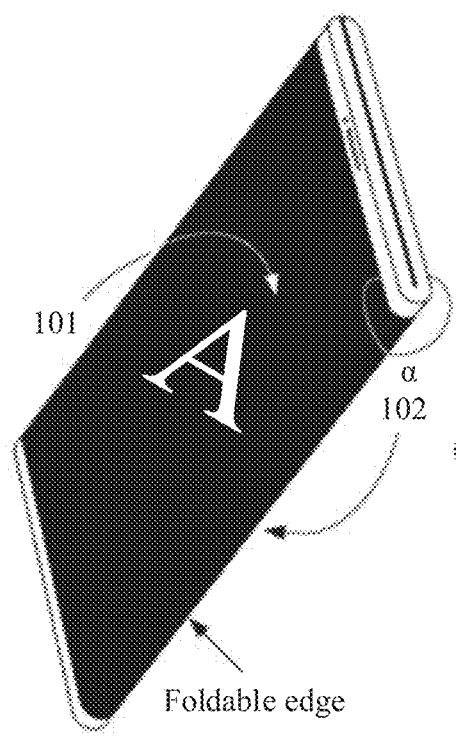
FIG. 1(a) and FIG. 1(b) is an example diagram of a foldable screen according to an embodiment of the present invention.

The following describes technical solutions in embodiments of the present invention in detail with reference to accompanying drawings in the embodiments of the present invention.

Terms "user interface (UI)" and/or "trusted user interface (TUI)" in the specification, claims, and accompanying drawings of the present invention may be a graphical interface for interaction and information exchange between an application or an operating system and a user. The graphical interface may be a window, a dialog box, a display area, or the like that is visible to the user. A user interface of the application may be source code written in a specific computer language, for example, Java or an extensible markup language (extensible markup language, XML). The interface source code is parsed and rendered on a terminal device, and finally presented as content visible to the user, for example, a picture, a text, or a button. A view (view) is a visual component of the user interface. The view is also referred to as a control (control) or a widget (widget). A typical view includes a button (button), a text field (text field), a progress bar (Progress Bar), a keyboard (keyboard), a picture, a text, and the like.

A trusted user interface display method provided in the embodiments of the present invention may be applied to an electronic device having a foldable screen. The electronic device in the embodiments of the present invention may be a device that includes a foldable screen, for example, a mobile phone, a tablet computer, a desktop computer, a laptop computer, a handheld computer, a notebook computer, an ultra-mobile personal computer (ultra-mobile personal computer, UMPC), a netbook, a cellular phone, a personal digital assistant (personal digital assistant, PDA), or an augmented reality (augmented reality, AR)/virtual reality (virtual reality, VR) device. A specific form of the device is not specifically limited in the embodiments of the present invention.

The following first describes the foldable screen.

The electronic device having the foldable screen includes at least two screens, and sizes of the screens may be different or the same. In this specification, the "screen" may also be referred to as a display screen, a screen, a display panel, or the like. In this specification, one screen may refer to one independent and complete screen (or one independent display unit, for example, the screen is controlled by a processor as a whole), or may refer to a partial display area of the complete screen. The electronic device may separately control display states of different screens. Based on control, the display state of the screen may be specifically a state in which display of the screen is enabled (for example, a state in which the screen is turned on), or a state in which display of the screen is disabled (for example, a state in which the screen is turned off). The different screens may be movably connected based on a connection mechanism (for example, a hinge). In some implementations, the exterior of the connection mechanism is also covered with a display screen (which may be referred to as a connection screen or a foldable edge). In this way, the different screens of the foldable screen may be tiled and unfolded into a full screen for display based on external force (for example, unfolded by a user with a hand). Alternatively, the screen may be folded into a single screen for display based on the external force (for example, folded by the user with the hand). For example, when the foldable screen is unfolded into the full screen, an 8-inch full screen may be displayed. When the foldable screen is folded into the singer screen, a 6.6-inch screen or a 6.38-inch screen may be displayed.

Generally, a folding scheme of the foldable screen is nothing more than two. One solution is outward folding, and the other solution is inward folding. The outward folding means folding a screen of the foldable screen in half, and one screen is on the front and the other screen is on the back. The inward folding is to close the screen like a notebook, and then a screen is designed on the outside for display after the foldable screen is folded.

For example, in some embodiments of the present invention, the foldable screen may be a flexible foldable screen. The flexible foldable screen includes a foldable edge made of a flexible material. A part or all of the flexible foldable screen is made of the flexible material. For example, in the flexible foldable screen, only a foldable part (referred to as a connection screen or a foldable edge) is made of the flexible material, and other parts are made of a rigid material. Alternatively, the flexible foldable screen is all made of the flexible material. The foldable screen may be folded along foldable edges to form a plurality of (two or more) screens.

In the embodiments of the present invention, the foldable screen includes at least two screens, and adjacent screens may rotate about a foldable axis, to implement unfolding or folding of the foldable screen. That is, a screen status of the foldable screen may include an unfolded state and a folded state.

The unfolded state indicates that the foldable screen is fully unfolded (that is, the full screen). An included angle of any two screens in the foldable screen is 180°. When the full screen is used for display, a display status of the foldable screen is that each screen in the full screen is in a display state.

The folded state indicates that the foldable screen is fully folded (that is, folded into the single screen). The included angle of the any two screens in the foldable screen is 0° or 360°. When a single screen in the foldable screen is used for display, the display status of the foldable screen is that the single screen is in a display state (or referred to as a turn-on state or a screen-on state), and other single screens is in a turn-off state (or referred to as a no-display state or a black-screen state).

Figure 1B:
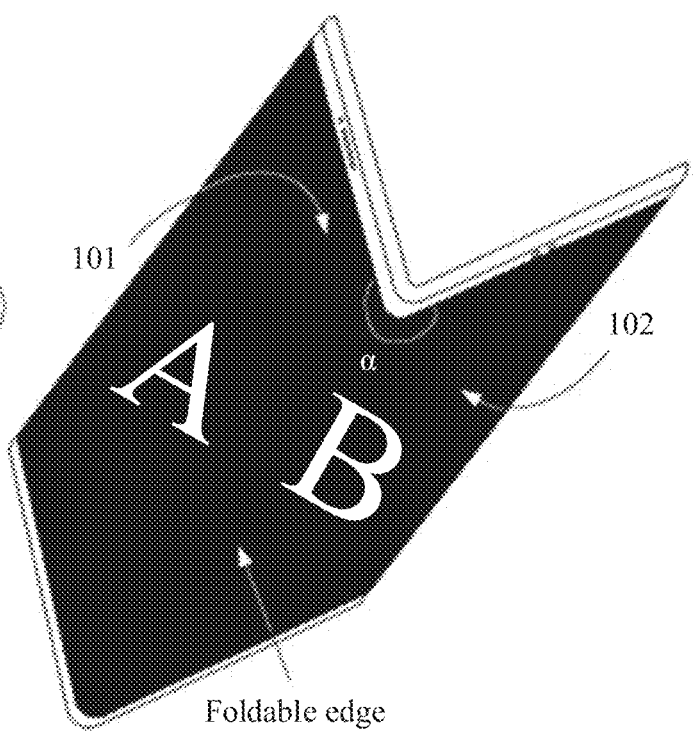
Figure 2A:
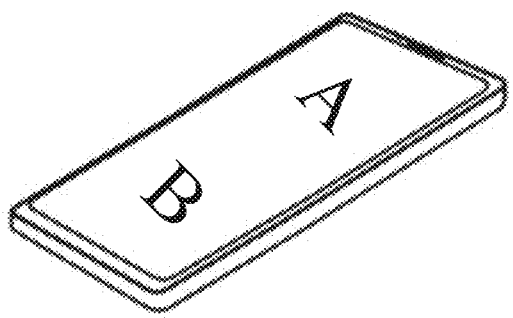
FIG. 2(a) to FIG. 2(d) is an example diagram of a foldable screen according to an embodiment of the present invention.
Figure 2B:
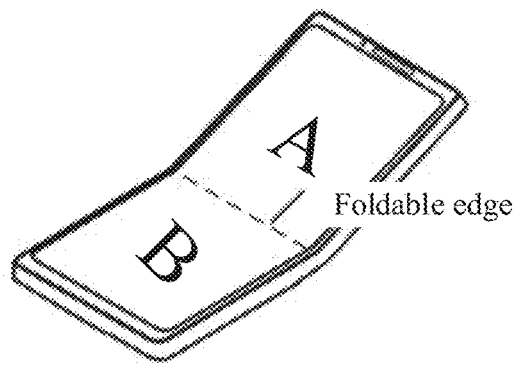
Figure 2D:
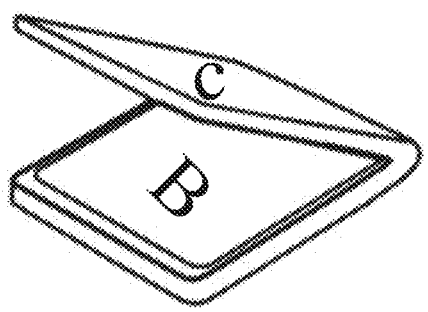
Figure 2C:
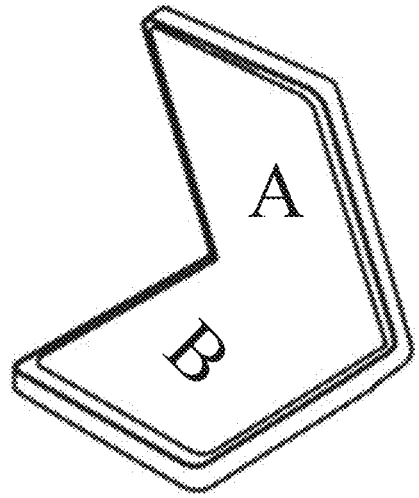

Refer to FIG. 1 (*a*) and FIG. 1 (*b*). A foldable screen shown in FIG. 1 (*a*) and FIG. 1 (*b*) is used as an example. The foldable screen includes two independent single screens and a foldable edge made of a flexible material. The foldable screen is folded outward along the foldable edge, to form a screen A 101 (single screen) and a screen B 102 (single screen) shown in FIG. 1(*a*). An included angle α between the screen A 101 and the screen B 102 is 360°. When a user gradually unfolds the foldable screen, the included angle α between the screen A 101 and the screen B 102 gradually tends to 180° from 360°, as shown in FIG. 1(*b*). It may be understood that when the included angle α between the screen A 101 and the screen B 102 is 180°, the screen is a full screen.

In FIG. 1(*a*) and FIG. 1(*b*), the foldable screen of an electronic device is folded along a longitudinal direction to implement folding of the foldable screen. Certainly, in a possible implementation, the foldable screen of the electronic device may alternatively be folded along a horizontal direction, to implement folding of the foldable screen. This is not limited herein.

Refer to FIG. 2(*a*) to FIG. 2(*d*). A foldable screen shown in FIG. 2(*a*) to FIG. 2(*d*) is used as an example. The foldable screen includes two independent single screens and a foldable edge made of a flexible material. The foldable screen is folded inward along the foldable edge. FIG. 2(*a*) shows that the foldable screen is a full screen. When a user gradually folds the foldable screen, processes shown in FIG. 2(*b*), FIG. 2(*c*), and FIG. 2(*d*) may be successively performed, to fold inward the foldable screen along the foldable edge. It can be understood that, when the foldable screen is the full screen, an included angle between a screen A and a screen B is 180°. In a process of folding the foldable screen inward, the included angle between the screen A and the screen B gradually becomes smaller. When the angle between the screen A and the screen B is 0°, the screen A and the screen B are fully folded together. In this case, a rear screen C may be used for display, in other words, the C screen is a single screen.

In FIG. 2(*a*) to FIG. 2(*d*), the foldable screen of an electronic device is folded along a horizontal direction to implement folding of the foldable screen. Certainly, in a possible implementation, the foldable screen of the electronic device may alternatively be folded along a longitudinal direction, to implement folding of the foldable screen. This is not limited herein.

Figure 3:
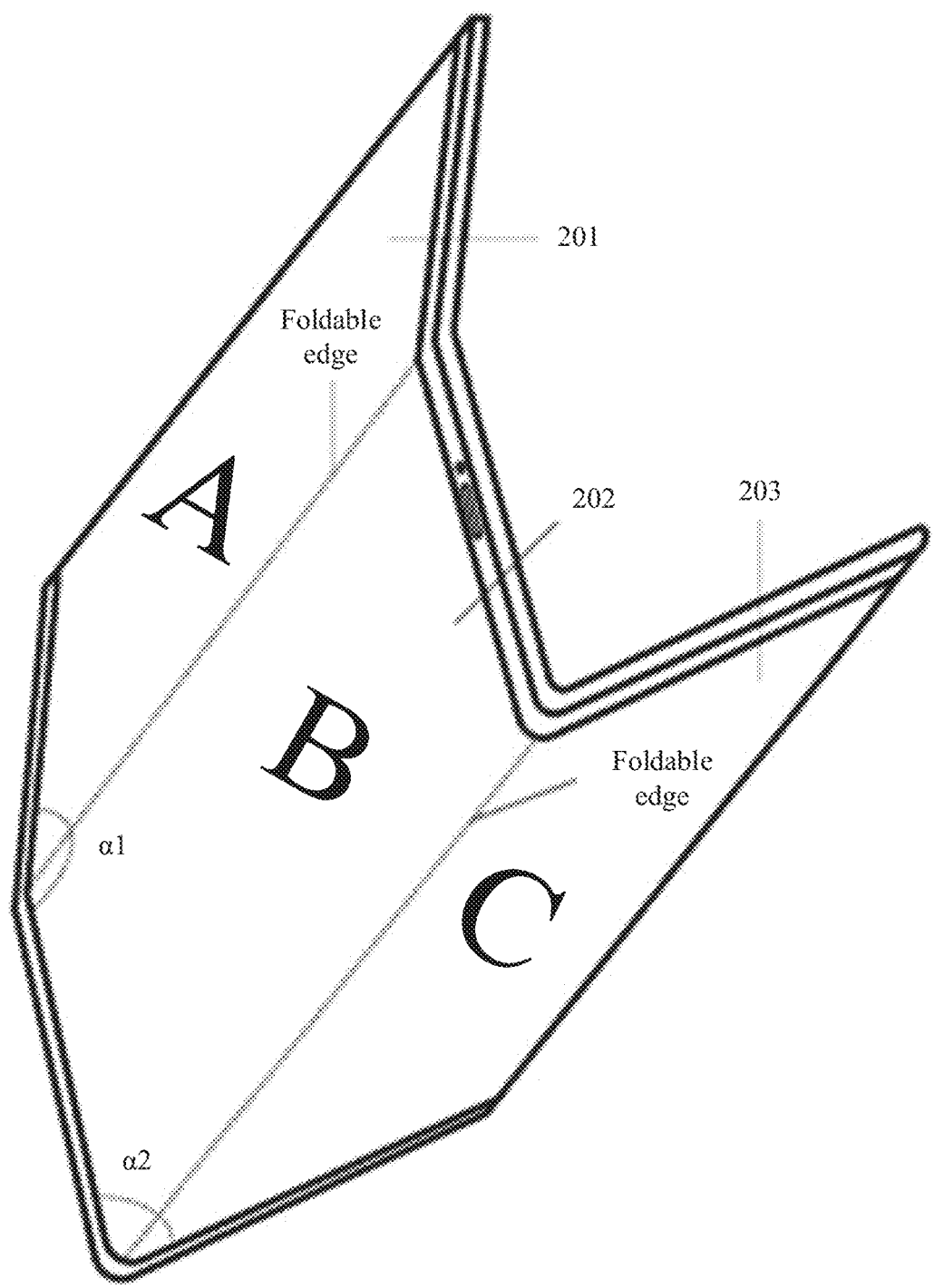
FIG. 3 is an example diagram of a foldable screen according to an embodiment of the present invention.

Refer to FIG. 3. A foldable screen shown in FIG. 3 is used as an example. A multi-screen foldable screen may also include three (or more than three) independent screens, and foldable edges made of a flexible material are between adjacent screens. These screens may successively be connected by using foldable axes. Each screen rotates about a foldable axis to which the screen is connected. These screens can be unfolded into a full screen or folded into a plurality of single screens. As shown in FIG. 3, the foldable screen may be folded outward along the foldable edges. After the foldable screen is folded along the foldable edges, a screen A 201 (single screen), a screen B 202 (single screen), and a screen C 203 (single screen) shown in FIG. 3 may be formed.

It should be noted that the foldable screens shown in FIG. 1(*a*) to FIG. 3 are merely used to explain solutions of the present invention as examples but not limitations.

The following continues to describe the display status of the foldable screen in the embodiments of the present invention and a change of the display status.

Figure 4A:
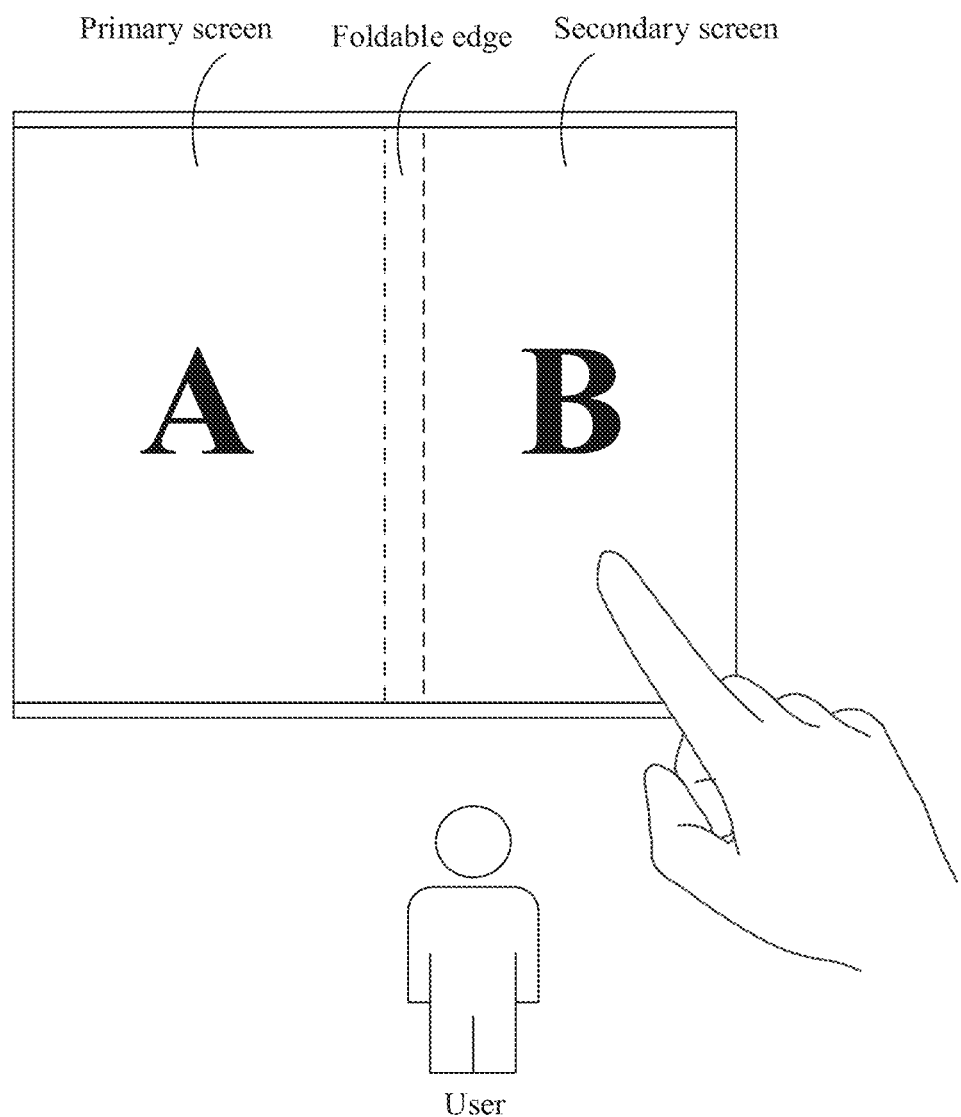
FIG. 4A to FIG. 4C are example diagrams of three display statuses of a foldable screen according to an embodiment of the present invention.
Figure 4B:
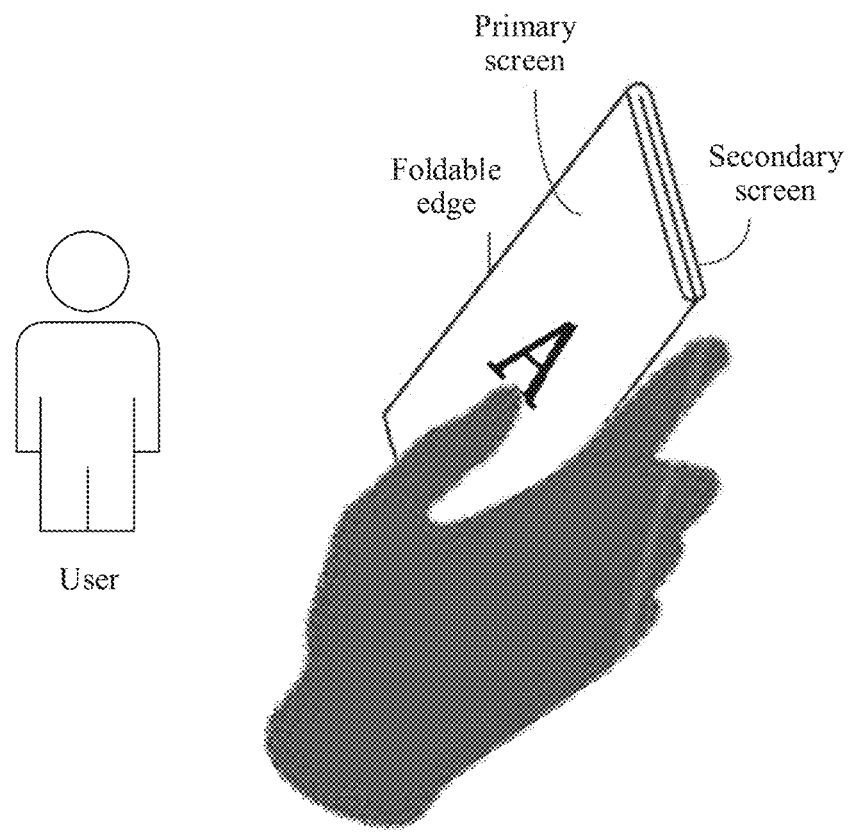
Figure 4C:
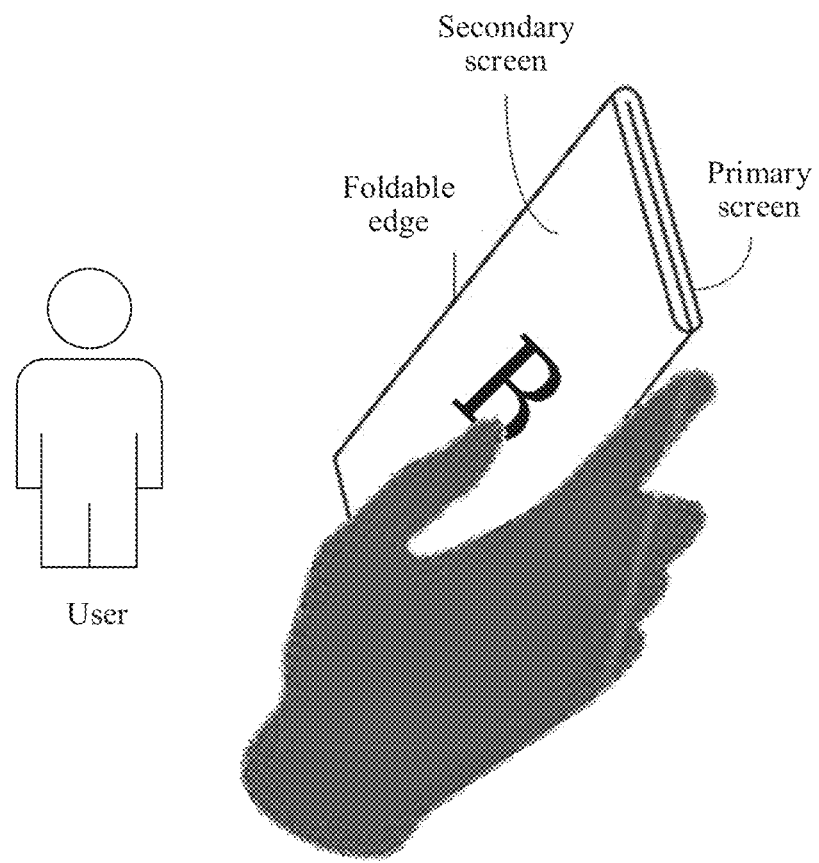

FIG. 4A to FIG. 4C are schematic diagrams of three display statuses of an example foldable screen. The foldable screen may include two independent single screens (a screen A and a screen B) and a foldable edge (or referred to as a connection screen) made of a flexible material. A screen size of the screen A is greater than or equal to a screen size of the screen B. For convenience, it may be defined that the screen A is a primary screen of the foldable screen, and the screen B is a secondary screen of the foldable screen. When the screen A and the screen B are tiled and unfolded, in other words, when an included angle between the screen A and screen B is 180°, a unity formed by the screen A, the screen B, and the foldable edge (or the connection screen) between the screen A and the screen B is referred to as a full screen.

FIG. 4A is a schematic diagram of an unfolded state (the full screen). When the foldable screen is in a working state (a display state), it indicates that the screen A, the screen B, and the connection screen between the screen A and the screen B that are on the full screen are all in the display state. In this way, any area in the full screen may be used to display service content, and a user may perform a related operation on the service content displayed on the full screen. The related operation is not limited to operations such as tapping, sliding, touching, approaching, and pressing.

FIG. 4B is a schematic diagram of a folded state (a single screen). For example, in an implementation, when the foldable screen is in the folded state, the user holds the foldable screen with one hand, so that a thumb of the user is located on a primary screen side, and other fingers are located on a secondary screen side of the foldable screen. That is, a primary screen faces a user direction. In this case, when the foldable screen is in a working state (a display state), the primary screen may be set to the display state, and may be used to display service content, and a secondary screen is not in a display state (for example, no service content is displayed or in a black-screen state).

FIG. 4C is another schematic diagram of a folded state (a single screen). For example, in an implementation, when the foldable screen is in the folded state, a user holds the foldable screen with one hand, so that a thumb of the user is located on a secondary screen side, and other fingers are located on a primary screen side of the foldable screen. That is, a secondary screen faces a user direction. In this case, when the foldable screen is in a working state (a display state), the secondary screen may be set to the display state, and may be used to display service content, and a primary screen is not in a display state (for example, no service content is displayed or in a black-screen state).

In this embodiment of the present invention, the foldable screen of the electronic device includes at least two independent single screens, and the user may perform an operation (or referred to as a first operation) on the electronic device having the foldable screen, to change a working state (a display state) of the foldable screen from a first display status to a second display status. The first display status indicates that at least one of the at least two screens is in a display state, the second display status indicates that at least one of the at least two screens of the foldable screen is in a display state, and a screen corresponding to the first display status is different from a screen corresponding to the second display status.

For example, the first display status may be a display status of the foldable screen described in FIG. 4A to FIG. 4C. The second display status may be another display status of the foldable screen described in FIG. 4A to FIG. 4C.

For example, the first display status may be the display status of the foldable screen shown in FIG. 4B (namely, primary screen display), and the second display status may be the display status of the foldable screen shown in FIG. 4A (namely, full screen display). The user may perform an unfolding operation (the first operation) on the foldable screen, to change the foldable screen from the first display status to the second display status.

For another example, the first display status may be the display status of the foldable screen shown in FIG. 4C (namely, secondary screen display), and the second display status may be the display status of the foldable screen shown in FIG. 4A (namely, full screen display). The user may perform an unfolding operation (the first operation) on a foldable screen, to change the foldable screen from the first display status to the second display status.

For another example, the first display status may be the display status of the foldable screen shown in FIG. 4A (namely, full screen display), and the second display status may be the display status of the foldable screen shown in FIG. 4B (namely, primary screen display). The user may perform a folding operation (the first operation) on the foldable screen, to change the foldable screen from the first display status to the second display status.

For another example, the first display status may be the display status of the foldable screen shown in FIG. 4B (namely, primary screen display), and the second display status may be the display status of the foldable screen shown in FIG. 4C (namely, secondary screen display). The user may perform a flipping operation (the first operation) on the electronic device, to change the foldable screen from the first display status to the second display status.

For another example, the first display status may be the display status of the foldable screen shown in FIG. 4B (namely, primary screen display), and the second display status may be the display status of the foldable screen shown in FIG. 4C (namely, secondary screen display). The user may perform a flipping operation (the first operation) on the electronic device, to change the foldable screen from the first display status to the second display status.

For another example, the first display status may be the display status of the foldable screen shown in FIG. 4C (namely, secondary screen display), and the second display status may be the display status of the foldable screen shown in FIG. 4B (namely, primary screen display). The user may perform a flipping operation (the first operation) on the electronic device, to change the foldable screen from the first display status to the second display status.

It should be noted that, in this specification, the so-called "single screen", "independent single screen", and "screen" should be understood as having a same meaning. These terms are used in this specification for ease of description, and meanings of these terms may refer to one independent and complete screen (or one independent display unit, for example, the screen is controlled by a processor as a whole), or may refer to a partial display area of the complete screen. For example, in FIG. 4A, the primary screen (the screen A) and the secondary screen (the screen B) may be complete screens respectively, or may be two display areas of the full screen (In this case, the full screen may be considered as one independent and complete screen).

It should be further noted that the foldable screens described in the foregoing embodiments and the related accompanying drawings are merely used to explain the technical solutions of this application but are not limited. A shape, an appearance, a material, a folded manner that are of each screen of the foldable screen, a quantity of screens, a connection manner between the screens are not limited, and deployment locations and a quantity of other hardware such as a camera, a sensor, and a buzzer that may exist in the electronic device are not limited.

The following describes a system architecture according to an embodiment of the present invention.

Figure 5:
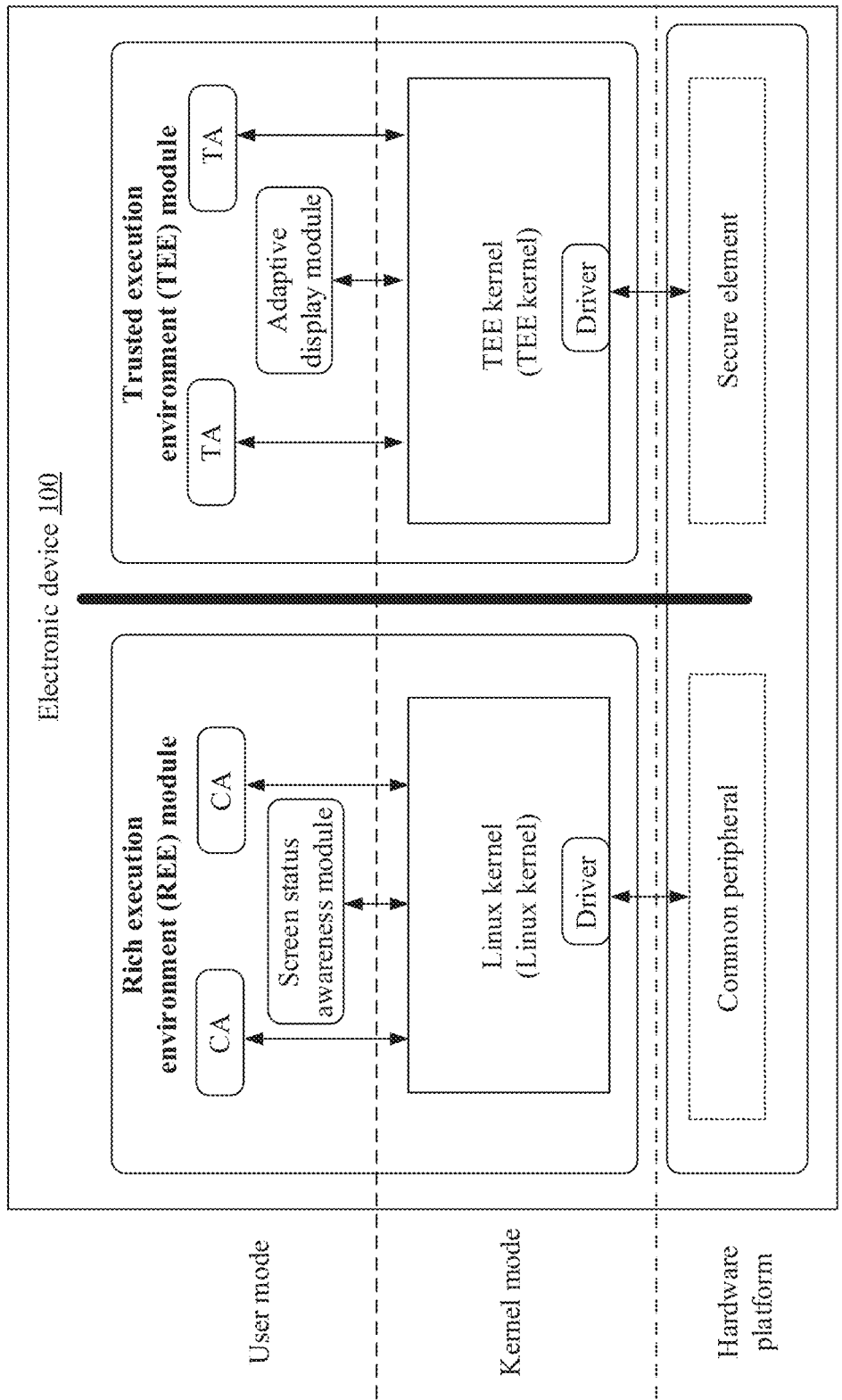
FIG. 5 is an architectural diagram of an electronic device according to an embodiment of the present invention.

FIG. 5 is an architectural diagram of an electronic device 100 according to an embodiment of the present invention. As shown in FIG. 5, the electronic device 100 includes a hardware platform, and two mutually isolated running environments that run on the hardware platform, namely, a rich execution environment (Rich Execution Environment, REE) and a trusted execution environment (Trusted Execution Environment, TEE). The two running environments have independent hardware resources and independent operating systems. In this specification, the REE and the TEE may also be respectively referred to as an REE module and a TEE module. Isolation between the hardware resources of the REE and the TEE may be implemented by using a hardware isolation technology, for example, an ARM® TrustZone mechanism, and isolation between the operating systems corresponding to the REE and the TEE and isolation between applications may be implemented by using a virtualization technology. In this way, a software resource and the hardware resource that can be accessed by the TEE are separated from those of the REE, and the TEE severely restricts data and a function that can be accessed by the application, so that a security level of the TEE satisfies a specific security requirement. Therefore, the TEE may be considered as a secure execution environment. The REE is a running environment outside the TEE. Compared with the TEE, the REE may also be referred to as an insecure execution environment.

The hardware platform of the electronic device 100 includes, for example, a common peripheral and a trusted peripheral. The trusted peripheral includes a secure element (Secure Element, SE) that can be controlled and accessed only by the TEE, for example, a secure memory, a secure clock, or a trusted keyboard. The common peripheral is a device that can be controlled and accessed by the operating system in the REE.

An application running in the TEE is referred to as a trusted application (trusted application, TA), and there may be one or more TAs (only two TAs are used as an example in FIG. 5). An interface of the TA may be referred to as a trusted user interface (Trusted User Interface, TUI). An application running in the REE is referred to as a client application (client application, CA), and there may be one or more CAs (only two CAs are used as an example in FIG. 5). An interface of the CA may be referred to as a user interface (User Interface, UI). For example, the CA may be specifically WeChat Pay, Alipay, an Apple payment application, a Samsung payment application, a Huawei payment application, a bank client, a mobile shield application, an electronic ID card, a mobile POS, or other application software that involves input of sensitive information such as an account number and a password. The TA is a security application corresponding to the CA, and is used to input the sensitive information involved in the CA.

For definitions of terms such as the REE, the TEE, the CA, and the TA in all embodiments of the present invention, refer to a TEE-related standard proposed by the global platform® (Global Platform®, GP).

The TA running in the TEE may provide a security-related function or service for the CA in the REE or another TA in the TEE. The trusted operating system running in the TEE may provide a TEE internal interface for the TA, and the TA obtains access permission of security resources and services through the TEE internal interface. The security resources and services include but are not limited to key injection and management, encryption, secure storage, the secure clock, the trusted user interface (TUI), the trusted keyboard, and the like.

The CA running in the REE may use an external interface provided by the TEE to request a security service provided by the TA in the TEE. The operating system (for example, Android®, iOS®, Windows Phone, and other terminal operating systems) running in the REE provides a richer feature than the trusted operating system in the TEE, and can accept various types of applications. However, the operating system running in the REE, is less secure than the trusted operating system.

For example, in a mobile payment scenario, an online banking transfer scenario, or the like, if sensitive information of a user needs to be input and displayed, the CA in the REE may invoke the TUI and the trusted keyboard service that are in the TEE through the external interface provided by the TEE, to prevent the application in the REE from intercepting and stealing the sensitive information of the user.

An architecture based on a Linux system (for example, the Android® operating system) may be further classified into a user mode (User Mode) and a kernel mode (Kernel Mode). A kernel is essentially software, controls hardware resources of a computer, and provides an environment in which an upper-layer application runs. The user mode is active space of the upper-layer application. Execution of the application needs to depend on resources provided by the kernel, including a CPU resource, a storage resource, an I/O resource, and other resources. To enable the upper-layer application to access these resources, the kernel needs to provide an interface for access for the upper-layer application, that is, system invocation.

It should be understood that the CA runs in a user mode of the REE, and the TA runs in a user mode of the REE. A driver module is deployed in a kernel mode of the REE (for example, a TZ driver function is included, and the TZ driver function provides a driver interface for the REE to access the TEE). A driver module is also deployed in a kernel mode of the TEE. The driver module in the REE and the driver module in the TEE both can access corresponding hardware devices. For example, the TA may display the UI of the CA on the display screen by invoking a GPU. The driver module of the REE may further include a TUI-switch (TUI-switch) function or a TUI-agent (TUI-agent) function. In addition, an REE control module may be further deployed in the REE. For example, the REE control module may include a daemon (daemon) function (not shown in the figure). A TEE control module (not shown in the figure) may be further deployed in the TEE. The CA can access the TA by using the REE control module and the TEE control module to implement a corresponding secure operation. For example, the REE control module may invoke, based on a TUI access request (or a TUI display request) of the CA, the driver module in the REE to drive the hardware device to exit an insecure working mode. After the hardware device exits the insecure working mode, the TEE control module may invoke, based on a message sent by the REE control module, the driver module in the TEE to drive the hardware device to switch a working mode, so as to implement hardware isolation from the REE; and then may invoke the corresponding TA, to access, sign, and confirm the TA by the CA, and display the TUI of the TA on the display screen. Specific functions of the driver module of the REE, the driver module of the TEE, the REE control module, the TEE control module, and the like may be implemented by using a processor in the electronic device.

In this embodiment of the present invention, to enable the trusted user interface (TUI) of the TA corresponding to the CA to automatically adapt to a screen change of the foldable screen, a screen status awareness module is further deployed in the user mode of the REE, and an adaptive display module is further deployed in the user mode of the TEE.

The screen status awareness module may be a daemon (daemon) of a system service. In this embodiment of the present invention, the screen status awareness module may be configured to monitor a display status of the foldable screen. For example, the screen status awareness module can monitor a broadcast in the Android® operating system. When the display status of the foldable screen changes, the Android® operating system broadcasts a change event of the display status of the foldable screen. The screen status awareness module obtains screen information through monitoring, where the screen information is used to indicate a current display status of the foldable screen. For example, the screen information may include respective information of display states of different screens in a current foldable screen. Further, the screen information may further include information such as sizes and resolution of the different screens in the foldable screen.

The screen status awareness module may further send the screen information to the adaptive display module in the TEE. For example, the screen status awareness module may invoke the TUI-switch function or the TUI-agent function, and use a global task function in the TEE to send the screen information to the adaptive display module.

In an implementation, the screen status awareness module may include a code program of a monitoring function and program code of a TEE transmission function. The code program of the monitoring function may be used to obtain screen information of the current foldable screen by monitoring a system broadcast (for example, an Android system broadcast). The program code of the TEE transmission function may be used to send the screen information to the TEE. For example, the screen information may be transmitted to the TEE by using a TUI agent.

In an implementation, the screen status awareness module may include the code program of the monitoring function and the program code of the TEE transmission function. The code program of the monitoring function may be used to obtain the screen information of the current foldable screen by monitoring the system broadcast (for example, the Android system broadcast), and further used to send the screen information to the GPU, so that the GPU implements adaptive display of the UI interface. The program code of the TEE transmission function may be used to send the screen information to the TEE. For example, the screen information may be transmitted to the TEE by using the TUI agent.

The adaptive display module is configured to adaptively display the TUI of the TA on the current foldable screen based on the screen information, in other words, an interface of the TUI is adapted to a screen in the display state in the current foldable screen. Specifically, the adaptive display module dynamically stores received screen information. In other words, when new screen information is received, old screen information is locally replaced with the new screen information. The adaptive display module may perform coordinate transformation processing based on the screen information to obtain processed screen information. The adaptive display module processes, based on the processed screen information, a size, resolution, and the like of the invoked TUI of the TA, to implement the adaptive display of a screen of the foldable screen by the TUI.

In this specification, the interface may also be referred to as an application programming interface (Application Programming Interface, API), and is an encapsulation and abstract expression of a specific function implemented by computer program code. The application may implement a specific function by invoking the interface. The service (for example, the system service) is an application component that can be executed in the background without providing the user interface. The service may be started by another application or application component.

It may be learned that, in this embodiment of the present invention, for the electronic device having the foldable screen, when the display status of the foldable screen on which an application service is located changes, the screen information (latest screen information) of the current foldable screen may be transferred to the TEE by using the screen status awareness module. In this way, the TEE can obtain the screen information of the foldable screen in real time, thereby creating a feasible information transmission channel. The adaptive display module processes the screen information, so that the interface of the TUI is automatically adapted to the screen of the current foldable screen. This can resolve a pain point problem of a user using a foldable screen and greatly improves user experience.

Figure 6:
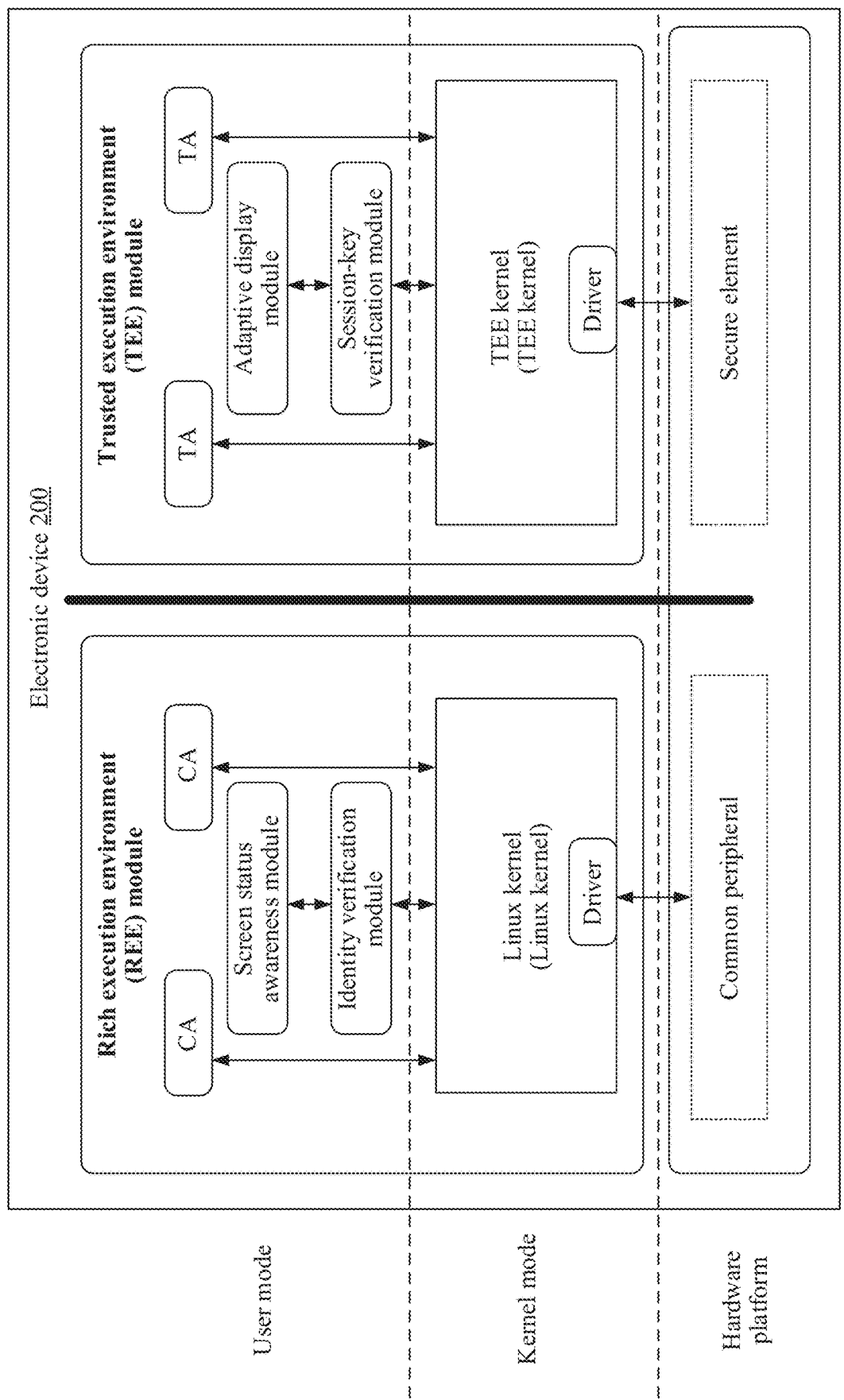
FIG. 6 is an architectural diagram of an electronic device according to an embodiment of the present invention.

FIG. 6 is an architectural diagram of still another electronic device 200 according to an embodiment of the present invention. As shown in FIG. 6, the electronic device 200 also includes a hardware platform, and two mutually isolated running environments running on the hardware platform, namely, an REE and a TEE. The two running environments have independent hardware resources and independent operating systems. In this specification, the REE and the TEE may also be respectively referred to as an REE module and a TEE module. Isolation between the hardware resources of the REE and the TEE may be implemented by using a hardware isolation technology, and isolation between the operating systems corresponding to the REE and the TEE and isolation between applications may also be implemented.

An architecture difference between the electronic device 200 shown in FIG. 6 and the electronic device 100 shown in FIG. 5 mainly lies in that, to ensure security of screen information transmission, in an architecture of the electronic device 200 shown in FIG. 6, in a user mode of the REE, not only a screen status awareness module is deployed, but also an identity verification module is deployed; and in a user mode of the TEE, not only an adaptive display module is deployed, but also a session-key (session-key) verification module is deployed.

The screen status awareness module may be a daemon (daemon) of a system service. In this embodiment of the present invention, the screen status awareness module may be configured to monitor a display status of a foldable screen. For example, the screen status awareness module can monitor a broadcast in an Android® operating system. When the display status of the foldable screen changes, the Android® operating system broadcasts a change event of the display status of the foldable screen. The screen status awareness module obtains screen information through monitoring, where the screen information is used to indicate a current display status of the foldable screen. For example, the screen information may include respective information of display states of different screens in a current foldable screen. Further, the screen information may further include information such as sizes and resolution of the different screens in the foldable screen.

Further, the screen information further includes a challenge value (or a random number), and the screen status awareness module performs encryption processing (for example, performs encryption in a symmetric encryption manner) on the screen information to obtain encrypted screen information.

Alternatively, optionally, the screen status awareness module performs the encryption processing (for example, performs the encryption in the symmetric encryption manner) on the screen information. Then, the screen status awareness module may encapsulate the encrypted screen information and the challenge value (or the random number) into a data packet.

The screen status awareness module may further send the encrypted screen information or the data packet to the identity verification module in the REE.

The identity verification module is configured to determine an identity of an information transferor (for example, an identity of the screen status awareness module in this specification), and allow only the system service to invoke an information transfer interface. Specifically, the identity verification module may obtain identity information of the information transferor by using daemon (process) information, to determine whether the information transferor is the system service. In this way, when the information transferor is the screen status awareness module designed in this embodiment of this specification, because the identity verification module may determine that the screen status awareness module is the system service, the identity verification module allows the screen status awareness module to invoke the information transfer interface (invoke a TUI-switch function or a TUI-agent function), and sends the encrypted screen information or the data packet to the TEE. When the information transferor is function code disguised by a malicious attacker, the identity verification module confirms that the information transferor is not the system service and rejects the information transferor to invoke a related interface. This prevents insecure information from being transmitted to the TEE and ensures information security of the REE and the TEE.

In this embodiment of the present invention, the session-key verification module and the adaptive display module may be separately deployed in the user mode of the TEE, or the adaptive display module and the session-key verification module may be deployed in the user mode of the TEE together after functions of the adaptive display module and the session-key verification module are integrated. For convenience, the following describes a solution by using an example in which the session-key verification module and the adaptive display module may be separately deployed in the user mode of the TEE.

After receiving the encrypted screen information or the data packet transmitted by the REE, a global task function in the TEE sends the encrypted screen information or the data packet to the session-key verification module.

The session-key verification module is configured to decrypt the screen information, and verify the identity information of the information transferor based on the challenge value (the random number) carried by the session-key verification module. For example, when the challenge value (the random number) is verified correctly, it is confirmed that the identity of the information transferor is valid, that is, it is confirmed that the information transferor is the screen status awareness module designed in this embodiment of this application, instead of the function code disguised by the malicious attacker. This verification can further improve the information security of the TEE, for example, ensure that the screen information is not tampered with after coming out of the identity verification module.

The session-key verification module further transmits the decrypted screen information to the adaptive display module.

The adaptive display module is configured to adaptively display a TUI of a TA on the current foldable screen based on the screen information, in other words, an interface of the TUI is adapted to a screen in a display state in the current foldable screen. Specifically, the adaptive display module dynamically stores received screen information, in other words, when new screen information is received, old screen information is locally replaced with the new screen information. The adaptive display module may perform coordinate transformation processing based on the screen information to obtain processed screen information. The adaptive display module processes, based on the processed screen information, a size, resolution, and the like of the invoked TUI of the TA, to implement adaptive display of a screen of the foldable screen by the TUI.

It may be learned that, in this embodiment of the present invention, for the electronic device having the foldable screen, when the display status of the foldable screen on which an application service is located changes, screen information (latest screen information) of the current foldable screen may be encrypted by using the screen status awareness module, and transferred to the adaptive display module in the TEE. In this way, the TEE can obtain the screen information of the foldable screen in real time. In addition, in this process, the identity verification module is used to perform preliminary identity verification in the REE, and the session-key verification module is used to perform further identity verification in the TEE, to build a secure and reliable information transmission channel, so as to ensure the information security of the REE and the TEE. The adaptive display module processes the screen information, so that the interface of the TUI is automatically adapted to the screen of the current foldable screen. This can resolve a pain point problem of a user using a foldable screen and greatly improve user experience.

Figure 7:
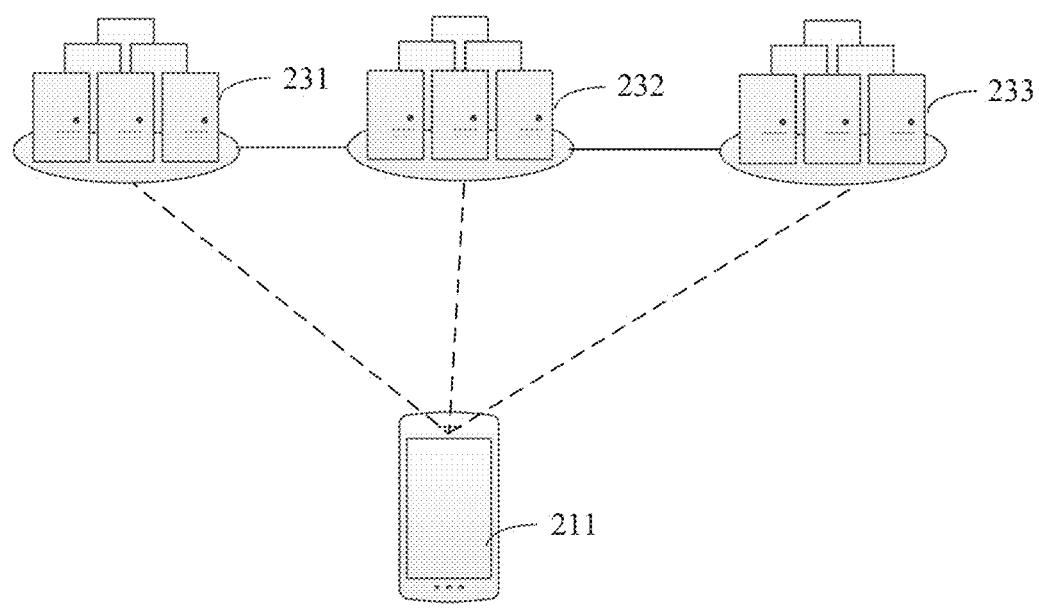
FIG. 7 is a schematic diagram of a system architecture according to an embodiment of the present invention.

FIG. 7 is a schematic diagram of a system architecture according to an embodiment of the present invention. The system architecture includes a bank server 231, a CFCA system server 232, an enterprise server 233, and an electronic device 211 having a foldable screen. The electronic device 211 may separately perform communication, for example, wireless communication, with the bank server 231, the CFCA system server 232, and the enterprise server 233. The bank server 231, the CFCA system server 232, and the enterprise server 233 may also perform communication, for example, wired or wireless communication, with each other. The CFCA stands for China financial certification authority (China Financial Certification Authority).

For example, the bank server 231 may include a mobile banking management system, a CFCA application frontend, a bank RA system, and the like.

For example, the CFCA system server 232 may include a CFCA TSM, an RA system, a CA system, a mobile certificate application platform, and the like. The RA system is responsible for recording and reviewing information of a certificate applicant, and issues a certificate to the certificate applicant. The CFCA TSM is a trusted service manager and is configured to manage a security domain of an SE, including managing an applet and a cos, and distributing a U-shield certificate. The CA system is responsible for issuing and maintaining a certificate.

For example, the enterprise server 233 may include an eSE TSM; and is configured to implement a security domain in an SE of a terminal (creation of an SSD), and distribute an SE management key to the CFCA TSM.

For example, the electronic device may include an REE and a TEE. The REF can run a CA, display a UI, interact with a user, and run a CFCA plug-in unit. The TEE can run a TA (for example, a CFCA TA), display a TUI, and interact with the user. In addition, the REE may further include a screen status awareness module, an identity verification module, and the like provided in the embodiments of the present invention. The TEE may further include an adaptive display module, a session-key verification module, and the like provided in the embodiments of the present invention. The electronic device may include a security element (SE) module.

The CFCA plug-in unit is a service procedure initiation module, receives a U-shield certificate management request from the user (for example, receives the U-shield certificate management request by using a bank apk or a mobile wallet), and executes service logic.

The CFCA TA may be a service processing module in the TEE of a mobile U-shield; and is configured to invoke a fingerprint TA (FP TA) and the TUI based on the service logic, and communicate with the security element (SE) module. The FP TA is configured to implement a fingerprint-based user identity verification function and is invoked by the CFCA TA to obtain an identity verification result.

The TUI is configured to confirm user transaction information and display an identity verification interface in a secure environment.

The SE module implements security domain creation, applet management, user identity verification, U-shield certificate storage, and transaction information signature functions. For example, the applet and the U-shield certificate are put in the SE for protection. The SE may include an ISD and the SSD. The ISD is a primary security domain. The primary security domain in the SE is responsible for production line configuration and basic SE management. The SSD is a secondary security domain in the SE and is used to install the applet.

In this embodiment of the present invention, display of a trusted user interface TUI on a display screen may be triggered based on an operation (a second operation) of the user. After mobile payment, mobile banking, online banking transfer, or any other service that needs to invoke the TA is initiated, the CA runs on an operating system of the REE, and an interface of the UI of the CA is adaptively displayed on the foldable screen. It may be understood that the interface of the UI is a graphical interface for interaction and information exchange between the CA and the user. Therefore, the user may perform a related operation on service content presented by the UI. The operation is not limited to operations such as tapping, sliding, touching, approaching, pressing, information input, information uploading, and information downloading.

When a service processing process reaches a step that an interface of the TUI of the TA is to be invoked, the user needs to perform an operation on the UI of the CA. The operation may also be referred to as the second operation in this specification. The second operation is not limited to operations such as tapping, sliding, touching, approaching, pressing, information input, information uploading, and information downloading. The TUI is invoked and displayed on the foldable screen based on the second operation performed by the user on the UI of the CA. Based on the architecture shown in FIG. 5 or FIG. 6 designed in the present invention, the TUI may be adapted to a current foldable screen.

FIG. 8(1)-A to FIG. 8(2)-C shows an application scenario in which a TUI cannot be adapted to a foldable screen in an existing solution.

In a scenario in FIG. 8(1)-A and FIG. 8(1)-B, a user logs in to a mobile banking application (namely, a CA) in an REE in an electronic device, and a UI (namely, a transfer interface in the figure) of the mobile banking application is presented on a current foldable screen. In the figure, the current foldable screen is in a single screen (for example, a primary screen) display state. After the user enters an amount and taps "next page" on the transfer interface, a TUI of a TA required by the mobile banking application is invoked and presented on the single screen.

In a scenario in FIG. 8(2)-A to FIG. 8(2)-C, a user logs in to a mobile banking application in an REE in an electronic device, and a UI (namely, a transfer interface in the figure) of the mobile banking application is presented on a current foldable screen. In the figure, the current foldable screen is in a single screen (for example, a primary screen) display state. In this case, the user unfolds the foldable screen from a single screen to a full screen for convenience. The transfer interface may be adaptively displayed on the full screen based on a display method formulated in the existing REE (for example, the transfer interface occupies the entire full screen). After the user enters an amount and taps "next page" on the transfer interface, a TUI of a TA required by the mobile banking application is invoked. Because the TUI cannot sense a change of the screen, the TUI is still presented on a single screen (for example, a primary screen) area in a full screen state. Another display area (for example, a secondary screen area) of the full screen is used to display other content, for example, a partial wallpaper interface that is displayed by default.

Compared with FIG. 8(1)-A and FIG. 8(1)-B, and FIG. 8(2)-A to FIG. 8(2)-C, it is not hard to see that, when a display status of the screen changes, an interface of the UI in the REE may change in the foldable screen before and after the display status of the screen changes, that is, adaptive display may be performed. However, an interface of the TUI in the TEE does not change in the foldable screen before and after the display status of the screen changes, and cannot be adaptively displayed based on the change of the foldable screen. Consequently, this brings poor use experience to the user.

However, this embodiment of the present invention can resolve the foregoing problem, and implement that the TUI is adapted to the foldable screen. In this specification, that the TUI is adapted to the foldable screen means that an interface of the TUI displayed on the foldable screen also changes in response to a change of the display status of the foldable screen. A change of the interface of the TUI displayed on the foldable screen may include a combination of one or more of the following changes: a change of an interface size of the TUI, a change of a location of a display area of the TUI on the foldable screen, a change of an interface shape of the TUI, a change of an interface color of the TUI, and a change (adjustment) of a content layout of the TUI on the foldable screen.

It should be understood that, in the embodiments of this specification, that the TUI is "adapted" to the foldable screen and that the TUI is "adaptively displayed" on the foldable screen may be understood as a same meaning, and are used in this specification for ease of description.

Figure 9:
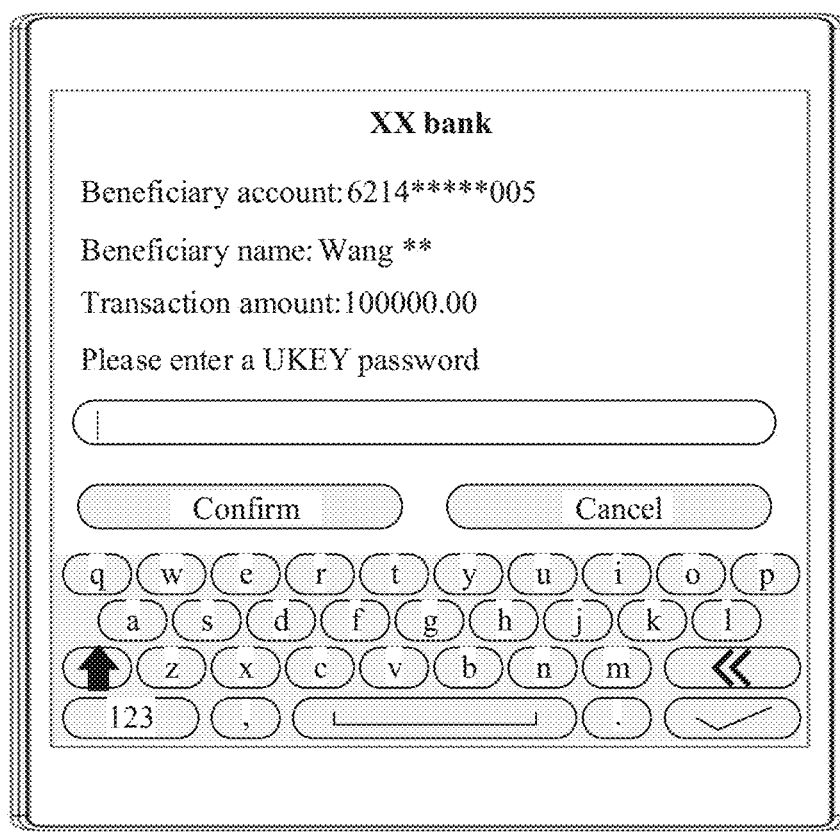
FIG. 9 is a schematic diagram of an application scenario in which a TUI is adapted to a foldable screen according to an embodiment of the present invention.

For example, in an implementation, that the TUI is adapted to the foldable screen may be that on the foldable screen before and after the interface of the TUI changes, an interface size of the TUI changes, and the TUI keeps occupying a screen corresponding to the display status of the foldable screen. For example, in single screen display, the interface of the TUI occupies the single screen, for example, the TUI shown in FIG. 8(2)-A to FIG. 8(2)-C. When the single screen is unfolded into a full screen, the interface of the TUI may occupy the full screen, as shown in a TUI in FIG. 9.

Figure 10:
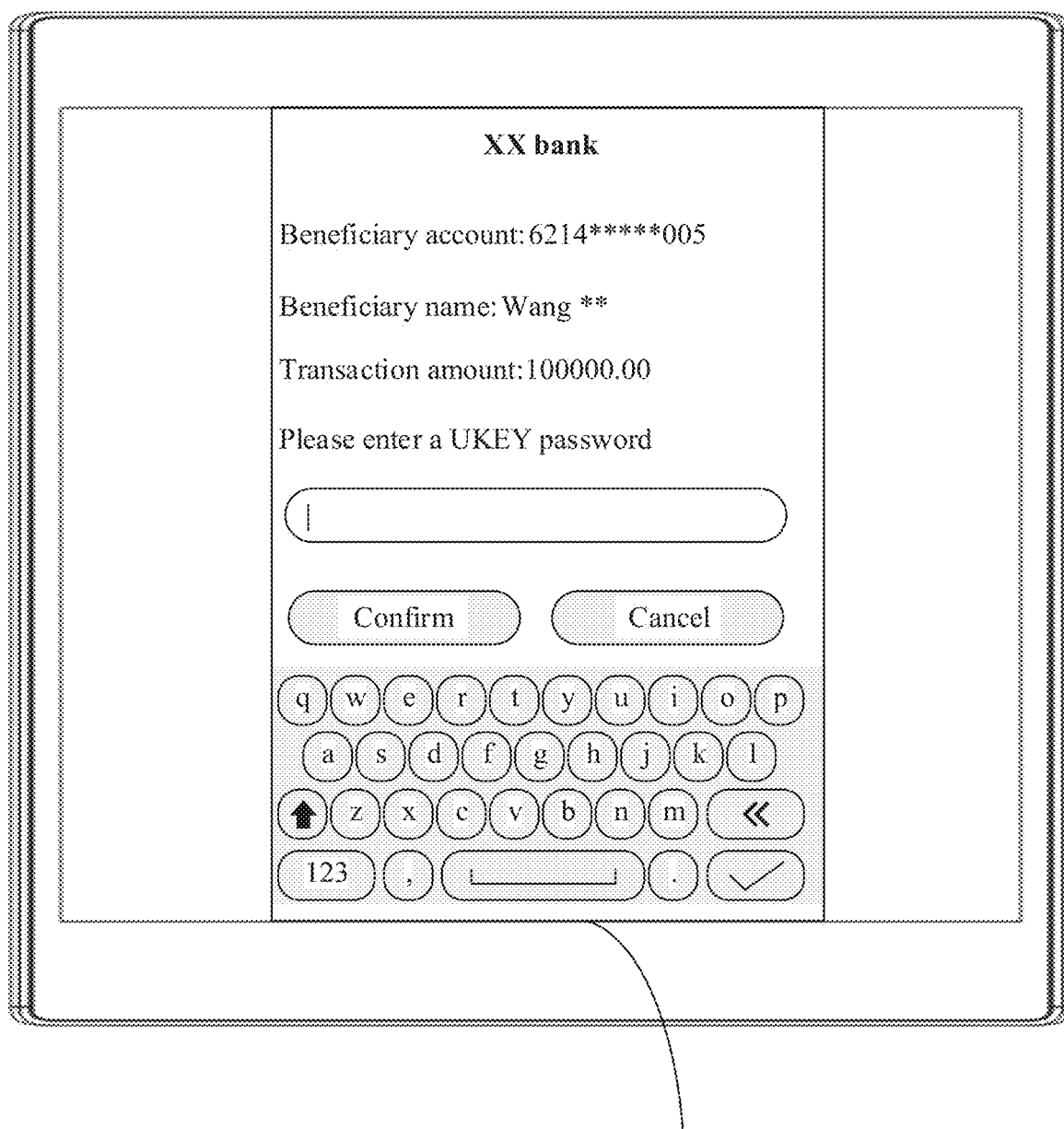
FIG. 10 is a schematic diagram of an application scenario in which a TUI is adapted to a foldable screen according to an embodiment of the present invention.

For another example, in an implementation, that the TUI is adapted to the foldable screen may be that on the foldable screen before and after the interface of the TUI changes, a location of the display area of the TUI changes. For example, in primary screen display, the interface of the TUI occupies the primary screen, for example, the TUI shown FIG. 8(2)-A to FIG. 8(2)-C. However, when the primary screen is unfolded to a full screen, a size of the interface of the TUI may not change, and a location of the display area of the TUI changes, as shown in a TUI in FIG. 10. The location of the display area of the TUI moves to a middle location instead of an original primary screen location. In this case, the TUI occupies only a part of the screen in the full screen instead of occupying the full screen.

Figure 11:
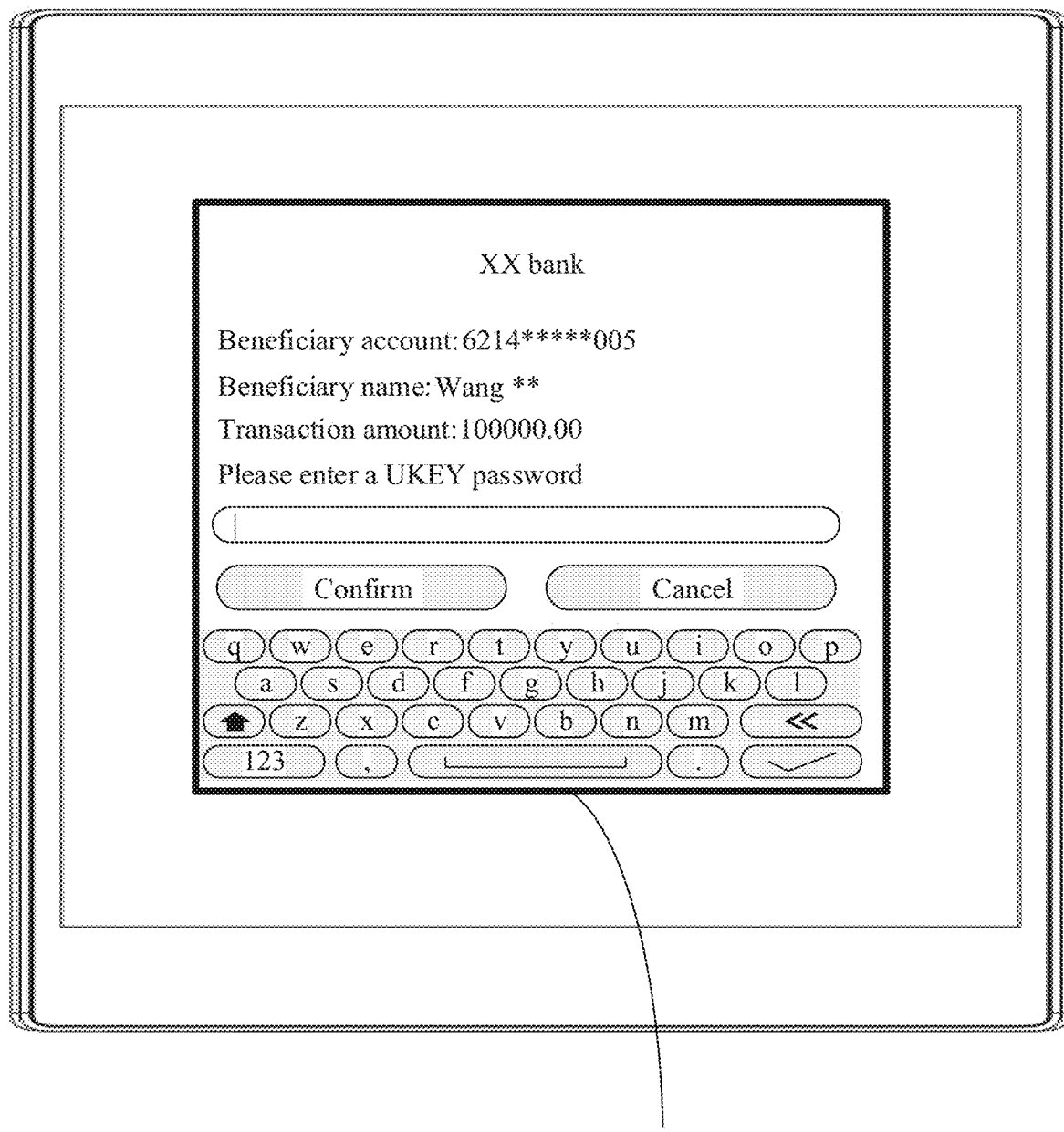
FIG. 11 is a schematic diagram of an application scenario in which a TUI is adapted to a foldable screen according to an embodiment of the present invention.

For another example, in an implementation, that the TUI is adapted to the foldable screen may be that on the foldable screen before and after the interface of the TUI changes, an interface shape of the TUI changes. For example, in primary screen display, the interface of the TUI occupies the primary screen, for example, the TUI shown FIG. 8(2)-A to FIG. 8(2)-C. However, when the primary screen is unfolded into a full screen, an interface shape of the TUI changes, as shown in a TUI in FIG. 11. In this case, the TUI may occupy only a part of the screen in the full screen instead of occupying the full screen.

Figure 12:
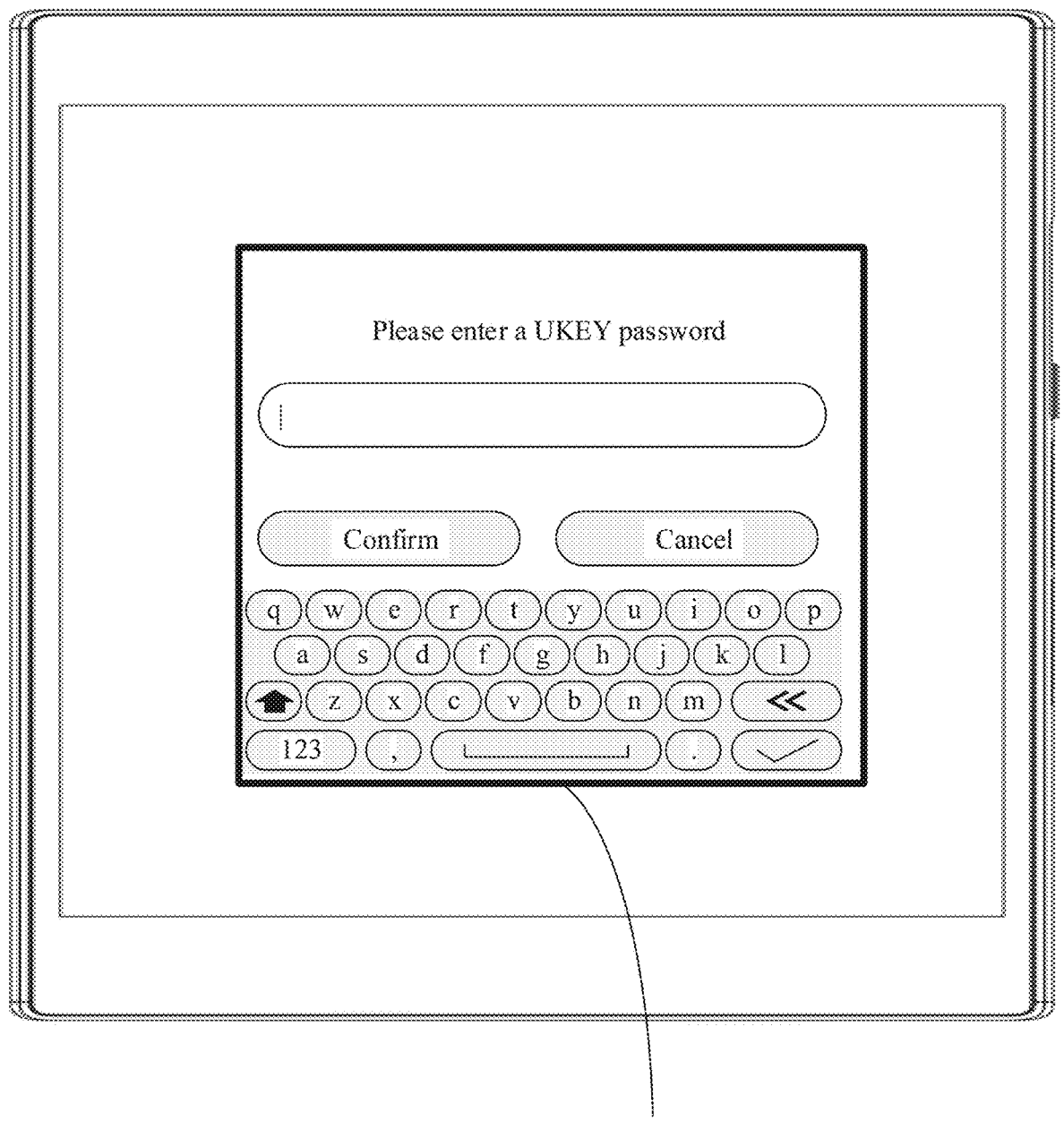
FIG. 12 is a schematic diagram of an application scenario in which a TUI is adapted to a foldable screen according to an embodiment of the present invention.
Figure 13A:
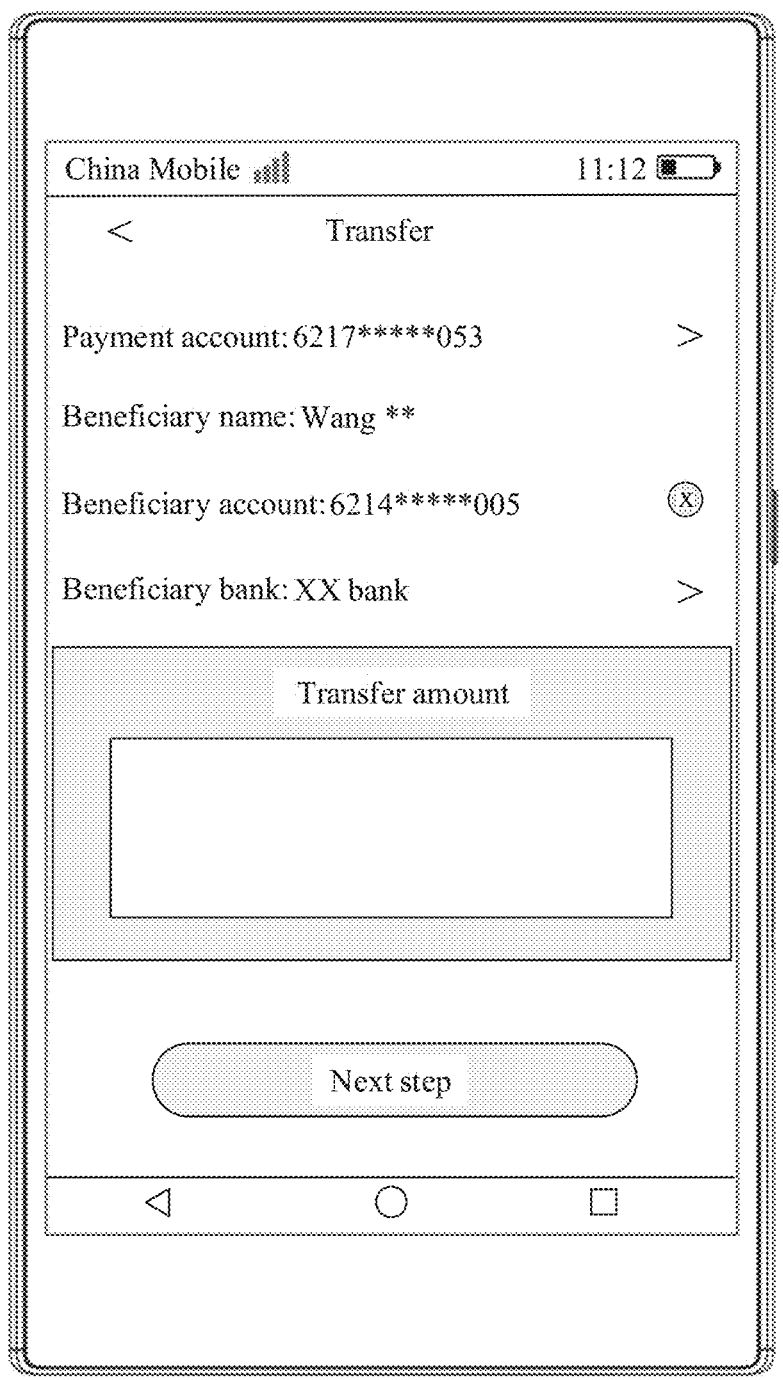
FIG. 13A to FIG. 13D is a schematic diagram of an application scenario of mobile phone bank transfer according to an embodiment of the present invention.
Figure 13B:
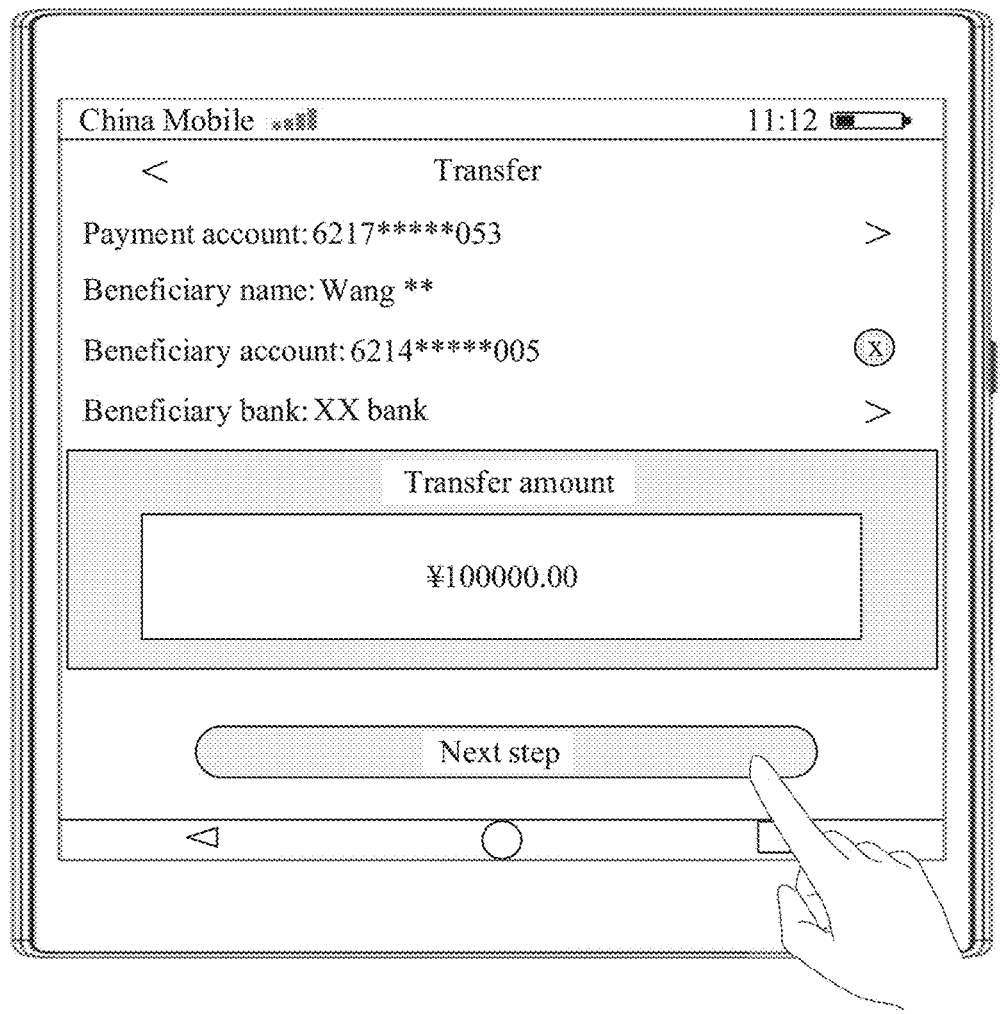
Figure 13C:
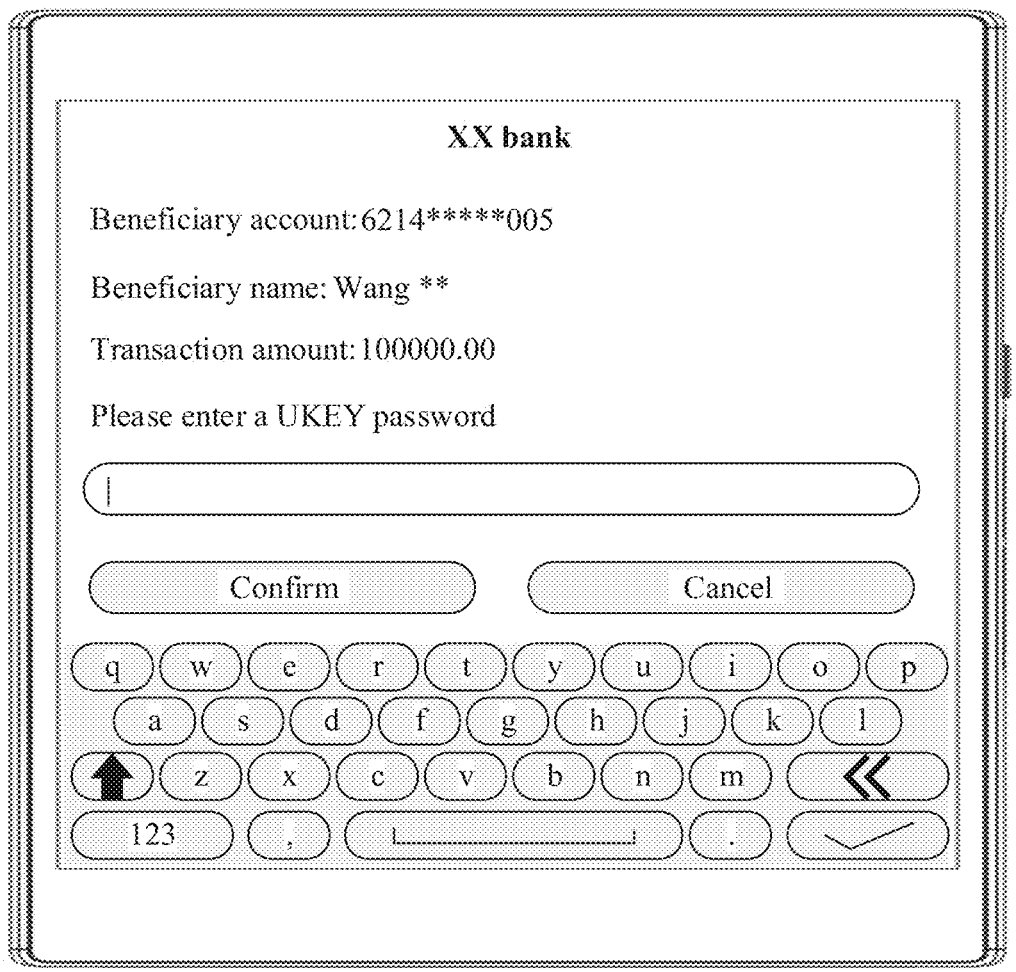
Figure 13D:
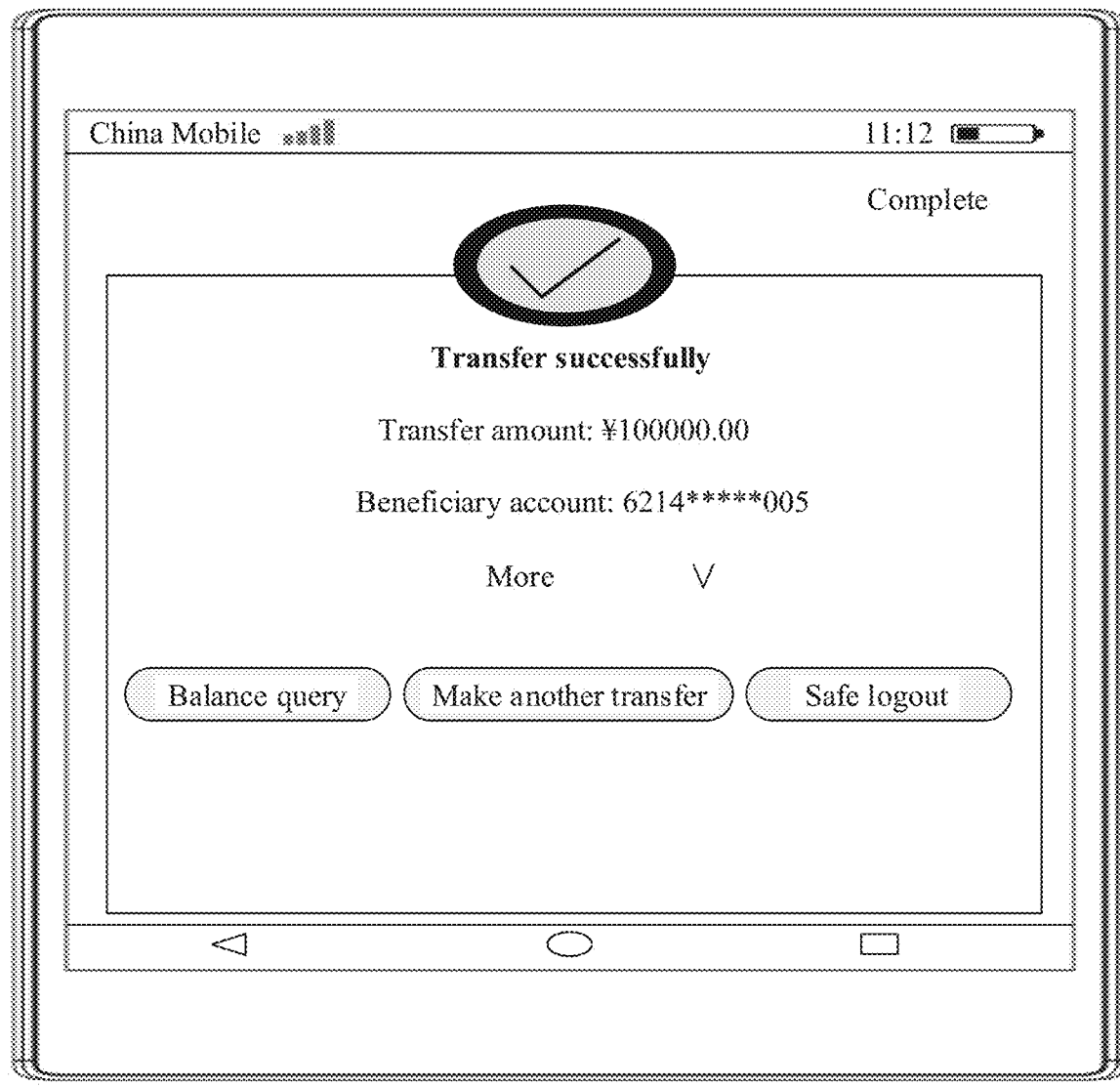
Figure 14A:
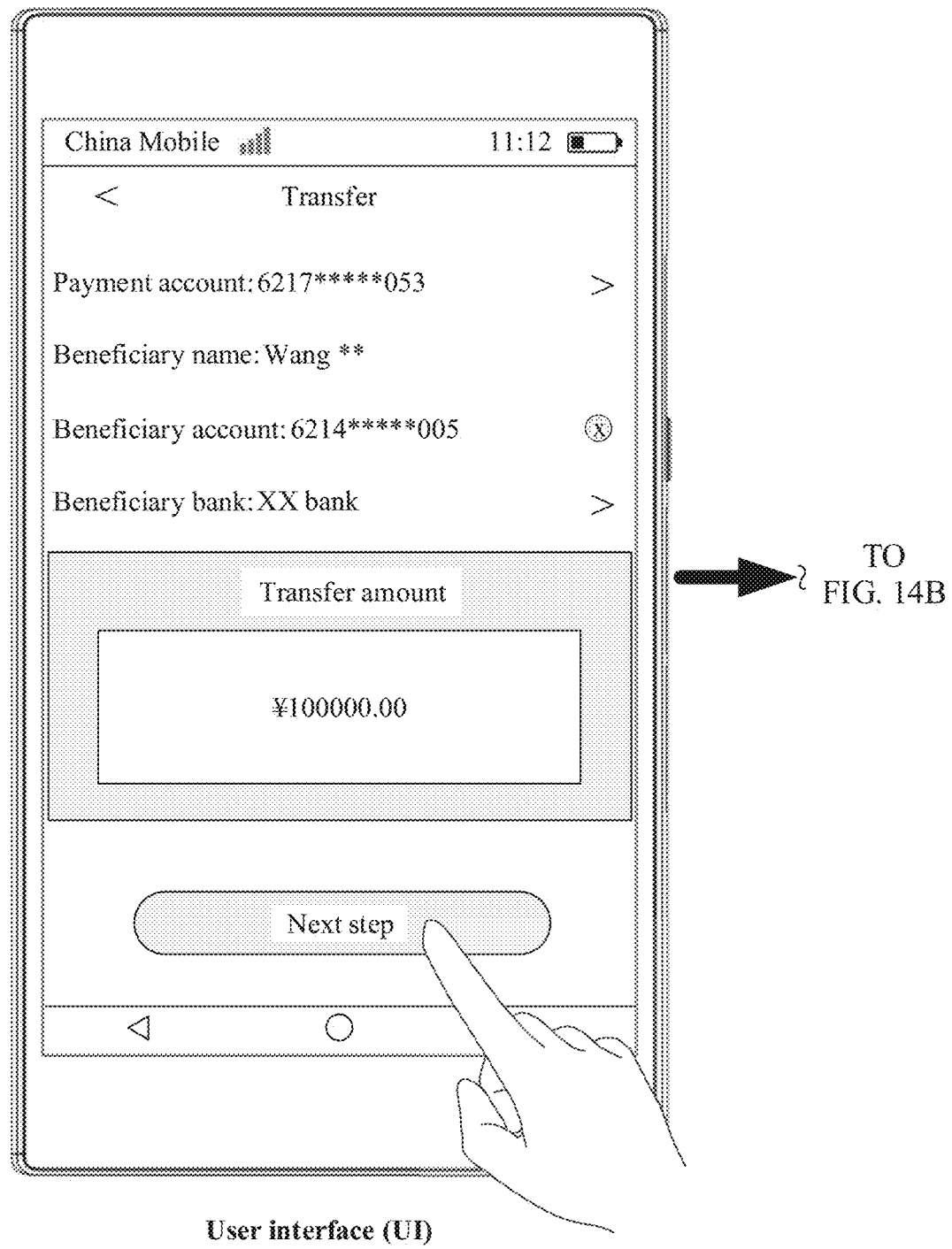
FIG. 14A to FIG. 14E is a schematic diagram of an application scenario of mobile phone bank transfer according to an embodiment of the present invention.
Figure 14B:
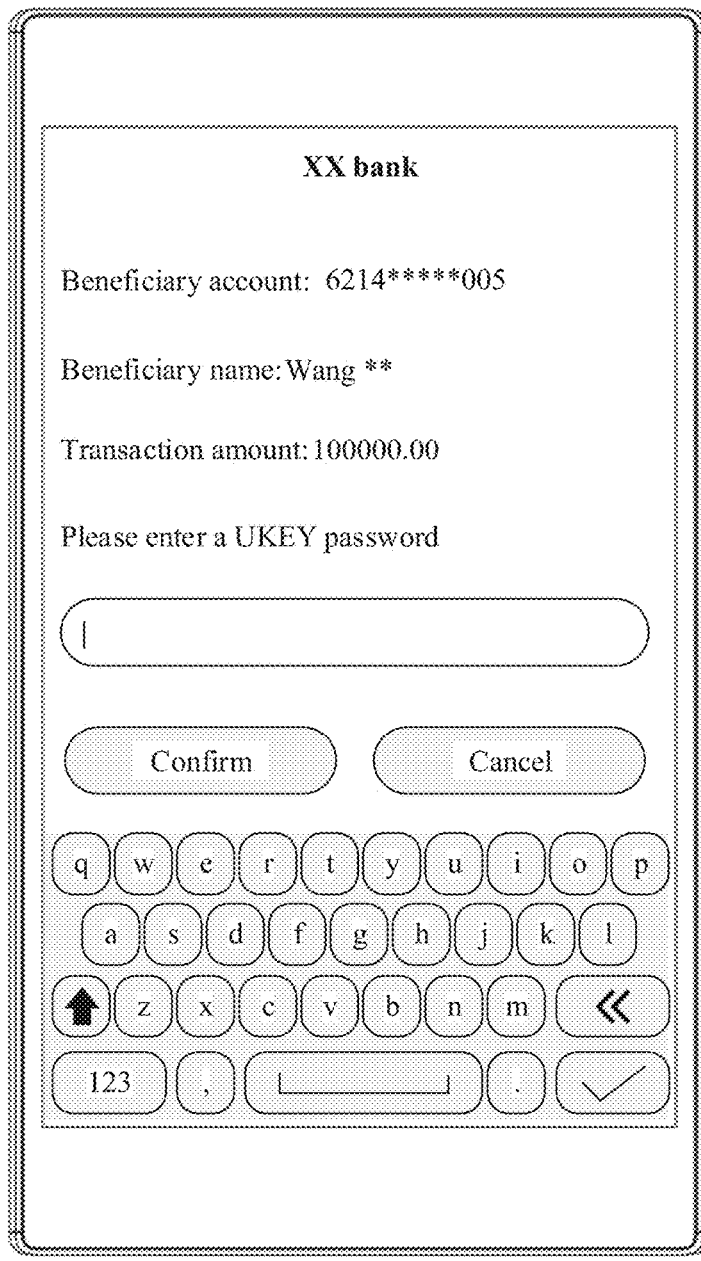
Figure 14C:
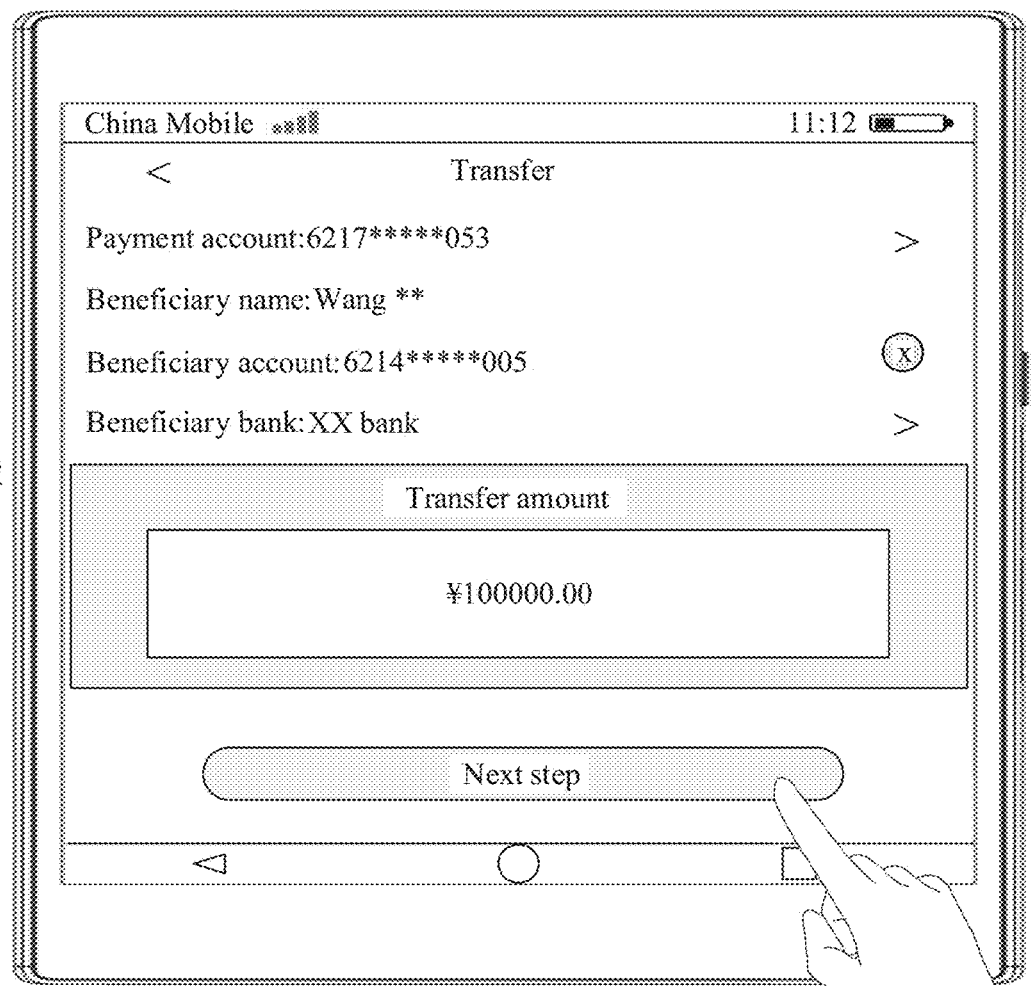
Figure 14D:
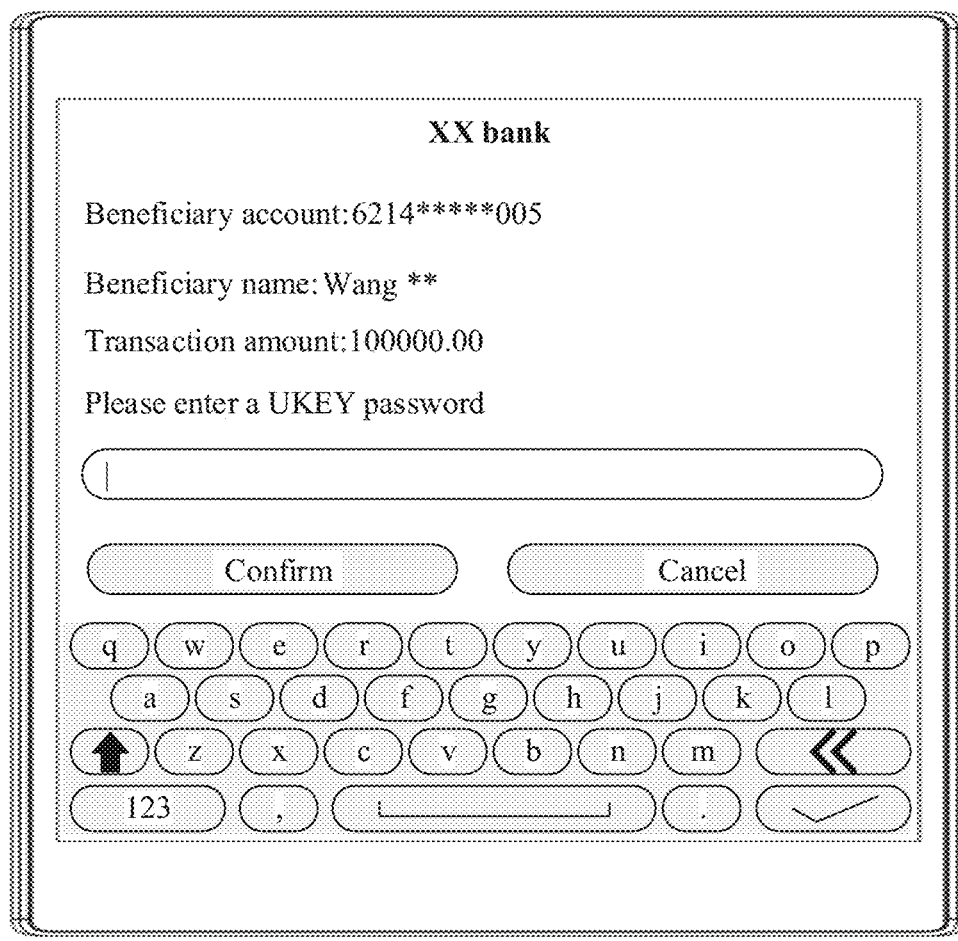
Figure 14E:
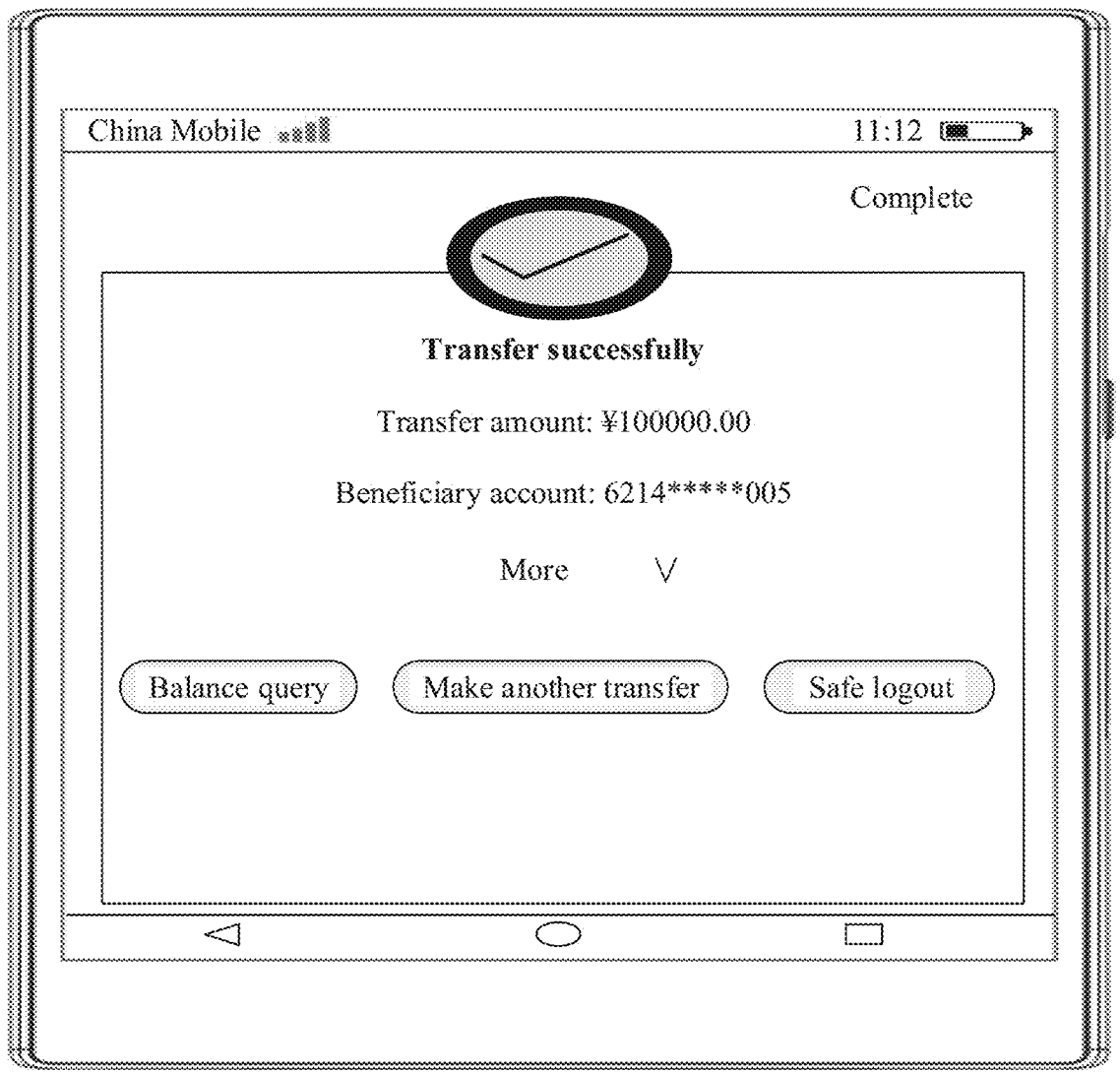
Figure 15A:
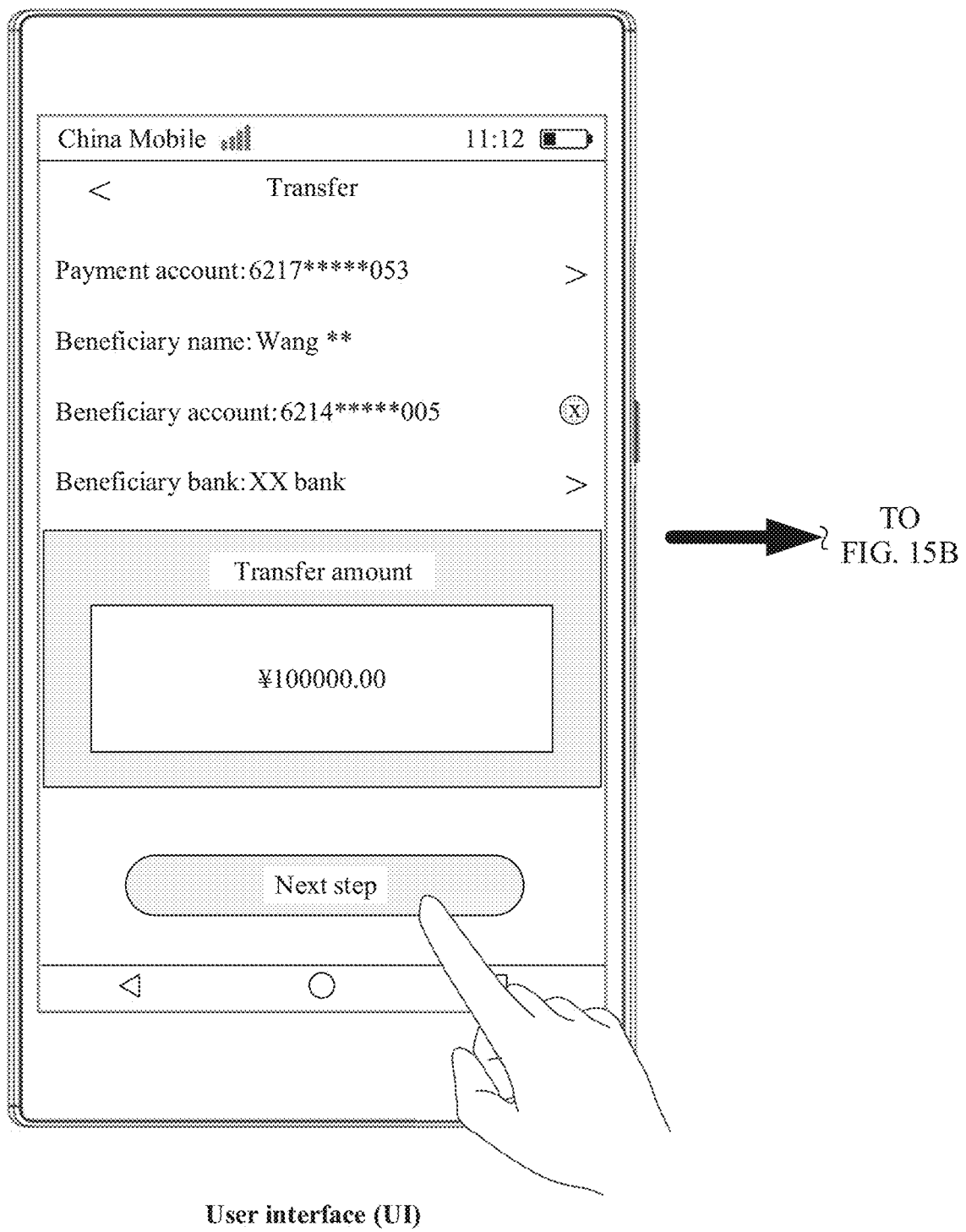
FIG. 15A to FIG. 15D is a schematic diagram of an application scenario of mobile phone bank transfer according to an embodiment of the present invention.
Figure 15B:
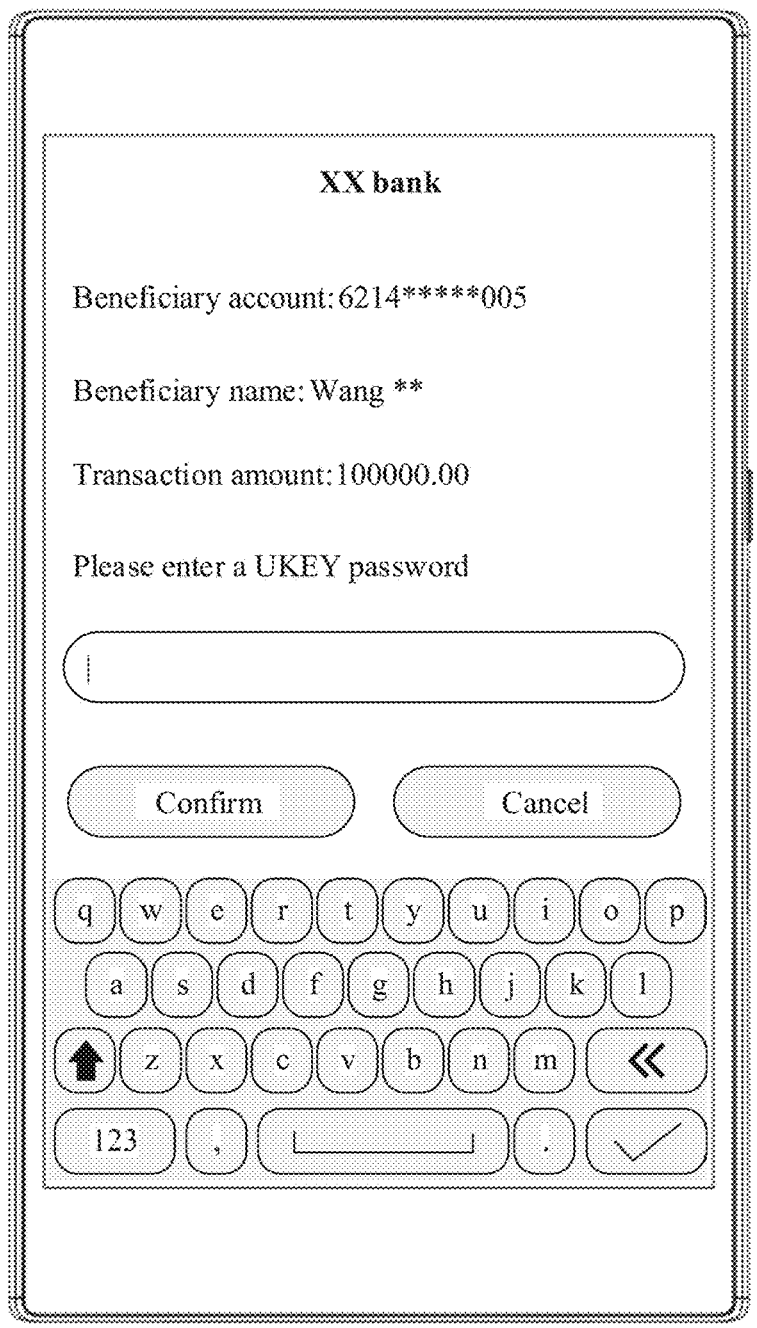
Figure 15C:
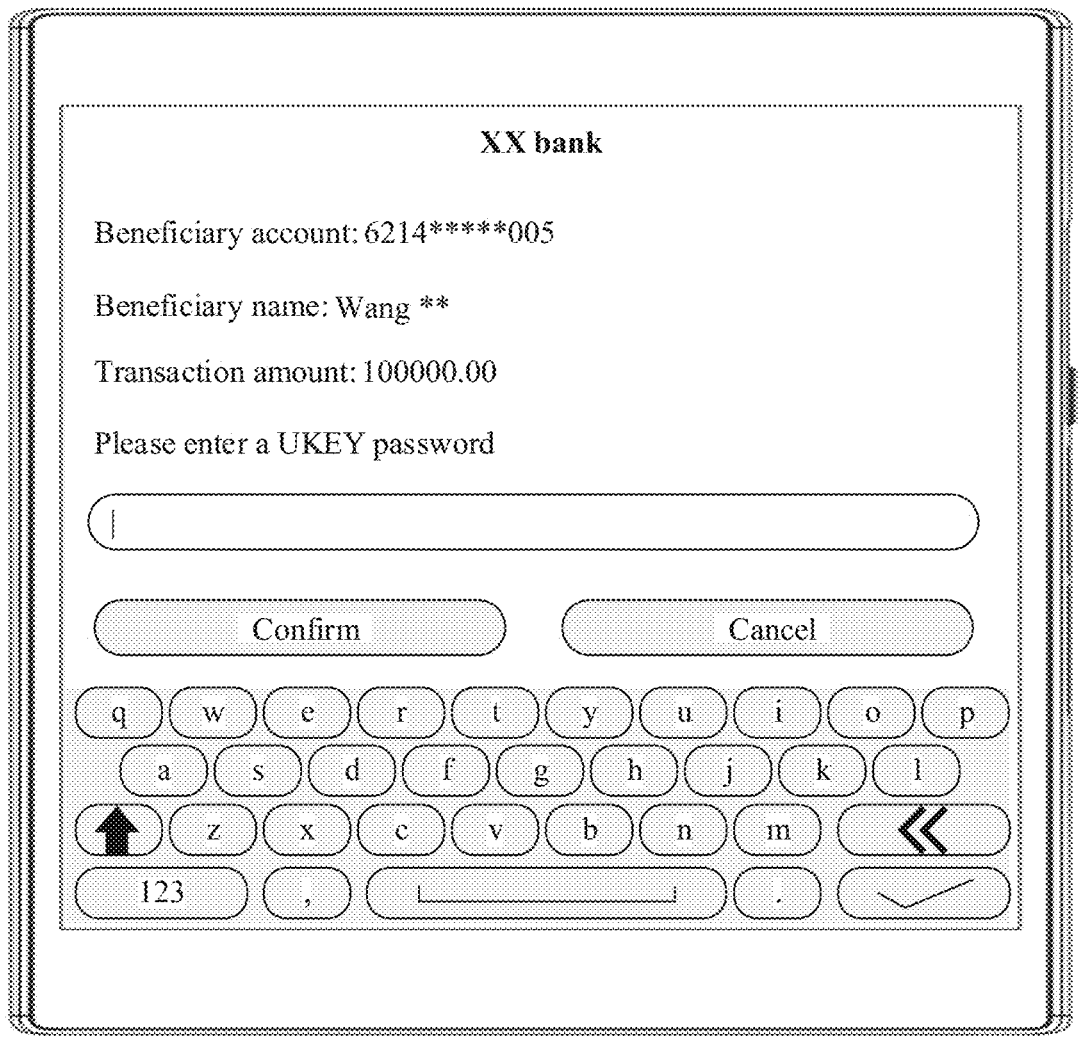
Figure 15D:
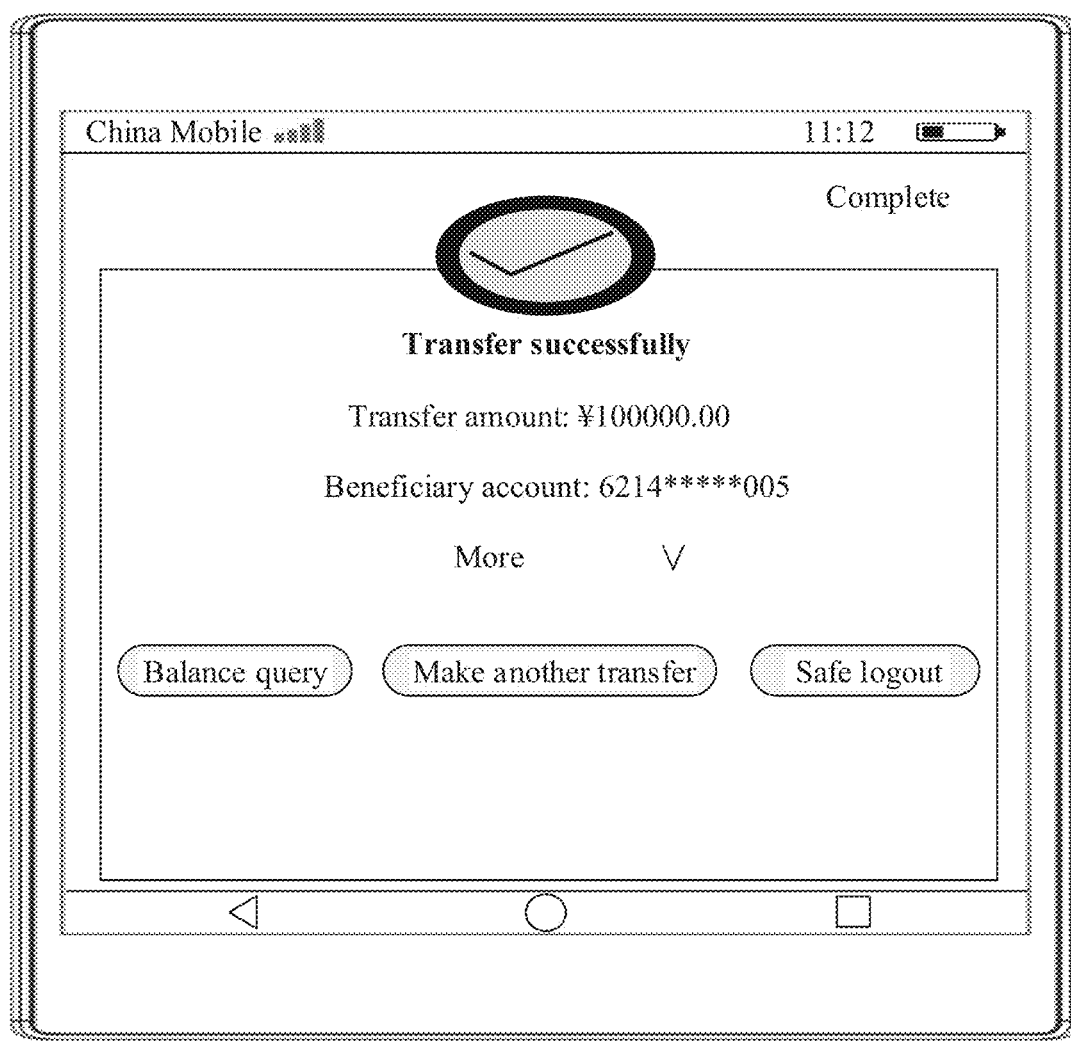

For another example, in an implementation, that the TUI is adapted to the foldable screen may be that on the foldable screen before and after the interface of the TUI changes, a content layout of the TUI changes. For example, in primary screen display, an interface of the TUI occupies the primary screen. The TUI shown in FIG. 8(2)-A to FIG. 8(2)-C includes page content such as a bank name, a payment account number, an amount, a password input box, a virtual keyboard, and a confirm/cancel key. However, when the primary screen is unfolded to a full screen, an interface shape of the TUI changes, and interface content also changes. A TUI shown in FIG. 12 includes page content such as a password input box, a virtual keyboard, and a confirm/cancel key. In this case, the TUI may occupy only a part of the screen in the full screen instead of occupying the full screen.

It should be noted that the foregoing embodiments in FIG. 9 to FIG. 12 are merely used to explain technical solutions of the present invention but are not limited. It should be understood that, based on a technical idea of the present invention, in an actual application, another form of a TUI adapted to the foldable screen may be further designed.

The following uses several specific implementation scenarios in a mobile phone bank transfer scenario as an example to explain the embodiments of the present invention.

As shown in FIG. 13A to FIG. 13D, in a possible implementation scenario, a user logs in to a mobile banking application (namely, a CA) in an REE in an electronic device, and a user interface (namely, a UI) of the mobile banking application is adaptively displayed on a current foldable screen. In the scenario illustrated in FIG. 13A to FIG. 13D, in this case, the foldable screen of the electronic device is in a single screen display state (for example, may be in primary screen display). The user enters information such as a transfer amount on a transfer interface of the UI. To facilitate a subsequent operation, the user unfolds the foldable screen from a single screen to a full screen (namely, a first operation). The transfer interface may be adaptively displayed on the full screen based on a display method formulated in the existing REE. In addition, in a processor of the electronic device, the REE obtains screen information of the full screen, and transmits the screen information of the full screen to a TEE. The user continues to tap "next page" (namely, a second operation) on the transfer interface, so that a TUI of a TA required by the mobile banking application is invoked, and the TEE processes the TUI (for example, coordinate transformation or TUI content rendering) based on the screen information of the full screen. The TUI is displayed on the full screen by invoking a specific interface. For example, the TUI includes PIN code input and verification interfaces. In this case, an interface of the TUI displayed on the full screen is adapted to the full screen. For example, the interface of the TUI occupies the entire full screen. The user may perform further operations on the TUI, such as PIN code input and transaction information confirmation. After the user completes the PIN code input and the transaction information confirmation by using the TUI, a display area of the full screen is returned to the REE. The mobile banking application in the REE further displays a transfer completion interface, and an entire transaction process ends.

As shown in FIG. 14A to FIG. 14E, in another possible implementation scenario, a user logs in to a mobile banking application (namely, a CA) in an REE in an electronic device, and a user interface (namely, a UI) of the mobile banking application is adaptively displayed on a current foldable screen. In the scenario illustrated in FIG. 14A to FIG. 14E, in this case, the foldable screen of the electronic device is in a single screen display state (for example, may be in primary screen display). The user enters information such as a transfer amount on a transfer interface of the UI. The user continues to tap "next page" on the transfer interface, so that a TUI of a TA required by the mobile banking application is invoked. A TEE displays the TUI on the single screen by invoking a specific interface. As shown in the figure, the TUI includes PIN code input and verification interfaces. To facilitate a subsequent operation, the user unfolds the foldable screen from the single screen to a full screen (namely, a first operation). In a processor of the electronic device, the REE obtains screen information of the full screen, and transmits the screen information of the full screen to the TEE. To ensure information security, the TUI automatically exits, an interface of a latest UI before the TUI is displayed on the full screen, for example, the transfer interface as shown in the figure, and the UI is adaptively displayed on the full screen. The user continues to tap the "next page" (namely, a second operation) on the transfer interface, so that the TUI of the TA required by the mobile banking application is invoked, and the TEE processes the TUI based on the screen information of the full screen. The TUI is displayed on the full screen by invoking the specific interface. As shown in the figure, the TUI includes the code input and verification interfaces. In this case, an interface of the TUI displayed on the full screen is adapted to the full screen. As shown in the figure, the interface of the TUI occupies the entire full screen as shown in the figure. The user may perform further operations on the TUI, such as PIN code input and transaction information confirmation. After the user completes the PIN code input and the transaction information confirmation by using the TUI, a display area of the full screen is returned to the REE, and the mobile banking application in the REE further displays a transfer completion interface, and an entire transaction process ends.

As shown in FIG. 15A to FIG. 15D, in another possible implementation scenario, a user logs in to a mobile banking application (namely, a CA) in an REE in an electronic device, and a user interface (namely, a UI) of the mobile banking application is adaptively displayed on a current foldable screen. In the scenario illustrated in FIG. 15A to FIG. 15D, in this case, the foldable screen of the electronic device is in a single screen display state (for example, may be in primary screen display). The user enters information such as a transfer amount on a transfer interface of the UI. The user continues to tap "next page" on the transfer interface, so that a TUI of a TA required by the mobile banking application is invoked. A TEE displays the TUI on the single screen by invoking a specific interface. As shown in the figure, the TUI includes PIN code input and verification interfaces. To facilitate a subsequent operation, the user unfolds the foldable screen from the single screen to a full screen. In a processor of the electronic device, the REE obtains screen information of the full screen, and transmits the screen information of the full screen to the TEE. The TEE processes the TUI based on the screen information of the full screen, for example, redraws the TUI, and enables a newly drawn TUI to be displayed on the full screen by invoking the specific interface. As shown in the figure, the TUI includes the PIN code input and verification interfaces. In this case, an interface of the TUI displayed on the full screen is adapted to the full screen. As shown in the figure, the interface of the TUI occupies the entire full screen as shown in the figure. The user may perform further operations on the TUI, such as PIN code input and transaction information confirmation. After the user completes the PIN code input and the transaction information confirmation by using the TUI, a display area of the full screen is returned to the REE, and the mobile banking application in the REE further displays a transfer completion interface, and an entire transaction process ends.

It should be noted that the foregoing embodiments in FIG. 13A to FIG. 15D are merely used to explain technical solutions of the present invention as examples but not limitations. Based on a technical idea of the present invention, more implementation processes (such as other transfer processes) may be further derived in an actual application.

Based on the foregoing description, the following continues to provide some TUI display methods provided in the embodiments of the present invention.

For convenience, the method embodiments described below are expressed as a combination of a series of action steps. However, a person skilled in the art should understand that specific implementations of the technical solutions of this application are not limited to a sequence of the described series of action steps.

Figure 16:
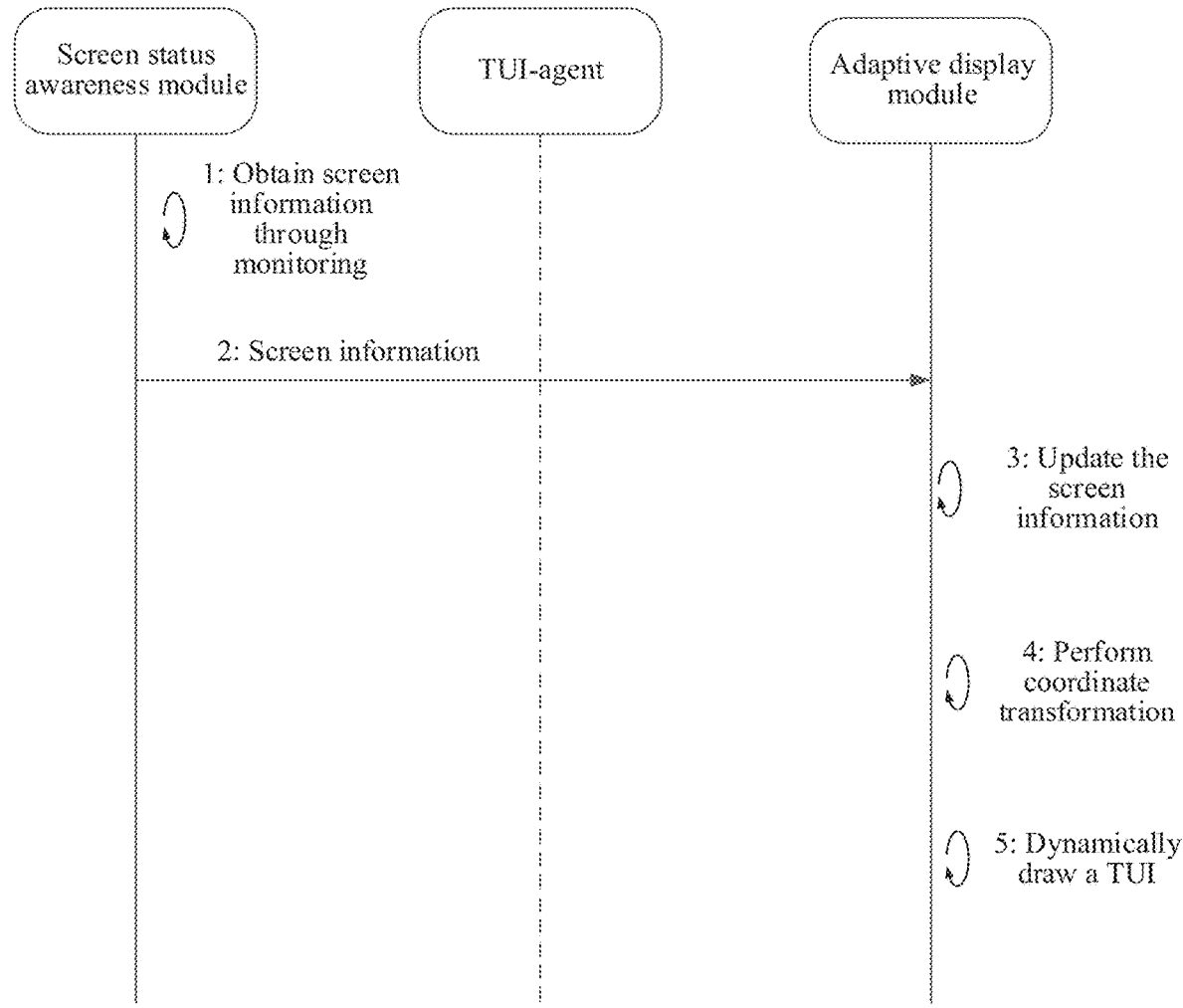
FIG. 16 is a schematic flowchart of a TUI display method according to an embodiment of the present invention.

FIG. 16 is a schematic flowchart of a TUI display method according to an embodiment of the present invention. The method is described from a perspective of an REE and a TEE. The method may be applied to the architecture shown in FIG. 5. The method includes but is not limited to the following steps:

1: A screen status awareness module in the REE obtains screen information of a current foldable screen by monitoring a system broadcast.

Specifically, when a display status of the foldable screen changes, the screen status awareness module may obtain the screen information of the current foldable screen by monitoring the system broadcast (for example, an Android system broadcast).

For example, a user operates the foldable screen, so that the display status of the screen changes from full display to single screen display (in other words, the foldable screen changes from an unfolded state to a folded state), changes from single screen display to full screen display (namely, the foldable screen changes from a folded state to an unfolded state), or changes from one single screen display to another single screen display (for example, an electronic device is flipped, so that the foldable screen changes from one primary screen display to a secondary screen display state).

The screen information of the current foldable screen may include, for example, resolution of the current foldable screen (namely, resolution of a screen corresponding to a display state), and further may include an on/off state (for example, an on/off state) of each screen of the foldable screen.

2: The screen status awareness module transmits the screen information to an adaptive display module in the TEE.

The screen status awareness module may be a daemon (daemon) of a system service.

Specifically, the screen status awareness module may transmit the screen information to the adaptive display module in the TEE by using a driver module in the REE (for example, a TUI-agent function or a TUI-switch function).

3: The adaptive display module updates local screen information.

Specifically, the adaptive display module dynamically stores the screen information sent by the REE. In other words, when receiving new screen information, the adaptive display module locally stores the new screen information to replace screen information received last time.

It should be noted that step 3 is optional.

4: The adaptive display module obtains coordinate transformation information based on the screen information.

The coordinate transformation information indicates a coordinate transformation relationship between a drawing coordinate system and a physical coordinate system.

Specifically, the adaptive display module may determine a physical coordinate system of the current foldable screen based on the screen information, and obtain coordinate transformation information between two coordinate systems based on a saved or default drawing coordinate system and the physical coordinate system.

The physical coordinate (Physical Coordinate) system may also be referred to as a device coordinate (Device Coordinate) system, and refers to actual coordinates of an entity based on the electronic device. For example, in this embodiment of the present invention, the physical coordinate system may specifically refer to physical coordinates on a screen of the current foldable screen in the electronic device. The physical coordinate system used for the screen determines an object on the screen by defining a physical origin, an X axis, and a Y axis. In such a coordinate system, coordinates of the object (for example, a pixel) include a distance between the object and the X axis and a distance between the object and the Y axis, in other words, a location of the object can be determined based on the coordinates of the object, where the coordinates may be expressed in a unit of pixel. For example, the physical coordinate system may be used by an electronic scanner gun to display interface content on the screen.

Figure 17A:
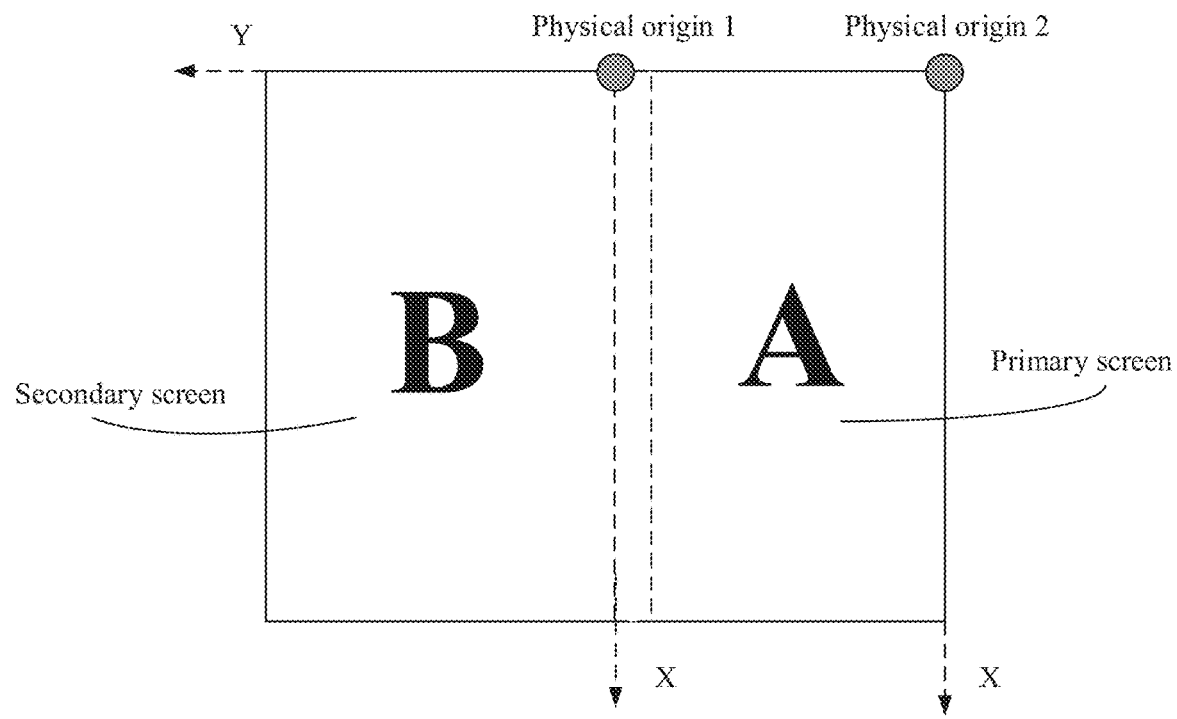
FIG. 17A is an example diagram of a physical coordinate system used in different display statuses of a foldable screen according to an embodiment of the present invention.

In this embodiment of the present invention, different physical coordinate systems are used for different display statuses of the foldable screen. For example, FIG. 17A is a simple example diagram of a physical coordinate system used in different display statuses of the foldable screen. The foldable screen includes a secondary screen, a foldable edge, and a primary screen. In a scenario shown in FIG. 17A, a physical origin 1 represents a physical origin in secondary screen display, a physical origin 2 represents a physical origin in primary screen display, and the physical origin 2 may alternatively represent a physical origin in full screen display. In other words, when the foldable screen is in a folded state, and when the secondary screen is displayed, the physical origin of the physical coordinate system is located at the upper right corner of the secondary screen; and when the primary screen is displayed, the physical origin of the physical coordinate system is located in the upper right corner of the primary screen. When the foldable screen is in an unfolded state, and when the full screen is displayed, the physical origin of the physical coordinate system is located in the upper right corner of the full screen. In addition, the X axis of the physical coordinate system is positive downward and the Y axis is positive left.

Figure 17B:
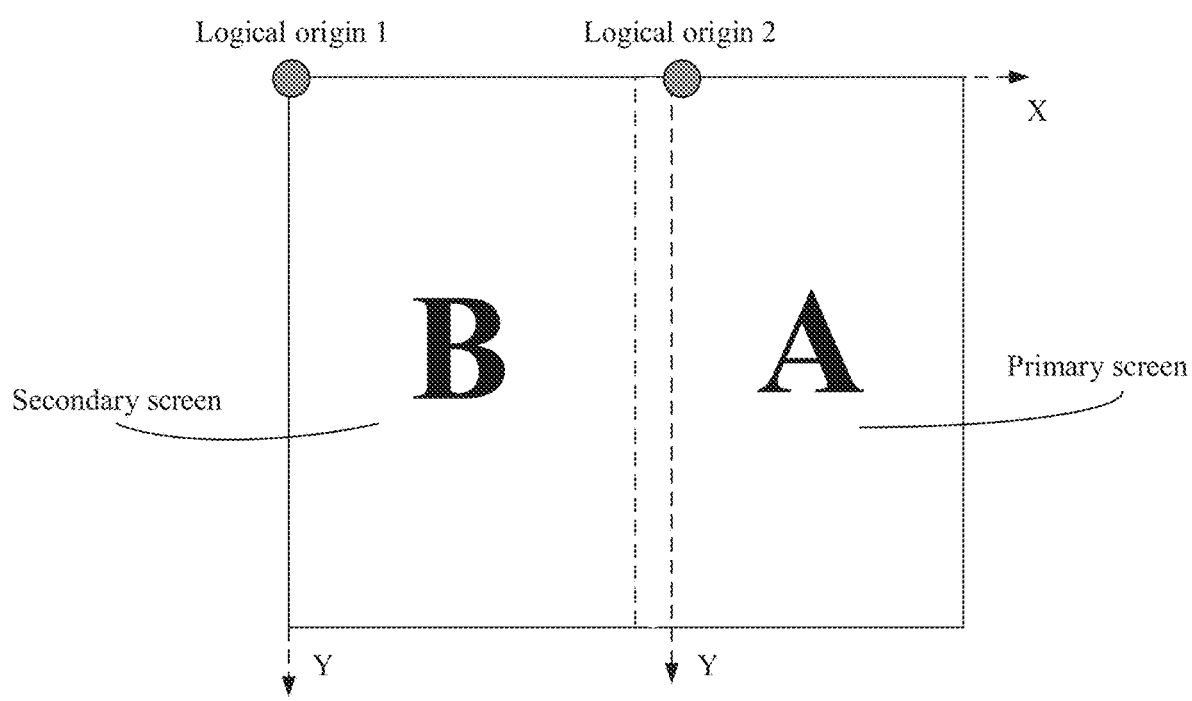
FIG. 17B is an example diagram of a drawing coordinate system used in different display statuses of a foldable screen according to an embodiment of the present invention.

The drawing coordinate system may also be referred to as a logical coordinate (Logical Coordinate) system, is a coordinate system used by a system for recording or drawing, and defines a logical origin, an X axis, and a Y axis for recording or drawing. For example, FIG. 17B is a simple example diagram of a drawing coordinate system used in the different display statuses of the foldable screen. In a scenario shown in FIG. 17B, a logical origin 1 represents a logical origin for a secondary screen, and the logical origin 1 may alternatively represent a logical origin for a full screen. An origin 2 represents a logical origin for a primary screen. An X axis of the drawing coordinate system is positive right and a Y axis is positive downward. Coordinates may also be expressed in a unit of pixel.

Specifically, the adaptive display module may determine, based on latest received screen information, a physical coordinate system used by the current foldable screen, to further determine a coordinate transformation relationship between the drawing coordinate system and the physical coordinate system.

For example, the screen information includes resolution information of the current foldable screen, for example, "height=2200, and width=2440". In addition, it is determined that the current foldable screen is in a full screen display state based on the resolution information. In this case, the adaptive display module may determine the coordinate transformation information between the drawing coordinate system and the physical coordinate system that is used for the full screen display.

For example, in a screen display scenario, the coordinate transformation information includes "x=y3, and y=width−x3", where {x, y} represents the physical coordinates, and {x3, y3} represents drawing coordinates. In this way, an interface of a TUI is adapted to the current foldable screen.

For another example, in a user instruction input scenario, the coordinate transformation information includes "x3=width−y, and y3=x", where {x, y} represents the physical coordinates, and {x3, y3} represents the drawing coordinates. In this way, user instruction input is matched to a control event of the TUI through coordinate transformation.

5: When the TUI of a TA is invoked, the adaptive display module redraws the TUI based on the coordinate transformation information, so that the TUI is adapted to the current foldable screen.

Specifically, after the TUI of the TA is invoked, the adaptive display module processes an interface of an original default TUI (or referred to as a preset TUI) based on the coordinate transformation information. Therefore, coordinates of each pixel in the interface of the TUI (namely, coordinates in the drawing coordinate system) are converted into coordinates in the physical coordinate system, so that the TUI is redrawn, and a redrawn TUI is obtained. Because all coordinates of each pixel in the redrawn TUI become the coordinates of the physical coordinate system, when the redrawn TUI is displayed on the current foldable screen, the entire screen may be occupied, so that the is adapted to the current foldable screen.

Further, when scaling processing needs to be performed on the redrawn TUI, the adaptive display module may further scale the interface of the TUI based on the coordinate transformation information.

For example, in the screen display scenario, the coordinate transformation information includes "x=y3, and y=width−x3", where $\{x, y\}$ represents the physical coordinates, and $\{x3, y3\}$ represents the drawing coordinates. When the scaling processing is required, the coordinate transformation information is adjusted to "x=y3×k1, and y=width−x3)×k2", where k1 represents a proportional coefficient, and k2 represents a proportional coefficient, for example, k1=50%, and k2=50%; k1=60%, and k2=80%; k1=40%, and k2=00%; k1=60%, and k2=40%; or the like. This is not limited herein.

For another example, in the user instruction input scenario, the coordinate transformation information includes "x3=width−y, and y3=x", where $\{x, y\}$ represents the physical coordinates, and $\{x3, y3\}$ represents the drawing coordinates. When the scaling processing is required, the coordinate transformation information is adjusted to "x3=(width−y)×k1, and y3=x×k2", where k1 represents a proportional coefficient, and k2 represents a proportional coefficient, for example, k1=50%, and k2=50%; k1=60%, and k2=80%; k1=40%, and k2=00%; k1=60%, and k2=40%; or the like. This is not limited herein.

After the scaling processing is performed, all the coordinates of each pixel in the TUI become the coordinates of the physical coordinate system, and an interface size of the TUI changes compared with that of the original default TUI. When the TUI is displayed on the current foldable screen, the TUI may occupy a part of the screen. Therefore, the TUI is adapted to the current foldable screen.

In addition, the adaptive display module may further perform more processing on the interface of the TUI based on the coordinate transformation information, so that compared with the original default TUI, in the redrawn TUI, the coordinates of each pixel become the coordinates of the physical coordinate system, and one or more of the following changes occur on a page: a change of an interface size of the TUI, a change of a location of a display area of the TUI in the foldable screen, a change of an interface shape of the TUI, a change of an interface color of the TUI, or a change (adjustment) of a content layout of the TUI in the foldable screen. In this way, various adaptation solutions that the TUI is adapted to the current foldable screen are implemented.

Optionally, the redrawn TUI may further support different display directions such as a landscape direction and a portrait direction.

It may be learned that, in this embodiment of the present invention, for the electronic device having the foldable screen, when the display status of the foldable screen on which an application service is located changes, the screen information (latest screen information) of the current foldable screen may be transferred to the adaptive display module in the TEE by using the screen status awareness module. In this way, the TEE can obtain the screen information of the foldable screen in real time, thereby creating a feasible information transmission channel. The adaptive display module processes the screen information, so that the interface of the TUI is automatically adapted to the screen of the current foldable screen, and adaptive display of the TUI is implemented by using a software algorithm (rather than a GPU display mode). This can resolve a pain point problem of a user using a foldable screen and greatly improves user experience.

Figure 18:
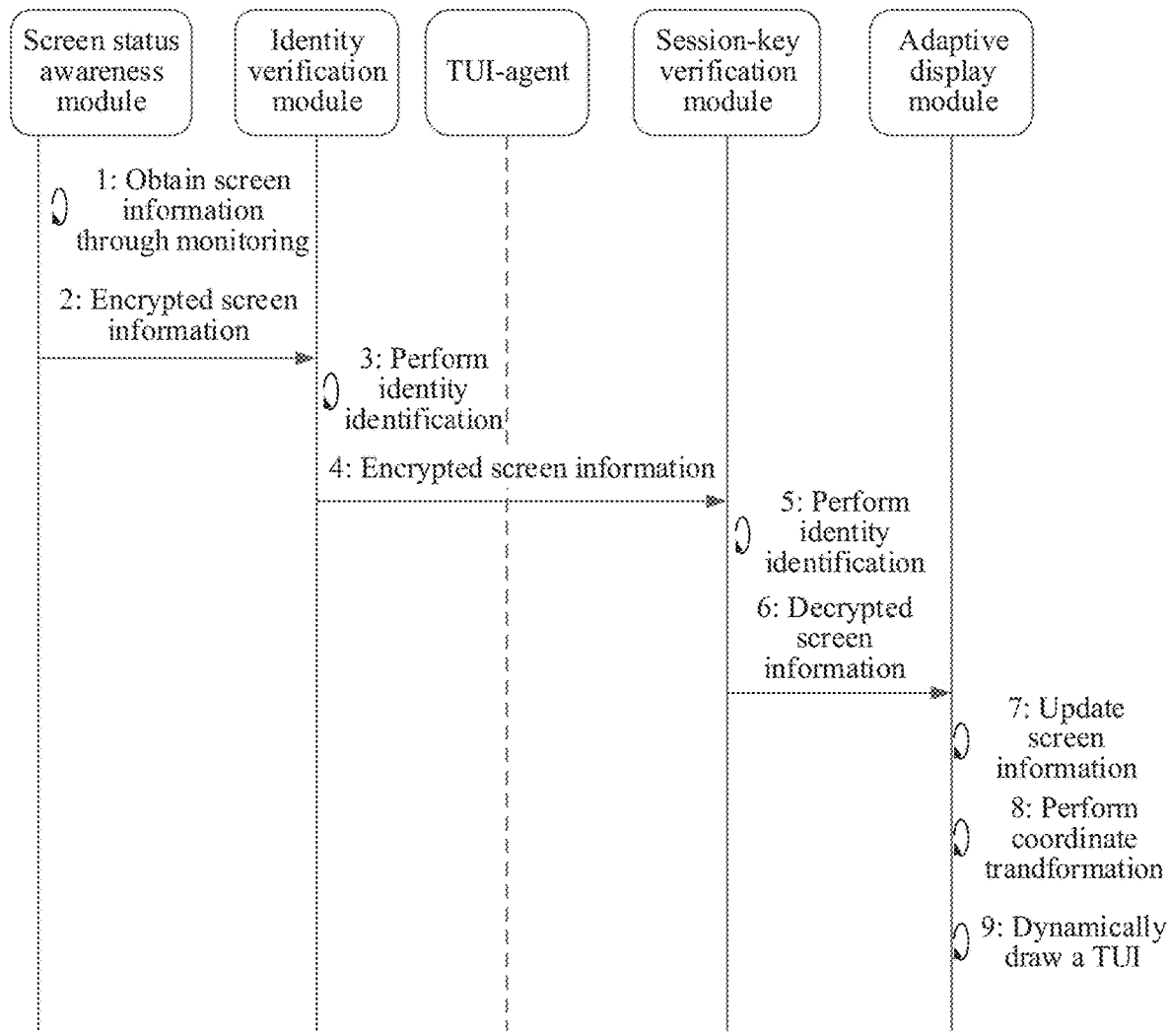
FIG. 18 is a schematic flowchart of a TUI display method according to an embodiment of the present invention.

FIG. 18 is a schematic flowchart of another TUI display method according to an embodiment of the present invention. The method is described from a perspective of an REE and a TEE. The method may be applied to the architecture shown in FIG. 6. The method includes but is not limited to the following steps:

1: A screen status awareness module in the REE obtains screen information of a current foldable screen by monitoring a system broadcast.

For details, refer to the description of step 1 in FIG. 16. Details are not described herein again.

2: The screen status awareness module sends encrypted screen information to an identity verification module in the REE.

For example, the screen status awareness module obtains the encrypted screen information after encrypting the screen information of the current foldable screen by using a session-key.

Further, the screen information may further include a challenge value (or a random number), and the screen status awareness module performs encryption processing on the screen information including the challenge value (or the random number), to obtain the encrypted screen information.

Alternatively, optionally, the screen status awareness module performs the encryption processing on the screen information. Then, the screen status awareness module may encapsulate the encrypted screen information with the challenge value (or the random number) into a data packet.

It should be noted that the screen information may be encrypted in another manner (for example, symmetric encryption). This is not limited herein.

3: The identity verification module performs identity verification based on the screen information.

The identity verification module determines an identity of an information transferor (namely, the screen status awareness module), and allows only a system service to invoke an information transfer interface to send the screen information to the TEE.

Specifically, the identity verification module may obtain identity information of the information transferor by using daemon (process) information, to determine whether the information transferor is the system service. In this way, when the information transferor is the screen status awareness module designed in this embodiment of this specification, because the identity verification module may determine that the screen status awareness module is the system service, the identity verification module allows the screen status awareness module to invoke the information transfer interface (invoke a TUI-switch function or a TUI-agent function). When the information transferor is function code disguised by a malicious attacker, the identity verification module confirms that the information transferor is not the system service and rejects the information transferor to invoke a related interface. This prevents insecure information from being transmitted to the TEE and ensures information security of the REE and the TEE.

4: The identity verification module transmits the screen information to a session-key verification module in the TEE.

Specifically, the identity verification module may transmit the encrypted screen information (or the data packet) to the session-key verification module in the TEE by using a TUI agent.

5: The session-key verification module performs identity verification based on the screen information (or the data packet).

Specifically, the session-key verification module decrypts the screen information, and verifies the identity information of the information transferor based on the challenge value (the random number) carried by the session-key verification module. For example, when the challenge value (the random number) is verified correctly, it is confirmed that an identity of the information transferor is valid, that is, it is confirmed that the information transferor is the screen status awareness module designed in this embodiment of this application, instead of the function code disguised by the malicious attacker. This verification can further improve the information security of the TEE, for example, ensure that the screen information is not tampered with after coming out of the identity verification module.

6: The session-key verification module transmits decrypted screen information to the adaptive display module in the TEE.

Specifically, only when both the challenge value (the random number) and the key are verified correctly, the session-key verification module transmits the decrypted screen information to the adaptive display module in the TEE.

7: The adaptive display module updates local screen information.

Specifically, the adaptive display module dynamically stores the screen information sent by the REE. In other words, when receiving new screen information, the adaptive display module locally stores the new screen information to replace screen information received last time.

It should be noted that step 7 is optional.

8: The adaptive display module may perform coordinate transformation processing based on the decrypted screen information to obtain processed screen information.

For details, refer to the description of step 4 in FIG. 16. Details are not described herein again.

9: When the TUI of a TA is invoked, the adaptive display module redraws the TUI based on the coordinate transformation information, so that the TUI is adapted to the current foldable screen.

For details, refer to the description of step 5 in FIG. 16. Details are not described herein again.

It should be noted that, when the session-key verification module and the adaptive display module are deployed together after functions of the session-key verification module and the adaptive display module are integrated, the foregoing step 6 is optional.

Figure 19:
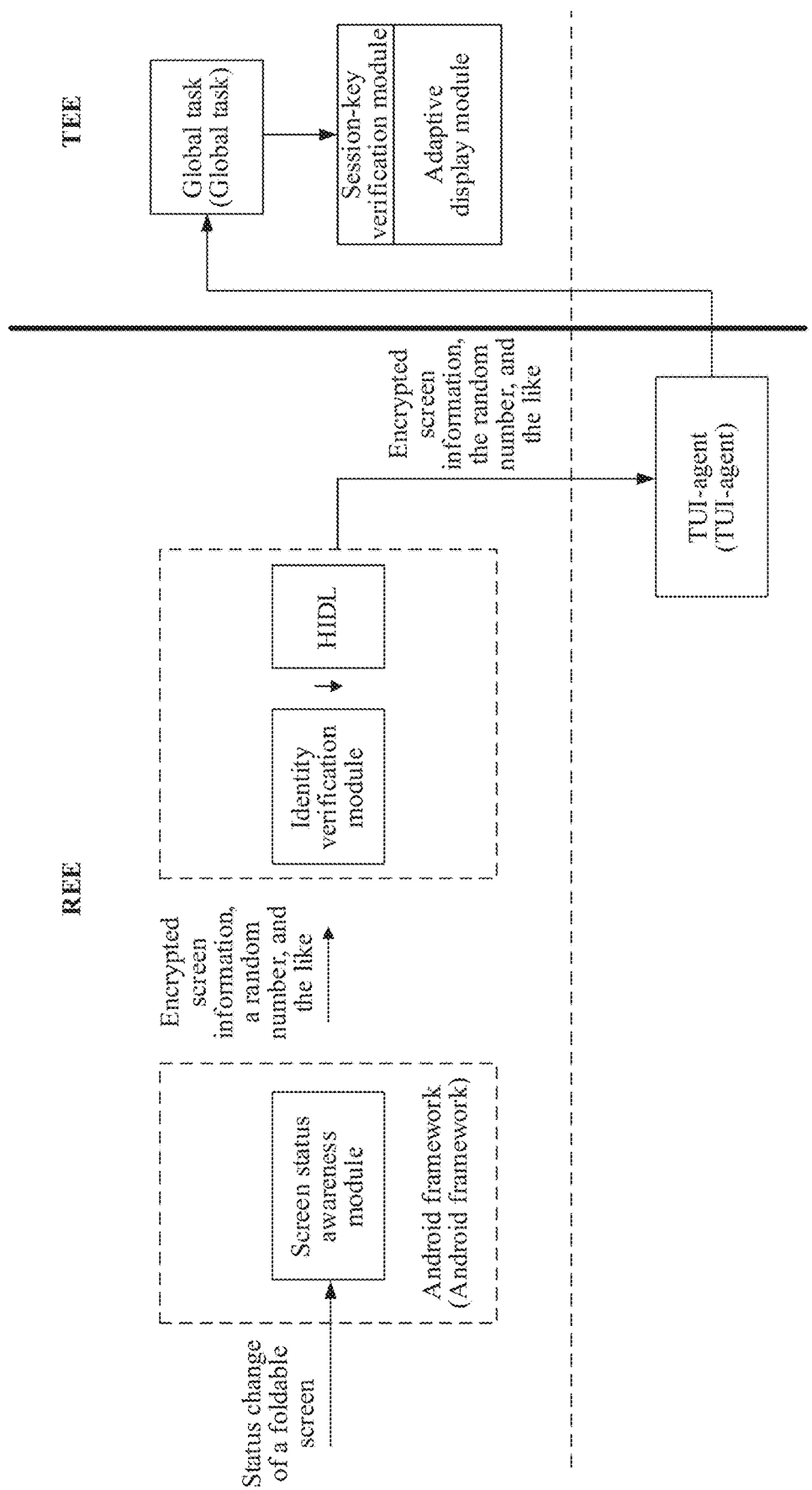
FIG. 19 is an example diagram of a TUI display procedure according to an embodiment of the present invention.

The solution is further explained below by using FIG. 19 as an example. As shown in FIG. 19, a display status of a foldable screen changes when a user operates an electronic device. After detecting the change, the screen status awareness module transfers the encrypted screen information (for example, session-key encryption) and the random number to the identity verification module of the REE for identity verification, to ensure that only the system service can continue to be sent. After the verification succeeds, the encrypted screen information is further processed by using a hardware abstraction layer interface definition language (HAL, interface definition language, HIDL), and then further transmitted to a TUI-agent module. The TUI-agent module sends the encrypted screen information to the TEE. In the TEE, after obtaining the encrypted screen information, a global task (global task) module further sends the encrypted screen information to the session-key verification module for identity verification, for example, the verification of the random number and the verification of the session-key. After the verification succeeds, the adaptive display module obtains the screen information. The TUI of the TA is adaptively displayed based on the screen information.

It may be learned that, in this embodiment of the present invention, for the electronic device having the foldable screen, when the display status of the foldable screen on which an application service is located changes, the screen information (latest screen information) of the current foldable screen may be encrypted by using the screen status awareness module, and transferred to the adaptive display module in the TEE. In this way, the TEE can obtain the screen information of the foldable screen in real time. In this process, the identity verification module is used to perform preliminary identity verification on the REE, and the session-key verification module is used to perform further identity verification on the TEE, to build a secure and reliable information transmission channel to ensure information security of the REE and the TEE. The adaptive display module processes the screen information, so that an interface of the TUI is automatically adapted to a screen of the current foldable screen, and adaptive display of the TUI is implemented by using a software algorithm (rather than a GPU display mode). This can resolve a pain point problem of a user using a foldable screen and greatly improves user experience.

Figure 20:
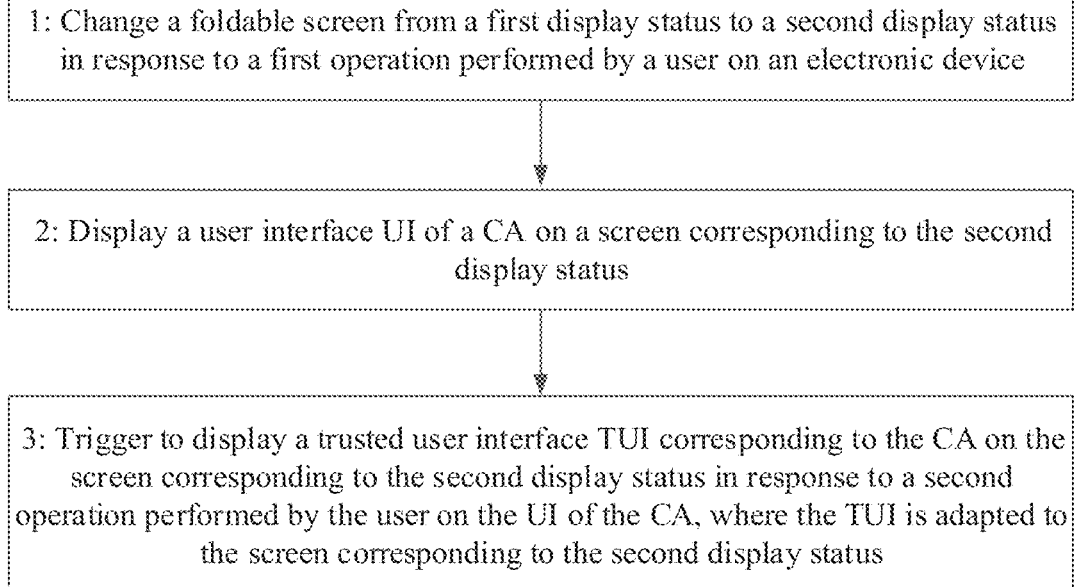
FIG. 20 is a schematic flowchart of a TUI display method according to an embodiment of the present invention.

FIG. 20 is a schematic flowchart of a TUI display method according to an embodiment of the present invention, and is described from a perspective of an electronic device. The method includes but is not limited to the following steps:

1: Change a foldable screen front a first display status to a second display status in response to a first operation performed by a user on an electronic device having a foldable screen.

The first display status indicates that at least one of at least two screens is in a display state, the second display status indicates that at least one of the at least two screens is in a display state, and a screen corresponding to the first display status is different from a screen corresponding to the second display status.

Related content about the electronic device, the foldable screen, the first operation, the first display status of the foldable screen, the second display status of the foldable screen, and changing from the first display status to the second display status has been fully described in the foregoing and related accompanying drawings. For brevity of the specification, details are not described herein again.

2: Display a user interface UI of a CA on the screen corresponding to the second display status.

Related content about the screen corresponding to the second display status, the CA, and the UI has been fully described in the foregoing and related accompanying drawings, and specific implementation details/processes/examples of this step are also fully described in the foregoing and related accompanying drawings. For brevity of the specification, details are not described herein again.

3: Trigger to display a trusted user interface TUI corresponding to the CA on the screen corresponding to the second display status in response to a second operation performed by the user on the UI of the CA, where the TUE is adapted to the screen corresponding to the second display status.

Related content about the second operation, the TUI corresponding to the CA, and that the TUI is adapted to the screen corresponding to the second display status (a current foldable screen) has been fully described in the foregoing and related accompanying drawings, and specific implementation details/processes/examples of this step are also fully described in the foregoing and related accompanying drawings. For brevity of the specification, details are not described herein again.

It may be learned that, in this embodiment of the present invention, for the electronic device having the foldable screen, when a display status of the foldable screen on which an application service is located changes, in this embodiment of the present invention, the UI of the CA may be adaptively displayed on the foldable screen, or the TUI of a TA may be adaptively displayed on the foldable screen. This resolves a pain problem of a user using a foldable screen and greatly improves user experience.

Figure 21:
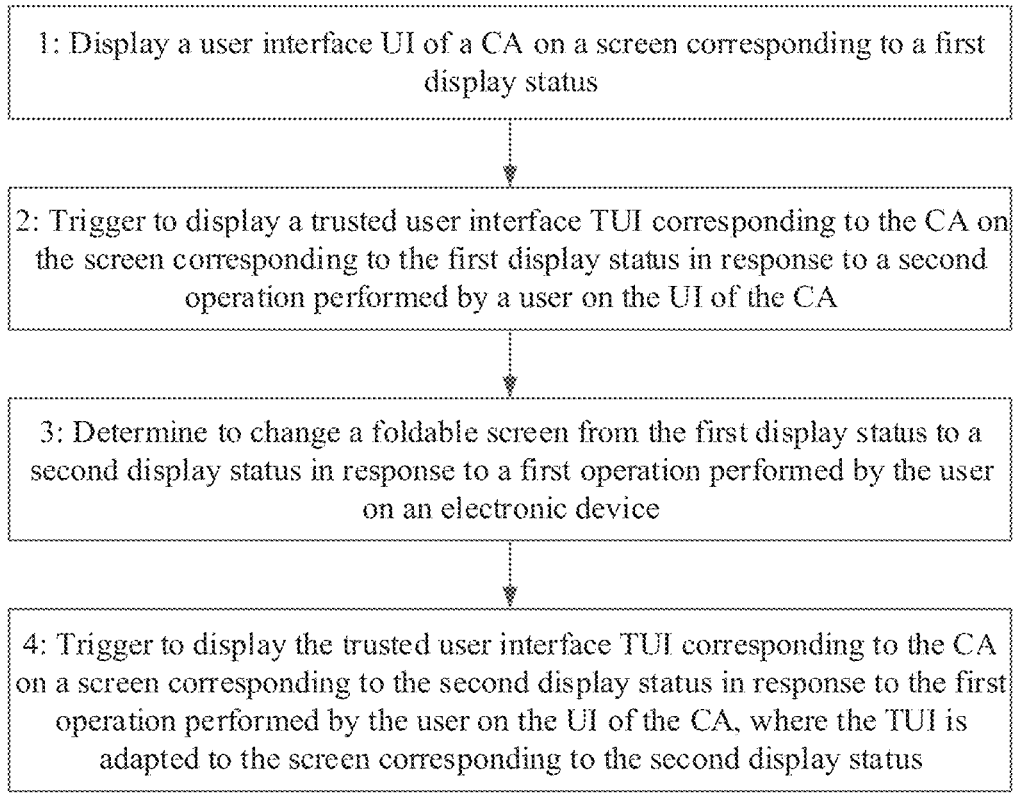
FIG. 21 is a schematic flowchart of a TUI display method according to an embodiment of the present invention.

FIG. 21 is a schematic flowchart of a TUI display method according to an embodiment of the present invention, and is described from a perspective of an electronic device. The method includes but is not limited to the following steps:

1: Display a user interface UI of a CA on a screen corresponding to a first display status of a foldable screen. The first display status indicates that at least one of at least two screens is in a display state.

Related content about the first display status of the foldable screen, the CA, and the UI has been fully described in the foregoing and related accompanying drawings, and specific implementation details/processes/examples of this step are also fully described in the foregoing and related accompanying drawings. For brevity of the specification, details are not described herein again.

2: Trigger to display a trusted user interface TUI corresponding to the CA on the screen corresponding to the first display status in response to a second operation performed by a user on the UI of the CA.

Related content about the second operation, a second display status, and the TUI corresponding to the CA has been fully described in the foregoing and related accompanying drawings, and specific implementation details/processes/examples of this step are also fully described in the foregoing and related accompanying drawings. For brevity of the specification, details are not described herein again.

3: Determine to change the foldable screen from the first display status to a second display status in response to a first operation performed by the user on the electronic device. The second display status indicates that at least one of the at least two screens is in a display state, and the screen corresponding to the first display status is different from a screen corresponding to the second display status.

Related content about the first operation on the electronic device and changing from the first display status to the second display status has been fully described in the foregoing and related accompanying drawings, and specific implementation details/processes/examples of this step are also fully described in the foregoing and related accompanying drawings. For brevity of the specification, details are not described herein again.

4: Trigger to display the trusted user interface TUI corresponding to the CA on the screen corresponding to the second display status in response to the first operation performed by the user on the UI of the CA, where the TUI is adapted to the screen corresponding to the second display status.

Related content about the first operation, the TUI corresponding to the CA, and that the TUI is adapted to the screen corresponding to the second display status (a current foldable screen) has been fully described in the foregoing and related accompanying drawings, and specific implementation details/processes/examples of this step are also fully described in the foregoing and related accompanying drawings. For brevity of the specification, details are not described herein again.

It may be learned that, in this embodiment of the present invention, for the electronic device having the foldable screen, when a display status of the foldable screen on which an application service is located changes, in this embodiment of the present invention, the UI of the CA may be adaptively displayed on the foldable screen, or the TUI of a TA may be adaptively displayed on the foldable screen. This resolves a pain problem of a user using a foldable screen and greatly improves user experience.

The foregoing describes a related system architecture and method in the embodiments of the present invention. Based on a same invention concept, the following describes a related apparatus/device in the embodiments of the present invention.

Figure 22:
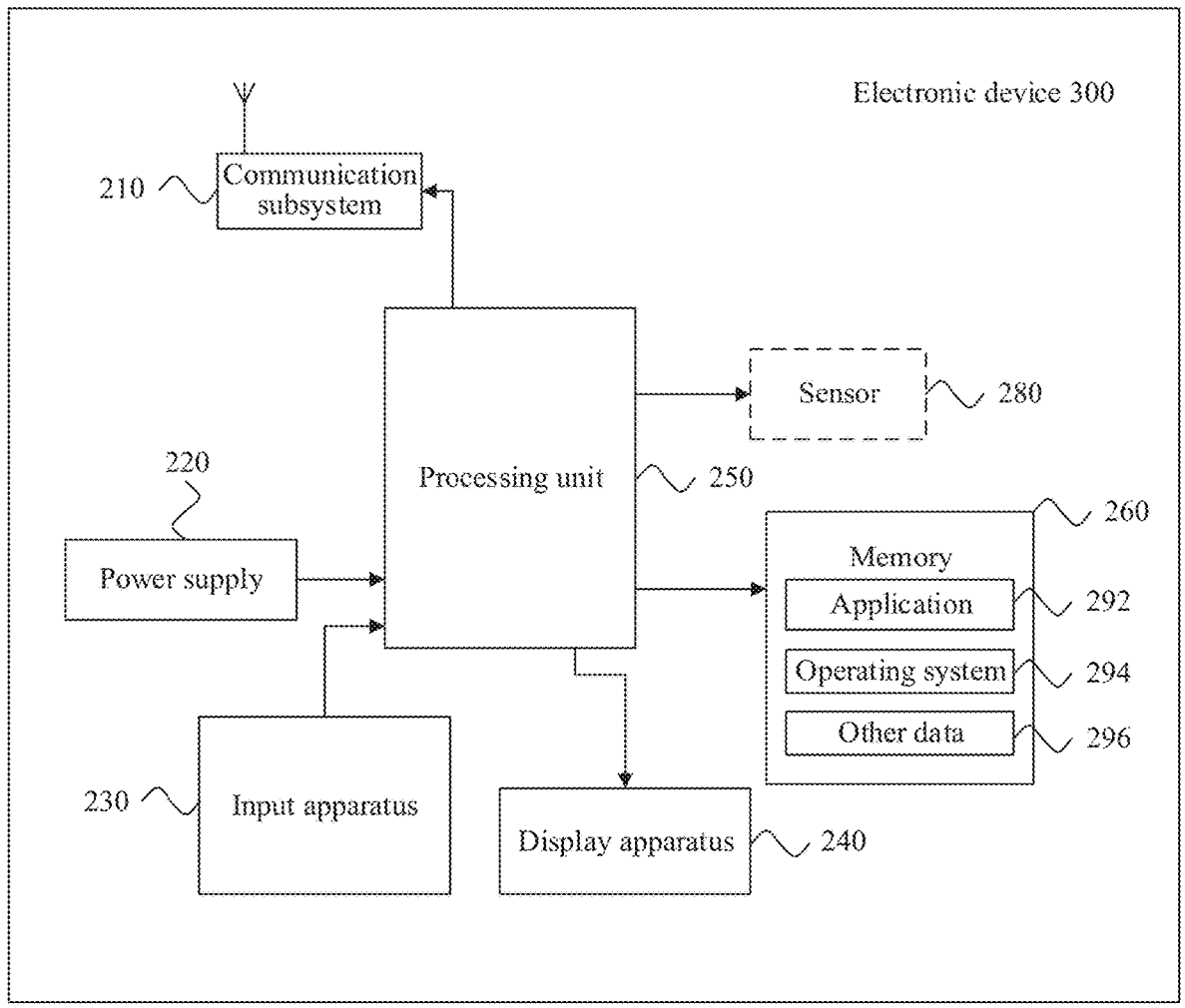
FIG. 22 is a schematic structural diagram of an electronic device according to an embodiment of the present invention.

FIG. 22 shows an example of an electronic device 300 according to an embodiment of the present invention. According to FIG. 22, the electronic device 300 includes a communication subsystem 210, a power supply 220, an input device 230, a display device 240, a processing unit 250, and a memory 260. The memory 260 stores computer programs or instructions. The computer programs include an operating system 294, an application 292, and the like. The processing unit 250 is configured to execute the computer programs in the memory 260, to implement methods defined by the computer programs. For example, the processing unit 250 runs the operating system 294, to implement, on the electronic device 300, various functions of an REE module and a TEE module described in the foregoing embodiments.

The processing unit 250 may include one or more processors. For example, the processing unit 250 may include an application processor, a graphics processing unit, a digital signal processor, and the like. When the processing unit 250 includes a plurality of processors, the plurality of processors may be integrated into a same chip, or each may be an independent chip.

The memory 260 further stores other data 296 in addition to the computer programs. The other data 296 may include data generated when the operating system 294 or the application 292 is running, such as system data (for example, a configuration parameter of the operating system 294) and user data.

The memory 260 generally includes an internal memory and an external memory. The internal memory includes but is not limited to a random access memory (random access memory, RAM), a read-only memory (read-only memory, ROM), a cache (cache), or the like. The external memory includes but is not limited to a flash memory (flash memory), a hard disk, a universal serial bus (universal serial bus, USB) disk, and the like. The computer program is generally stored in the external memory. Before executing the computer program, the processing unit 250 loads the program from the external memory to the internal memory.

In an embodiment, the operating system 294 includes a computer program used to implement the TUI display method provided in the embodiments of the present invention, so that after running the operating system 294, the processor 250 implements the steps of the TUI display method provided in the embodiments of the present invention. For example, the processing unit 250 is configured to implement related method steps in the electronic device shown in the embodiments in FIG. 16, FIG. 18, FIG. 20, and FIG. 21. For example, a view manager 173, a layer combiner 175, a TUI service 150, and a layer combiner 160 described in the foregoing embodiments may be implemented in a manner of the computer programs (instructions). After loading and running these computer programs (the instructions), the processing unit 250 implements respective functions of these modules.

The input device 230 is configured to receive user input information, for example, digital/character information, a touch operation, or a gesture, and generate a corresponding input signal. Specifically, in an embodiment, the input device 230 includes a touch panel. The touch panel is also referred to as a touchscreen, may collect a touch operation of a user on the touch panel, and generate a touch signal to drive a related component to respond to an operation of the user. In addition to the touch panel, the input device 230 may further include another input device, including but not limited to one or more of a physical keyboard, a function button (for example, a volume control button or a power button), a tracking ball, a mouse, a function lever, or the like.

The display device 240 may be a display panel, for example, a liquid crystal display (liquid crystal display, LCD), or an organic light-emitting diode (organic light-emitting diode, OLED). In some embodiments, the touch panel may cover the display device 240 to form a touch display screen. The display device 240 is configured to display an image, a video, and the like. The display device 240 includes a foldable screen (for example, a flexible foldable screen or a multi-screen foldable screen) described in the embodiments of this specification. The display device 240 includes a display panel. The display panel may be a liquid crystal display (liquid crystal display, LCD), an organic light-emitting diode (organic light-emitting diode, OLED), an active-matrix organic light-emitting diode or an active-matrix organic light-emitting diode (active-matrix organic light emitting diode, AMOLED), a flexible light-emitting diode (flex light-emitting diode, FLED), a Mini LED, a Micro LED, a Micro OLED, a quantum dot light-emitting diode (quantum dot light emitting diodes, QLED), or the like.

The communication subsystem 210 is a basic communication unit of the terminal 200 and is configured to send and receive data of the terminal 200. The power supply 220 is configured to supply power to the foregoing components, and may be specifically a power management chip.

When the electronic device 300 is a wireless terminal, the communication subsystem 210 includes a wireless modem (wireless modem), and mainly implements functions such as baseband processing, modulation and demodulation, signal amplification and filtering, and balancing. In an embodiment, the communication subsystem 210 includes a baseband processor, a radio frequency circuit, and an antenna. The radio frequency circuit and the antenna are mainly responsible for sending and receiving a signal. The baseband processor is responsible for processing the signal, such as A/D and D/A conversion of the signal, and encoding and decoding of the signal. The baseband processor supports one or more of wireless communication standards. The wireless communication standards include but are not limited to a global system for mobile communication (global system for mobile communications, GSM), code division multiple access (code division multiple access, CDMA), wideband code division multiple access (wideband code division multiple access, WCDMA), high speed packet access (high speed packet access, HSPA), a long-term evolution (long-term evolution, LTE), and the like. The baseband processor may be an independent chip, or may be integrated into a same chip with a processor included in the processing unit 250.

Optionally, the electronic device 300 further includes one or more sensors 280, for example, an acceleration transducer and an optic sensor.

The TUI display method provided in the embodiments of the present invention may be performed by a proper combination of software, hardware, and/or firmware of the electronic device 300.

In addition, a person skilled in the art may understand that the terminal 200 may include fewer or more components than the components shown in FIG. 22. The electronic device 300 shown in FIG. 22 merely shows components more related to a plurality of implementations disclosed in the embodiments of the present invention.

Figure 23:
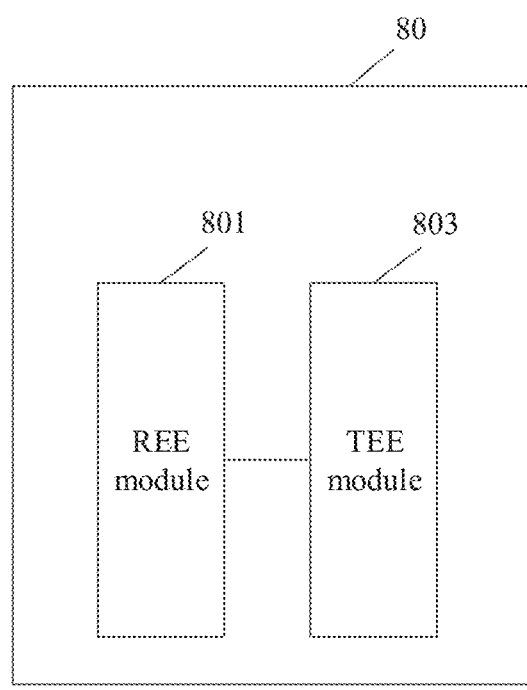
FIG. 23 is a schematic structural diagram of an apparatus according to an embodiment of the present invention.

FIG. 23 is a schematic structural diagram of an apparatus 80 according to an embodiment of the present invention. The apparatus 80 includes an REE module 801 and a TEE module 802. In some embodiments, the REE module 801 and the TEE module 802 may run on a processing unit 250.

The REE module 801 is configured to determine that a foldable screen changes from a first display status to a second display status in response to a first operation performed by a user on an electronic device, where the first display status indicates that at least one of at least two screens is in a display state, the second display status indicates that at least one of the at least two screens is in a display state, and a screen corresponding to the first display status is different from a screen corresponding to the second display status.

The REE module 801 is configured to display a user interface UI of a CA on the screen corresponding to the second display status.

The TEE module 802 is configured to trigger to display a trusted user interface TUI corresponding to the CA on the screen corresponding to the second display status in response to a second operation performed by the user on the UI of the CA, where the TUI is adapted to the screen corresponding to the second display status.

The REE module 801 and the TEE module 802 may be specifically configured to implement related method steps in the electronic device shown in the embodiments in FIG. 16, FIG. 18, FIG. 20, and FIG. 21. For brevity of the specification, details are not described herein again.

In the foregoing embodiments, description of each embodiment has respective focuses. For a part that is not described in detail in an embodiment, refer to related descriptions in other embodiments.

In the several embodiments provided in the present invention, it should be understood that the disclosed apparatus may be implemented in other manners. For example, the described apparatus embodiment is merely an example. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected based on an actual requirement to achieve objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage. Based on such an understanding, the technical solutions of the present invention essentially, or the part contributing to the conventional technology, or all or some of the technical solutions may be implemented in the form of a software product. The computer software product is stored in a storage and includes several instructions for instructing a computer device (which may be a personal computer, a server, or a network device) to perform all or some of the steps of the methods described in the embodiments of the present invention. The foregoing storage medium includes any medium that can store program code, for example, a USB flash drive, a read-only memory (ROM, Read-Only Memory), a random access memory (RAM, Random Access Memory), a removable hard disk, a magnetic disk, or an optical disc.

A person of ordinary skill in the art may understand that all or some of the steps of the methods in the embodiments may be implemented by a program instructing related hardware. The program may be stored in a computer-readable storage memory. The memory may include the flash memory, the read-only memory (Read-Only Memory, ROM for short), the random access memory (Random Access Memory, RAM for short), the magnetic disk, the optical disc, or the like.

The embodiments of the present invention are described in detail above. The principle and implementation of the present invention are described in this specification by using specific examples. The description about the embodiments of the present invention is merely provided to help understand the method and core ideas of the present invention. In addition, the person of ordinary skill in the art makes variations to the present invention in terms of the specific implementations and application scopes based on the ideas of the present invention. Therefore, the content of this specification shall not be construed as a limitation to the present invention.

What is claimed is:

1. A method comprising:
   changing, by a rich execution environment (REE) of an electronic device, a foldable screen from a first display status to a second display status in response to a first operation performed by a user on the electronic device, wherein the electronic device comprises the foldable screen, wherein the foldable screen comprises at least two screens, and wherein the first display status indicates that at least one of the at least two screens is in a display state, the second display status indicates that at least one of the at least two screens is in a display state, and a screen corresponding to the first display status is different from a screen corresponding to the second display status;
   displaying a user interface (UI) of a client application (CA) on the screen corresponding to the second display status, wherein the CA runs on the electronic device; and
   triggering, by a trust execution environment (TEE) of the electronic device, to display a trusted user interface (TUI) corresponding to the CA that adapts to the screen corresponding to the second display status in response to a second operation performed by the user on the UI of the CA; and
   exiting the TUI based on determining, by the REE of the electronic device, that the foldable screen changes from the second display status to a third display status in response to a third operation performed by the user on the electronic device, wherein the third display status indicates that at least one of the at least two screens is in a display state, and a screen corresponding to the third display status is different from the screen corresponding to the second display status.

2. The method according to claim 1, wherein the first operation comprises unfolding the foldable screen into a full-screen display, wherein the first display status indicates that one of the at least two screens is in a display state, and the second display status indicates that the at least two screens are in a display state.

3. The method according to claim 1, wherein the first operation comprises folding the foldable screen into single-screen display, wherein the first display status indicates that the at least two screens are in a display state, and the second display status indicates that one of the at least two screens is in a display state.

4. The method according to claim 1, wherein the first operation comprises flipping the electronic device, wherein the foldable screen switches from first single-screen display to second single-screen display, wherein the first display status indicates that a first screen of the at least two screens is in a display state, and wherein the second display status indicates that a second screen of the at least two screens is in a display state.

5. The method according to claim 1, wherein the method further comprises:
   after exiting the TUI on the screen corresponding to the third display status:
   displaying the UI of the CA corresponding to the third display status; and
   triggering, by the TEE of the electronic device, to display the TUI of the CA on the screen corresponding to the third display status in response to a fourth operation performed by the user on the UI of the CA, wherein the TUI is adapted to the screen corresponding to the third display status.

6. The method according to claim 5, wherein the fourth operation is the same as the second operation.

7. The method according to claim 5, wherein the screen corresponding to the third display status is the same as the screen corresponding to the first display status; or the screen corresponding to the third display status is different from the screen corresponding to the first display status.

8. The method according to claim 1, wherein the TUI is adapted to the screen corresponding to the second display status indicates that the TUI occupies an entire screen corresponding to the second display status.

9. The method according to claim 1, wherein the TUI is adapted to the screen corresponding to the second display status indicates that the TUI occupies a part of the screen corresponding to the second display status.

10. The method according to claim 1, wherein the CA runs on the REE, and a trusted application (TA) corresponding to the CA runs on the TEE, and displaying the UI of the CA on the screen corresponding to the second display status comprises:
displaying the UI of the CA on the screen corresponding to the second display status by using the REE; and
the triggering to display a TUI corresponding to the CA on the screen corresponding to the second display status in response to a second operation performed by the user on the UI of the CA comprises:
in response to the second operation performed by the user on the UI of the CA, triggering to display the TUI of the TA in the TEE on the screen corresponding to the second display status by using the TEE.

11. The method according to claim 1, wherein changing the foldable screen from the first display status to the second display status in response to the first operation performed by the user on the electronic device comprises:
in response to the foldable screen changes from the first display status to the second display status, obtaining, by using the REE, screen information corresponding to the foldable screen in the second display status; and
transmitting the screen information to the TEE by using the REE.

12. The method according to claim 10, wherein triggering to display the TUI of the TA in the TEE on the screen corresponding to the second display status in response to the second operation performed by the user on the UI of the CA and that the TUI is adapted to the screen corresponding to the second display status comprise:
triggering a TUI display request by using the REE in response to the second operation performed by the user on the UI of the CA; and
sending the TUI display request to the TEE by using the REE, so that the TA corresponding to the CA is invoked in the TEE.

13. The method according to claim 12, wherein the triggering to display the TUI of the TA in the TEE on the screen corresponding to the second display status in response to the second operation performed by the user on the UI of the CA and that the TUI is adapted to the screen corresponding to the second display status comprise:
receiving the TUI display request by using the TEE;
drawing the TUI of the TA in the TEE based on a screen information by using the TEE, and the TUI is adapted to the screen corresponding to the second display status; and
displaying the TUI on the screen corresponding to the second display status by using the TEE.

14. The method according to claim 13, wherein drawing the TUI of the TA in the TEE based on the screen information, and the TUI is adapted to the screen corresponding to the second display status comprises:
obtaining coordinate transformation information based on the screen information by using the TEE; and
drawing the TUI based on the coordinate transformation information by using the TEE, wherein a size of the TUI is consistent with a size of the screen corresponding to the second display status, or a size of the TUI is less than a size of the screen corresponding to the second display status.

15. The method according to claim 11, wherein transmitting the screen information to the TEE by using the REE comprises:
encrypting the screen information by using the REE to obtain encrypted screen information;
verifying whether a daemon used to transmit the encrypted screen information is a system service by using the REE; and
invoking a driver interface to transmit the encrypted screen information to the TEE by using the REE when the daemon is the system service.

16. The method according to claim 11, wherein the transmitting the screen information to the TEE by using the REE further comprises:
verifying, based on the screen information, an identity of a daemon used to transmit the screen information by using the TEE; and
obtaining the screen information through decryption by using the TEE when verification succeeds.

17. A display method comprising:
displaying a first trusted user interface (TUI) when an electronic device is in a first display status, wherein the electronic device comprises a foldable screen and the foldable screen comprises at least two screens, and wherein the first TUI is adapted to the first display status;
in response to a user operation, switching, by the electronic device, from the first display status to a second display status, wherein the electronic device comprises the first display status and the second display status that are related to folding or unfolding of the foldable screen, and wherein a rich execution environment (REE) and a trusted execution environment (TEE) are deployed on the electronic device;
displaying a second TUI triggered by the TEE, wherein the second TUI is adapted to the second display status; and
exiting the second TUI based on determining, by the REE of the electronic device, that the foldable screen changes from the second display status to a third display status in response to a third operation performed by a user on the electronic device, wherein the third display status indicates that at least one of the at least two screens is in a display state, and a screen corresponding to the third display status is different from the screen corresponding to the second display status.

18. The display method according to claim 17, wherein the first TUI and the second TUI comprise same content but different display modes, a display mode of the first TUI is adapted to the first display status, and a display mode of the second TUI is adapted to the second display status.

19. The display method according to claim 17, wherein the first TUI and the second TUI comprise different content and different display modes.

20. The display method according to claim 17, wherein that the TUI is adapted to a display state indicates that a display mode of the TUI matches the display state, and the display mode of the TUI comprises a size or a direction of a display interface.

21. An electronic device comprises at least one processor; and a memory storing computer-executable instructions that, when executed by the at least one processor, cause the electronic device to:
    change, by a rich execution environment (REE) of the electronic device, a foldable screen from a first display status to a second display status in response to a first operation performed by a user on the electronic device, wherein the electronic device comprises the foldable screen, wherein the foldable screen comprises at least two screens, wherein the electronic device comprises the first display status and the second display status that are related to folding or unfolding of the foldable screen, wherein the first display status indicates that at least one of the at least two screens is in a display state, the second display status indicates that at least one of the at least two screens is in a display state, and a screen corresponding to the first display status is different from a screen corresponding to the second display status;
    display a user interface (UI) of a client application (CA) on the screen corresponding to the second display status; and
    trigger, by a trusted execution environment (TEE) of the electronic device, to display a trusted user interface (TUI) corresponding to the CA that adapts to the screen corresponding to the second display status in response to a second operation performed by the user on the UI of the CA; and
    exit the TUI based on determining, by the REE of the electronic device, that the foldable screen changes from the second display status to a third display status in response to a third operation performed by the user on the electronic device, wherein the third display status indicates that at least one of the at least two screens is in a display state, and a screen corresponding to the third display status is different from the screen corresponding to the second display status.

22. The electronic device according to claim 21, wherein the first operation comprises unfolding the foldable screen into full-screen display, wherein the first display status indicates that one of the at least two screens is in a display state, and the second display status indicates that the at least two screens are in a display state.

23. The electronic device according to claim 21, wherein the first operation comprises folding the foldable screen into single-screen display, wherein the first display status indicates that the at least two screens are in a display state, and the second display status indicates that one of the at least two screens is in a display state.

24. The electronic device according to claim 21, wherein the first operation comprises flipping the electronic device, wherein the foldable screen switches from first single-screen display to second single-screen display, wherein the first display status indicates that a first screen of the at least two screens is in a display state, and wherein the second display status indicates that a second screen of the at least two screens is in a display state.

25. The electronic device according to claim 21, wherein the computer-executable instructions, when executed by the at least one processor further cause the electronic device to:
    after exiting the TUI on the screen corresponding to the third display status:
        display the UI of the CA corresponding to the third display status; and
        trigger, by the TEE of the electronic device, to display the TUI of the CA on the screen corresponding to the third display status in response to a fourth operation performed by the user on the UI of the CA, wherein the TUI is adapted to the screen corresponding to the third display status.

26. The electronic device according to claim 25, wherein the fourth operation is the same as the second operation.

27. The electronic device according to claim 25, wherein the screen corresponding to the third display status is the same as the screen corresponding to the first display status; or
    the screen corresponding to the third display status is different from the screen corresponding to the first display status.

28. An electronic device comprises at least one processor; and
    a memory storing computer-executable instructions that, when executed by the at least one processor, cause the electronic device to:
    display a first trusted user interface (TUI) when the electronic device is in a first display status, wherein the electronic device comprises a foldable screen and the foldable screen comprises at least two screens, wherein the first TUI is adapted to the first display status; and
    switch, by the electronic device, from the first display status to a second display status in response to a user operation, and displaying a second TUI, wherein the second TUI is adapted to the second display status, wherein the electronic device comprises the first display status and the second display status that are related to folding or unfolding of the foldable screen, and wherein rich execution environment (REE) and a trusted execution environment (TEE) are deployed on the electronic device.

29. The electronic device according to claim 28, wherein the first TUI and the second TUI comprise same content but different display modes, a display mode of the first TUI is adapted to the first display status, and a display mode of the second TUI is adapted to the second display status.

30. The electronic device according to claim 28, wherein the first TUI and the second TUI comprise different content and different display modes.

* * * * *